(12) United States Patent
Darji et al.

(10) Patent No.: US 12,086,649 B2
(45) Date of Patent: Sep. 10, 2024

(54) REBALANCING IN A FLEET OF STORAGE SYSTEMS USING DATA SCIENCE

(71) Applicant: PURE STORAGE, INC., Mountain View, CA (US)

(72) Inventors: Prakash Darji, Santa Clara, CA (US); Shvetima Gulati, Mountain View, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 300 days.

(21) Appl. No.: 17/356,258

(22) Filed: Jun. 23, 2021

(65) Prior Publication Data

US 2022/0365827 A1    Nov. 17, 2022

Related U.S. Application Data

(60) Provisional application No. 63/187,636, filed on May 12, 2021.

(51) Int. Cl.
    *G06F 9/50* (2006.01)
    *G06F 3/06* (2006.01)
    (Continued)

(52) U.S. Cl.
    CPC .......... *G06F 9/5088* (2013.01); *G06F 3/0604* (2013.01); *G06F 3/0605* (2013.01);
    (Continued)

(58) Field of Classification Search
    CPC .... G06F 3/0604; G06F 3/0605; G06F 3/0622; G06F 3/0653; G06F 3/0659; G06F 3/067;
    (Continued)

(56) References Cited

U.S. PATENT DOCUMENTS

| | | |
|---|---|---|
| 5,706,210 A | 1/1998 | Kumano et al. |
| 5,799,200 A | 8/1998 | Brant et al. |

(Continued)

FOREIGN PATENT DOCUMENTS

| | | |
|---|---|---|
| EP | 0725324 A2 | 8/1996 |
| WO | 2012087648 A2 | 6/2012 |

(Continued)

OTHER PUBLICATIONS

International Search Report and Written Opinion, PCT/US2022/028698, Aug. 29, 2022, 18 pages.

(Continued)

*Primary Examiner* — Charles M Swift

(57) ABSTRACT

Rebalancing in a fleet of storage systems using data science including generating, by the cloud-based rebalancing system, a plurality of workload migration scenarios to address a detected workload imbalance among a plurality of workloads in a fleet of storage systems; determining, by the cloud-based rebalancing system, a plurality of movement vectors for each workload migration scenario, wherein each of the plurality of movement vectors describes a consideration factor for migrating a workload of the plurality of workloads within the fleet of storage systems; and generating, by the cloud-based rebalancing system, at least one rebalancing proposal based on the plurality of movement vectors for each workload migration scenario.

20 Claims, 21 Drawing Sheets

US 12,086,649 B2
Page 2

(51) Int. Cl.
  *G06F 9/455* (2018.01)
  *G06F 9/48* (2006.01)
  *G06F 21/60* (2013.01)
  *H04L 43/065* (2022.01)
  *H04L 43/0817* (2022.01)
  *H04L 67/1097* (2022.01)
  *H04L 67/75* (2022.01)
  *H04L 12/46* (2006.01)

(52) U.S. Cl.
  CPC .......... *G06F 3/0622* (2013.01); *G06F 3/0653* (2013.01); *G06F 3/0659* (2013.01); *G06F 3/067* (2013.01); *G06F 9/455* (2013.01); *G06F 9/45558* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4881* (2013.01); *G06F 9/50* (2013.01); *G06F 9/5005* (2013.01); *G06F 9/5016* (2013.01); *G06F 9/5083* (2013.01); *G06F 21/604* (2013.01); *H04L 43/065* (2013.01); *H04L 43/0817* (2013.01); *H04L 67/1097* (2013.01); *H04L 67/75* (2022.05); *G06F 2009/4557* (2013.01); *G06F 9/5044* (2013.01); *H04L 12/46* (2013.01)

(58) Field of Classification Search
  CPC ................. G06F 9/455; G06F 9/45558; G06F 2009/4557; G06F 9/48; G06F 9/4806; G06F 9/4843; G06F 9/485; G06F 9/4856; G06F 9/4881; G06F 9/50; G06F 9/5005; G06F 9/5016; G06F 9/5083; G06F 9/5088
  See application file for complete search history.

(56) References Cited

U.S. PATENT DOCUMENTS

| | | | |
|---|---|---|---|
| 5,933,598 A | 8/1999 | Scales et al. | |
| 6,012,032 A | 1/2000 | Donovan et al. | |
| 6,085,333 A | 7/2000 | DeKoning et al. | |
| 6,643,641 B1 | 11/2003 | Snyder | |
| 6,647,514 B1 | 11/2003 | Umberger et al. | |
| 6,789,162 B1 | 9/2004 | Talagala et al. | |
| 7,089,272 B1 | 8/2006 | Garthwaite et al. | |
| 7,107,389 B2 | 9/2006 | Inagaki et al. | |
| 7,146,521 B1 | 12/2006 | Nguyen | |
| 7,334,124 B2 | 2/2008 | Pham et al. | |
| 7,437,530 B1 | 10/2008 | Rajan | |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,899,780 B1 | 3/2011 | Shmuylovich et al. | |
| 8,042,163 B1 | 10/2011 | Karr et al. | |
| 8,086,585 B1 | 12/2011 | Brashers et al. | |
| 8,200,887 B2 | 6/2012 | Bennett | |
| 8,271,700 B1 | 9/2012 | Annem et al. | |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,613,066 B1 | 12/2013 | Brezinski et al. | |
| 8,620,970 B2 | 12/2013 | English et al. | |
| 8,751,463 B1 | 6/2014 | Chamness | |
| 8,762,642 B2 | 6/2014 | Bates et al. | |
| 8,769,622 B2 | 7/2014 | Chang et al. | |
| 8,800,009 B1 | 8/2014 | Beda et al. | |
| 8,812,860 B1 | 8/2014 | Bray | |
| 8,850,546 B1 | 9/2014 | Field et al. | |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,081,713 B1 | 7/2015 | Bennett | |
| 9,124,569 B2 | 9/2015 | Hussain et al. | |
| 9,134,922 B2 | 9/2015 | Rajagopal et al. | |
| 9,189,334 B2 | 11/2015 | Bennett | |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,311,182 B2 | 4/2016 | Bennett | |
| 9,444,822 B1 | 9/2016 | Borowiec et al. | |
| 9,507,532 B1 | 11/2016 | Colgrove et al. | |
| 9,632,870 B2 | 4/2017 | Bennett | |
| 10,884,636 B1 | 1/2021 | Abrol et al. | |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0160416 A1 | 7/2005 | Jamison et al. | |
| 2005/0188246 A1 | 8/2005 | Emberty et al. | |
| 2005/0216800 A1 | 9/2005 | Bicknell et al. | |
| 2006/0015771 A1 | 1/2006 | Van Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0162674 A1 | 7/2008 | Dahiya | |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0071876 A1* | 3/2011 | Fong | G06Q 10/06311 705/7.26 |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0071087 A1 | 3/2013 | Motiwala et al. | |
| 2013/0145447 A1 | 6/2013 | Maron | |
| 2013/0191555 A1 | 7/2013 | Liu | |
| 2013/0198459 A1 | 8/2013 | Joshi et al. | |

(56) References Cited

U.S. PATENT DOCUMENTS

| | | | |
|---|---|---|---|
| 2013/0205173 | A1 | 8/2013 | Yoneda |
| 2013/0219164 | A1 | 8/2013 | Hamid |
| 2013/0227201 | A1 | 8/2013 | Talagala et al. |
| 2013/0290607 | A1 | 10/2013 | Chang et al. |
| 2013/0311434 | A1 | 11/2013 | Jones |
| 2013/0318297 | A1 | 11/2013 | Jibbe et al. |
| 2013/0332614 | A1 | 12/2013 | Brunk et al. |
| 2014/0020083 | A1 | 1/2014 | Fetik |
| 2014/0074850 | A1 | 3/2014 | Noel et al. |
| 2014/0082715 | A1 | 3/2014 | Grajek et al. |
| 2014/0086146 | A1 | 3/2014 | Kim et al. |
| 2014/0090009 | A1 | 3/2014 | Li et al. |
| 2014/0096220 | A1 | 4/2014 | Pinto et al. |
| 2014/0101434 | A1 | 4/2014 | Senthurpandi et al. |
| 2014/0164774 | A1 | 6/2014 | Nord et al. |
| 2014/0173232 | A1 | 6/2014 | Reohr et al. |
| 2014/0195636 | A1 | 7/2014 | Karve et al. |
| 2014/0201512 | A1 | 7/2014 | Seethaler et al. |
| 2014/0201541 | A1 | 7/2014 | Paul et al. |
| 2014/0208155 | A1 | 7/2014 | Pan |
| 2014/0215590 | A1 | 7/2014 | Brand |
| 2014/0223122 | A1* | 8/2014 | Butt ............. G06F 9/5088 711/162 |
| 2014/0229654 | A1 | 8/2014 | Goss et al. |
| 2014/0230017 | A1 | 8/2014 | Saib |
| 2014/0258526 | A1 | 9/2014 | Le Sant et al. |
| 2014/0282983 | A1 | 9/2014 | Ju et al. |
| 2014/0285917 | A1 | 9/2014 | Cudak et al. |
| 2014/0325262 | A1 | 10/2014 | Cooper et al. |
| 2014/0351627 | A1 | 11/2014 | Best et al. |
| 2014/0373104 | A1 | 12/2014 | Gaddam et al. |
| 2014/0373126 | A1 | 12/2014 | Hussain et al. |
| 2015/0026387 | A1 | 1/2015 | Sheredy et al. |
| 2015/0074463 | A1 | 3/2015 | Jacoby et al. |
| 2015/0089569 | A1 | 3/2015 | Sondhi et al. |
| 2015/0095515 | A1 | 4/2015 | Krithivas et al. |
| 2015/0113203 | A1 | 4/2015 | Dancho et al. |
| 2015/0121137 | A1 | 4/2015 | McKnight et al. |
| 2015/0134920 | A1 | 5/2015 | Anderson et al. |
| 2015/0149822 | A1 | 5/2015 | Coronado et al. |
| 2015/0193169 | A1 | 7/2015 | Sundaram et al. |
| 2015/0324236 | A1* | 11/2015 | Gopalan ............. G06F 9/5088 711/162 |
| 2015/0378888 | A1 | 12/2015 | Zhang et al. |
| 2016/0094477 | A1* | 3/2016 | Bai ............. H04L 47/786 709/226 |
| 2016/0098323 | A1 | 4/2016 | Mutha et al. |
| 2016/0350009 | A1 | 12/2016 | Cerreta et al. |
| 2016/0352720 | A1 | 12/2016 | Hu et al. |
| 2016/0352830 | A1 | 12/2016 | Borowiec et al. |
| 2016/0352834 | A1 | 12/2016 | Borowiec et al. |
| 2016/0378531 | A1* | 12/2016 | Dow ............. G06F 9/45558 718/1 |
| 2018/0081562 | A1 | 3/2018 | Vasudevan |
| 2020/0028935 | A1* | 1/2020 | Sahay ............. G06F 9/5088 |
| 2020/0174830 | A1* | 6/2020 | Hermenier ............. H04L 67/101 |
| 2020/0267216 | A1* | 8/2020 | Haggart ............. G06F 9/5088 |
| 2022/0036272 | A1* | 2/2022 | Karimi ............. G06N 5/027 |

FOREIGN PATENT DOCUMENTS

| | | | |
|---|---|---|---|
| WO | 2013071087 | A1 | 5/2013 |
| WO | 2014110137 | A1 | 7/2014 |
| WO | 2016015008 | A1 | 1/2016 |
| WO | 2016190938 | A1 | 12/2016 |
| WO | 2016195759 | A1 | 12/2016 |
| WO | 2016195958 | A1 | 12/2016 |
| WO | 2016195961 | A1 | 12/2016 |

OTHER PUBLICATIONS

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, Apr. 29, 2016, 12 pages.

International Search Report and Written Opinion, PCT/US2016/015008, May 4, 2016, 12 pages.

International Search Report and Written Opinion, PCT/US2016/016333, Jun. 8, 2016, 12 pages.

International Search Report and Written Opinion, PCT/US2016/020410, Jul. 8, 2016, 12 pages.

International Search Report and Written Opinion, PCT/US2016/032052, Aug. 30, 2016, 17 pages.

International Search Report and Written Opinion, PCT/US2016/032084, Jul. 18, 2016, 12 pages.

International Search Report and Written Opinion, PCT/US2016/035492, Aug. 17, 2016, 10 pages.

International Search Report and Written Opinion, PCT/US2016/036693, Aug. 29, 2016, 10 pages.

International Search Report and Written Opinion, PCT/US2016/038758, Oct. 7, 2016, 10 pages.

International Search Report and Written Opinion, PCT/US2016/040393, Sep. 22, 2016, 10 pages.

International Search Report and Written Opinion, PCT/US2016/044020, Sep. 30, 2016, 11 pages.

International Search Report and Written Opinion, PCT/US2016/044874, Oct. 7, 2016, 11 pages.

International Search Report and Written Opinion, PCT/US2016/044875, Oct. 5, 2016, 13 pages.

International Search Report and Written Opinion, PCT/US2016/044876, Oct. 21, 2016, 12 pages.

International Search Report and Written Opinion, PCT/US2016/044877, Sep. 29, 2016, 13 pages.

Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity", Microsoft (online), Apr. 2014, 36 pages, URL: www.aka.ms/HybridIdentityWp.

PCmag, "Storage Array Definition", Published May 10, 2013, http://web.archive.org/web/20130510121646/http://www.pcmag.com/encyclopedia/term/52091/storage-array, 2 pages.

(56) References Cited

OTHER PUBLICATIONS

Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.
Sweere, "Creating Storage Class Persistent Memory with NVDIMM", Published in Aug. 2013, Flash Memory Summit 2013, http://ww.flashmemorysummit.com/English/Collaterals/Proceedings/2013/20130814_T2_Sweere.pdf, 22 pages.
Techopedia, "What is a disk array", techopedia.com (online), Jan. 13, 2012, 1 page, URL: web.archive.org/web/20120113053358/http://www.techopedia.com/definition/1009/disk-array.
Webopedia, "What is a disk array", webopedia.com (online), May 26, 2011, 2 pages, URL: web/archive.org/web/20110526081214/http://www.webopedia.com/TERM/D/disk_array.html.
Wikipedia, "Convergent Encryption", Wikipedia.org (online), accessed Sep. 8, 2015, 2 pages, URL: en.wikipedia.org/wiki/Convergent_encryption.

\* cited by examiner ns. System 100 (also referred to as "storage system"
REBALANCING IN A FLEET OF STORAGE SYSTEMS USING DATA SCIENCE

CROSS-REFERENCE TO RELATED APPLICATION

This application is a non-provisional application for patent entitled to a filing date and claiming the benefit of earlier-filed U.S. Provisional Patent Application Ser. No. 63/187,636, filed May 12, 2021, which is herein incorporated by reference in its entirety.

DESCRIPTION OF EMBODIMENTS

Figure 1A:
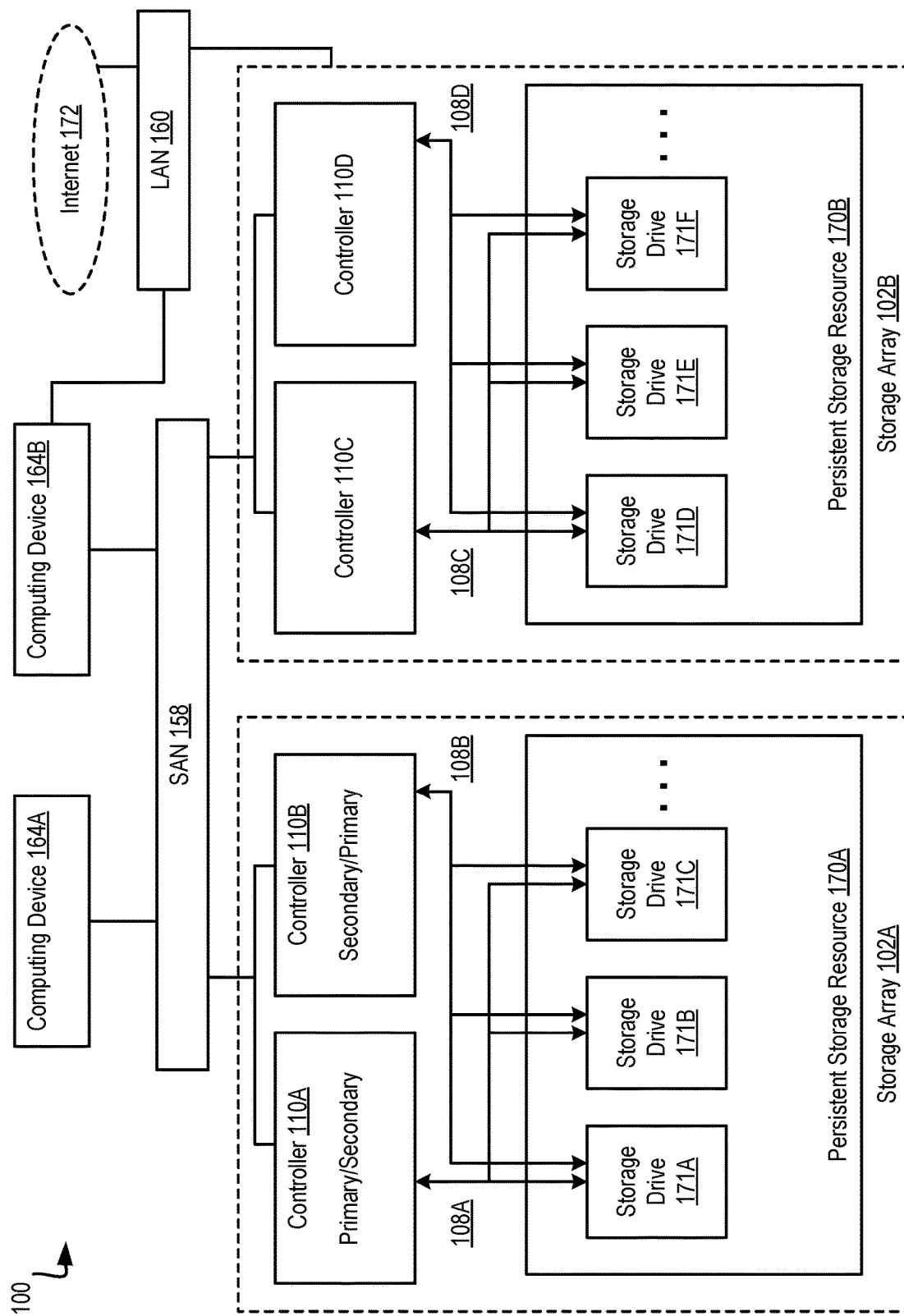
FIG. 1A illustrates a first example system for data storage in accordance with some implementations.

Example methods, apparatus, and products for rebalancing in a fleet of storage systems using data science in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
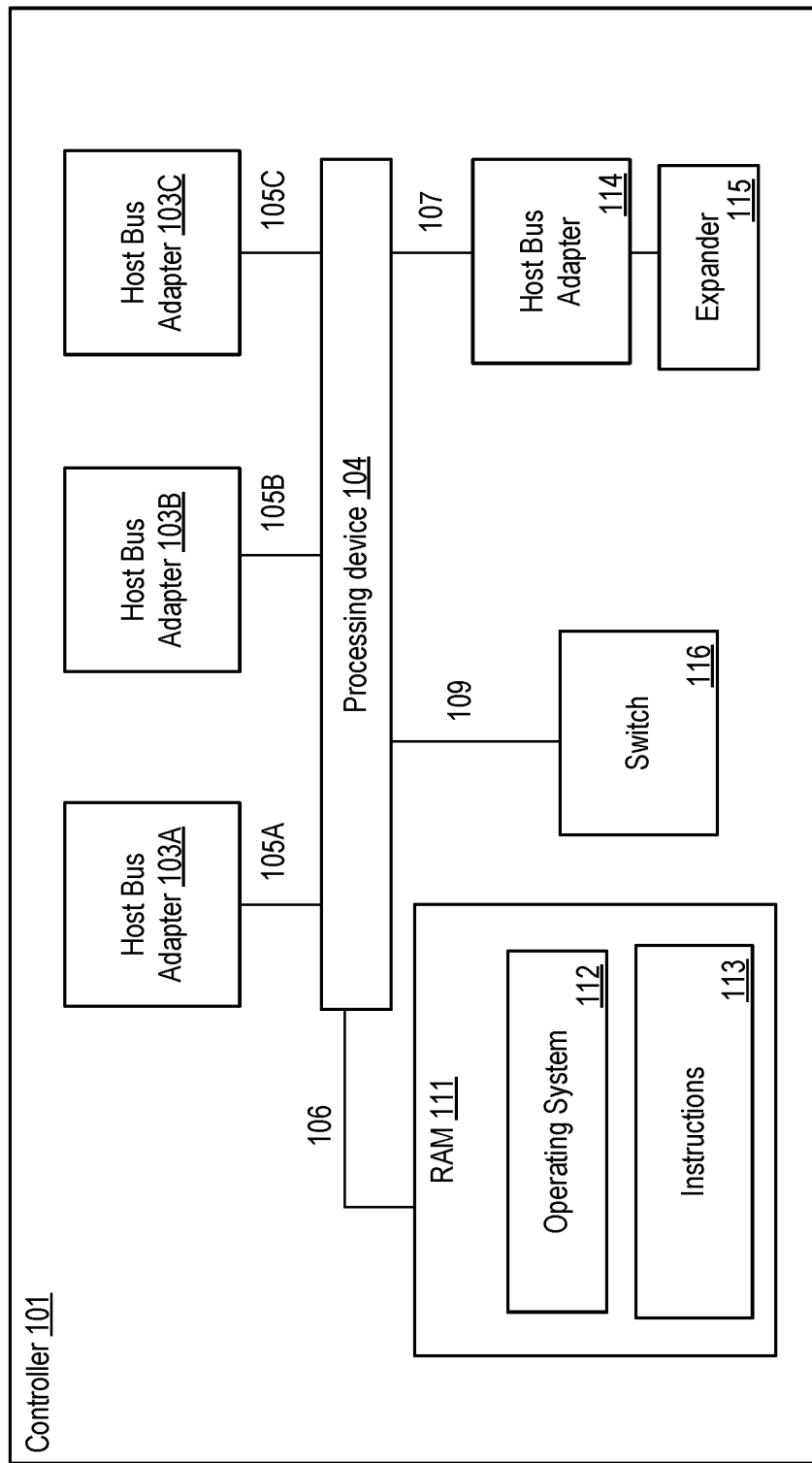
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage access memory ('RAM') 111. Processing device 104 (or controller 101) represents one or more array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

In implementations, storage drive 171A-F may be one or more zoned storage devices. In some implementations, the one or more zoned storage devices may be a shingled HDD. In implementations, the one or more storage devices may be a flash-based SSD. In a zoned storage device, a zoned namespace on the zoned storage device can be addressed by groups of blocks that are grouped and aligned by a natural size, forming a number of addressable zones. In implementations utilizing an SSD, the natural size may be based on the erase block size of the SSD. In some implementations, the zones of the zoned storage device may be defined during initialization of the zoned storage device. In implementations, the zones may be defined dynamically as data is written to the zoned storage device.

In some implementations, zones may be heterogeneous, with some zones each being a page group and other zones being multiple page groups. In implementations, some zones may correspond to an erase block and other zones may correspond to multiple erase blocks. In an implementation, zones may be any combination of differing numbers of pages in page groups and/or erase blocks, for heterogeneous mixes of programming modes, manufacturers, product types and/or product generations of storage devices, as applied to heterogeneous assemblies, upgrades, distributed storages, etc. In some implementations, zones may be defined as having usage characteristics, such as a property of supporting data with particular kinds of longevity (very short lived or very long lived, for example). These properties could be used by a zoned storage device to determine how the zone will be managed over the zone's expected lifetime.

It should be appreciated that a zone is a virtual construct. Any particular zone may not have a fixed location at a storage device. Until allocated, a zone may not have any location at a storage device. A zone may correspond to a number representing a chunk of virtually allocatable space that is the size of an erase block or other block size in various implementations. When the system allocates or opens a zone, zones get allocated to flash or other solid-state storage memory and, as the system writes to the zone, pages are written to that mapped flash or other solid-state storage memory of the zoned storage device. When the system closes the zone, the associated erase block(s) or other sized block(s) are completed. At some point in the future, the system may delete a zone which will free up the zone's allocated space. During its lifetime, a zone may be moved around to different locations of the zoned storage device, e.g., as the zoned storage device does internal maintenance.

In implementations, the zones of the zoned storage device may be in different states. A zone may be in an empty state in which data has not been stored at the zone. An empty zone may be opened explicitly, or implicitly by writing data to the zone. This is the initial state for zones on a fresh zoned storage device, but may also be the result of a zone reset. In some implementations, an empty zone may have a designated location within the flash memory of the zoned storage device. In an implementation, the location of the empty zone may be chosen when the zone is first opened or first written to (or later if writes are buffered into memory). A zone may be in an open state either implicitly or explicitly, where a zone that is in an open state may be written to store data with write or append commands. In an implementation, a zone that is in an open state may also be written to using a copy command that copies data from a different zone. In some implementations, a zoned storage device may have a limit on the number of open zones at a particular time.

A zone in a closed state is a zone that has been partially written to, but has entered a closed state after issuing an explicit close operation. A zone in a closed state may be left available for future writes, but may reduce some of the run-time overhead consumed by keeping the zone in an open state. In implementations, a zoned storage device may have a limit on the number of closed zones at a particular time. A zone in a full state is a zone that is storing data and can no longer be written to. A zone may be in a full state either after writes have written data to the entirety of the zone or as a result of a zone finish operation. Prior to a finish operation, a zone may or may not have been completely written. After a finish operation, however, the zone may not be opened a written to further without first performing a zone reset operation.

The mapping from a zone to an erase block (or to a shingled track in an HDD) may be arbitrary, dynamic, and hidden from view. The process of opening a zone may be an operation that allows a new zone to be dynamically mapped to underlying storage of the zoned storage device, and then allows data to be written through appending writes into the zone until the zone reaches capacity. The zone can be finished at any point, after which further data may not be written into the zone. When the data stored at the zone is no longer needed, the zone can be reset which effectively deletes the zone's content from the zoned storage device, making the physical storage held by that zone available for the subsequent storage of data. Once a zone has been written and finished, the zoned storage device ensures that the data stored at the zone is not lost until the zone is reset. In the time between writing the data to the zone and the resetting of the zone, the zone may be moved around between shingle tracks or erase blocks as part of maintenance operations within the zoned storage device, such as by copying data to keep the data refreshed or to handle memory cell aging in an SSD.

In implementations utilizing an HDD, the resetting of the zone may allow the shingle tracks to be allocated to a new, opened zone that may be opened at some point in the future. In implementations utilizing an SSD, the resetting of the zone may cause the associated physical erase block(s) of the zone to be erased and subsequently reused for the storage of data. In some implementations, the zoned storage device may have a limit on the number of open zones at a point in time to reduce the amount of overhead dedicated to keeping zones open.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
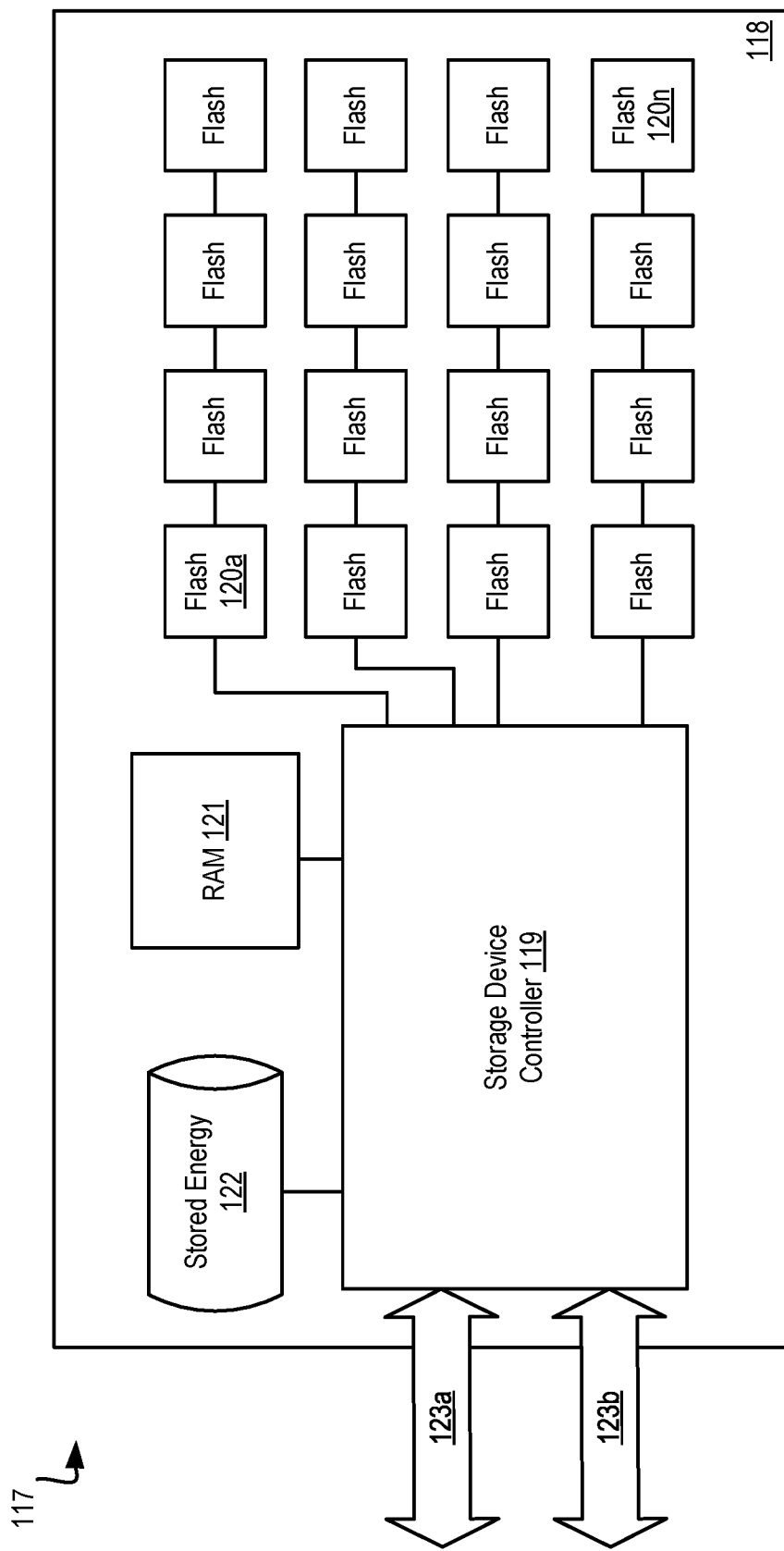
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage device controller 119. In one embodiment, storage device controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the stored energy device 122 to measure corresponding discharge characteristics, etc. If the available energy decreases over time, the effective available capacity of the addressable fast-write storage may be decreased to ensure that it can be written safely based on the currently available stored energy.

Figure 1D:
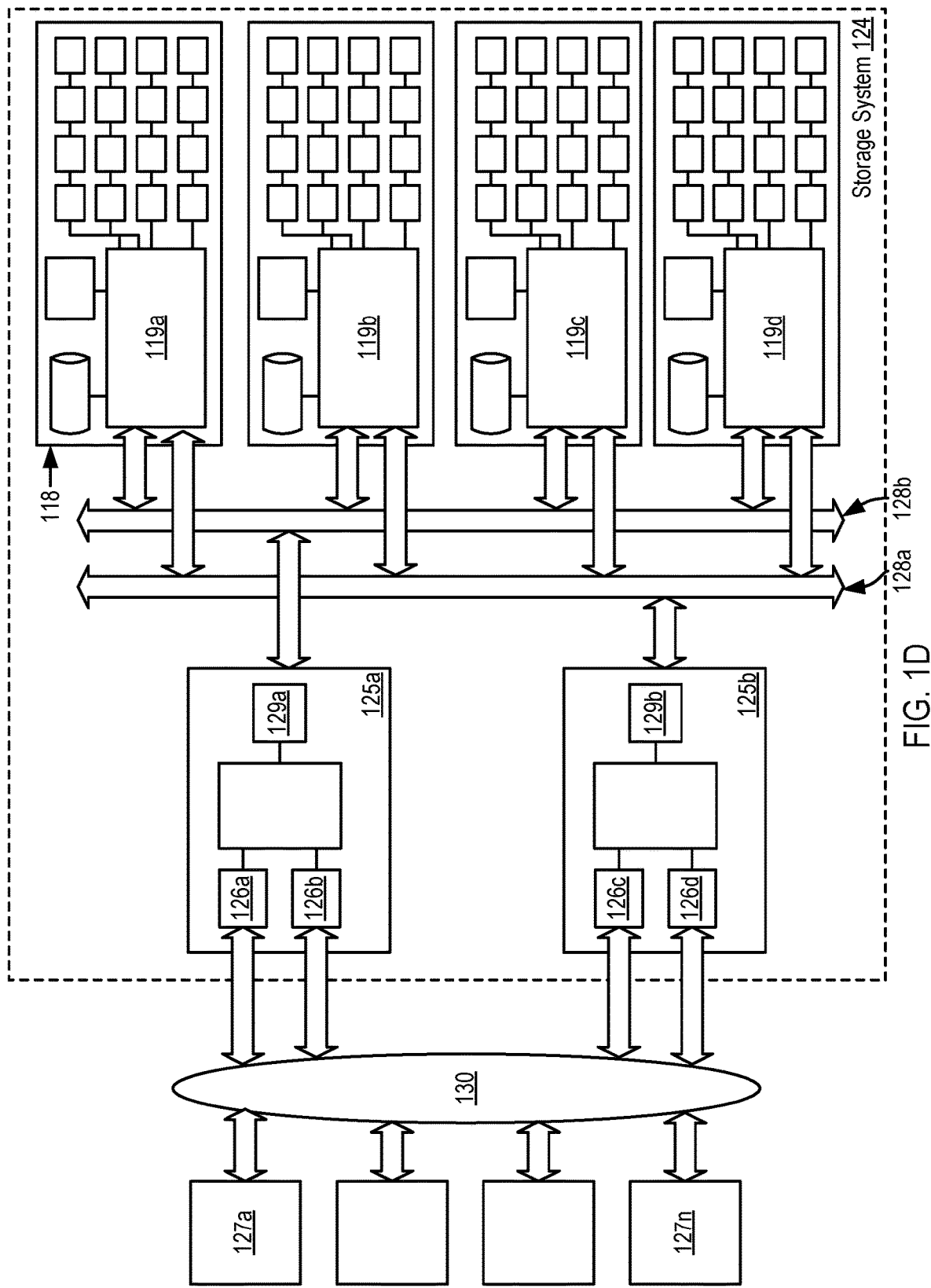
FIG. 1D illustrates a fourth example system for data storage in accordance with some implementations.

FIG. 1D illustrates a third example storage system 124 for data storage in accordance with some implementations. In one embodiment, storage system 124 includes storage controllers 125a, 125b. In one embodiment, storage controllers 125a, 125b are operatively coupled to Dual PCI storage devices. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, storage controllers 125a, 125b operate as PCI masters to one or the other PCI buses 128a, 128b.

In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one storage controller 125a to another storage controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125*a*, 125*b* may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power holdup apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
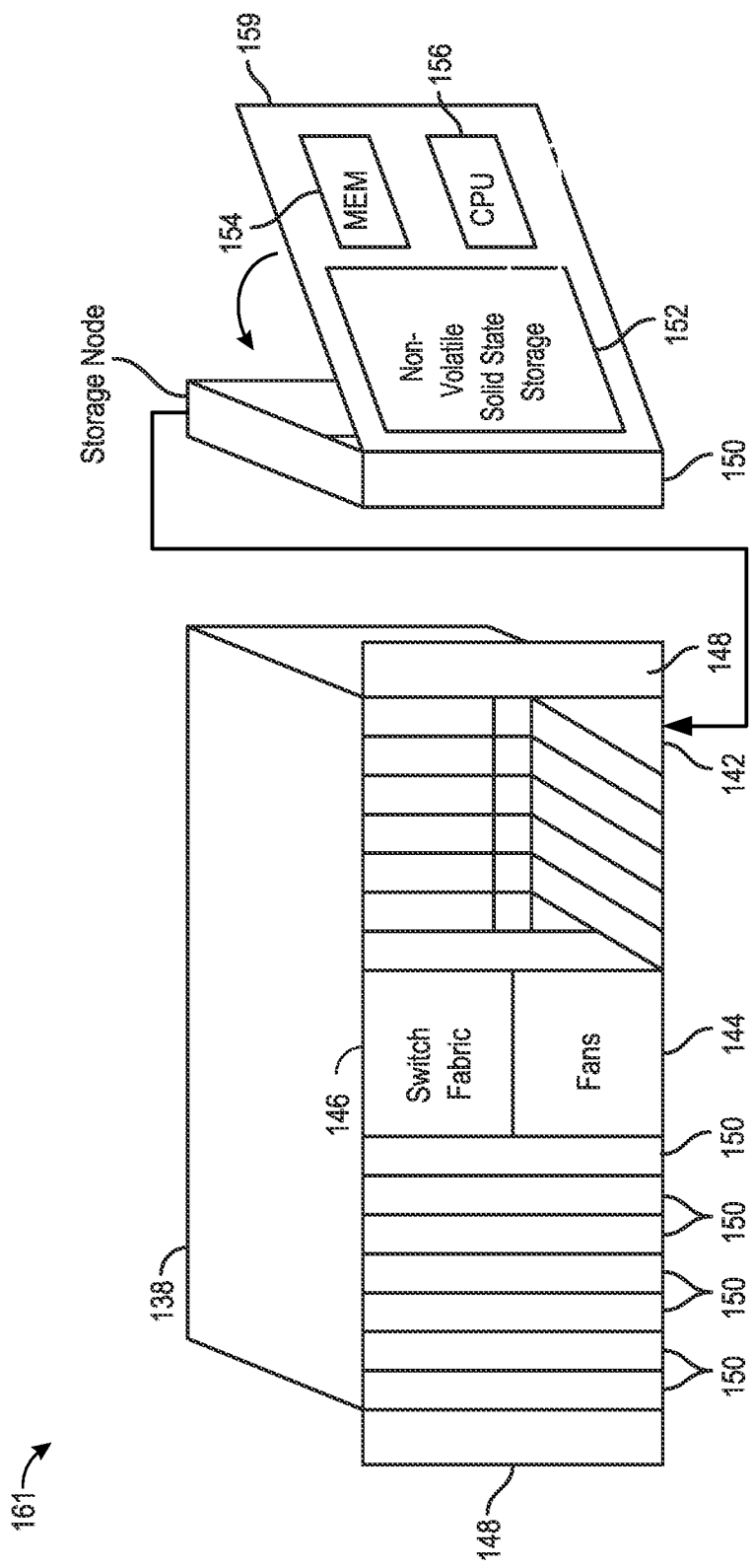
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage 152 units or storage nodes 150 within the chassis.

Figure 2B:
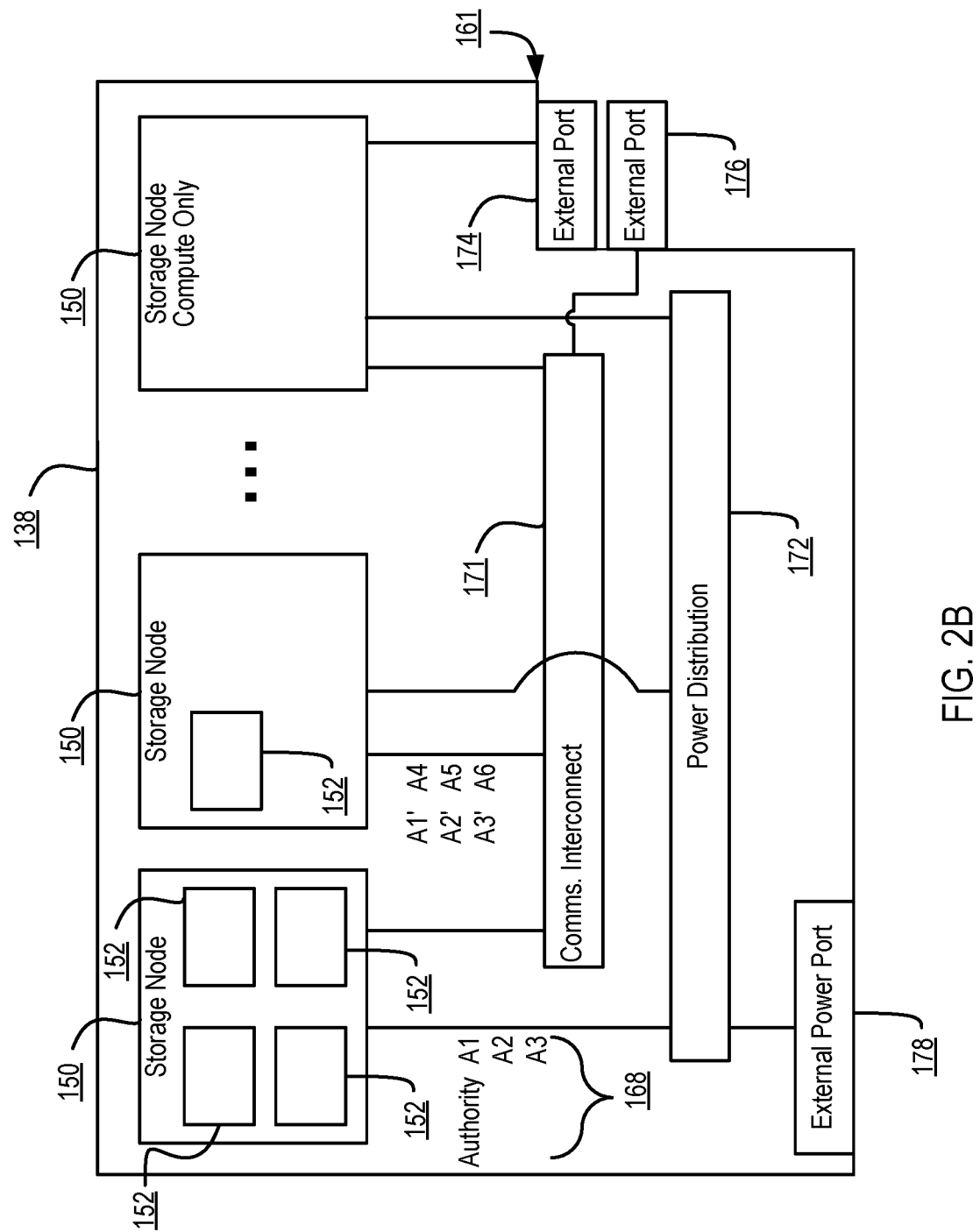
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storage 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storage 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storage 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In embodiments, authorities 168 operate to determine how operations will proceed against particular logical elements. Each of the logical elements may be operated on through a particular authority across a plurality of storage controllers of a storage system. The authorities 168 may communicate with the plurality of storage controllers so that the plurality of storage controllers collectively perform operations against those particular logical elements.

In embodiments, logical elements could be, for example, files, directories, object buckets, individual objects, delineated parts of files or objects, other forms of key-value pair databases, or tables. In embodiments, performing an operation can involve, for example, ensuring consistency, structural integrity, and/or recoverability with other operations against the same logical element, reading metadata and data associated with that logical element, determining what data should be written durably into the storage system to persist any changes for the operation, or where metadata and data can be determined to be stored across modular storage devices attached to a plurality of the storage controllers in the storage system.

In some embodiments the operations are token based transactions to efficiently communicate within a distributed system. Each transaction may be accompanied by or associated with a token, which gives permission to execute the transaction. The authorities 168 are able to maintain a pre-transaction state of the system until completion of the operation in some embodiments. The token based communication may be accomplished without a global lock across the system, and also enables restart of an operation in case of a disruption or other failure.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Modes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 unit may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
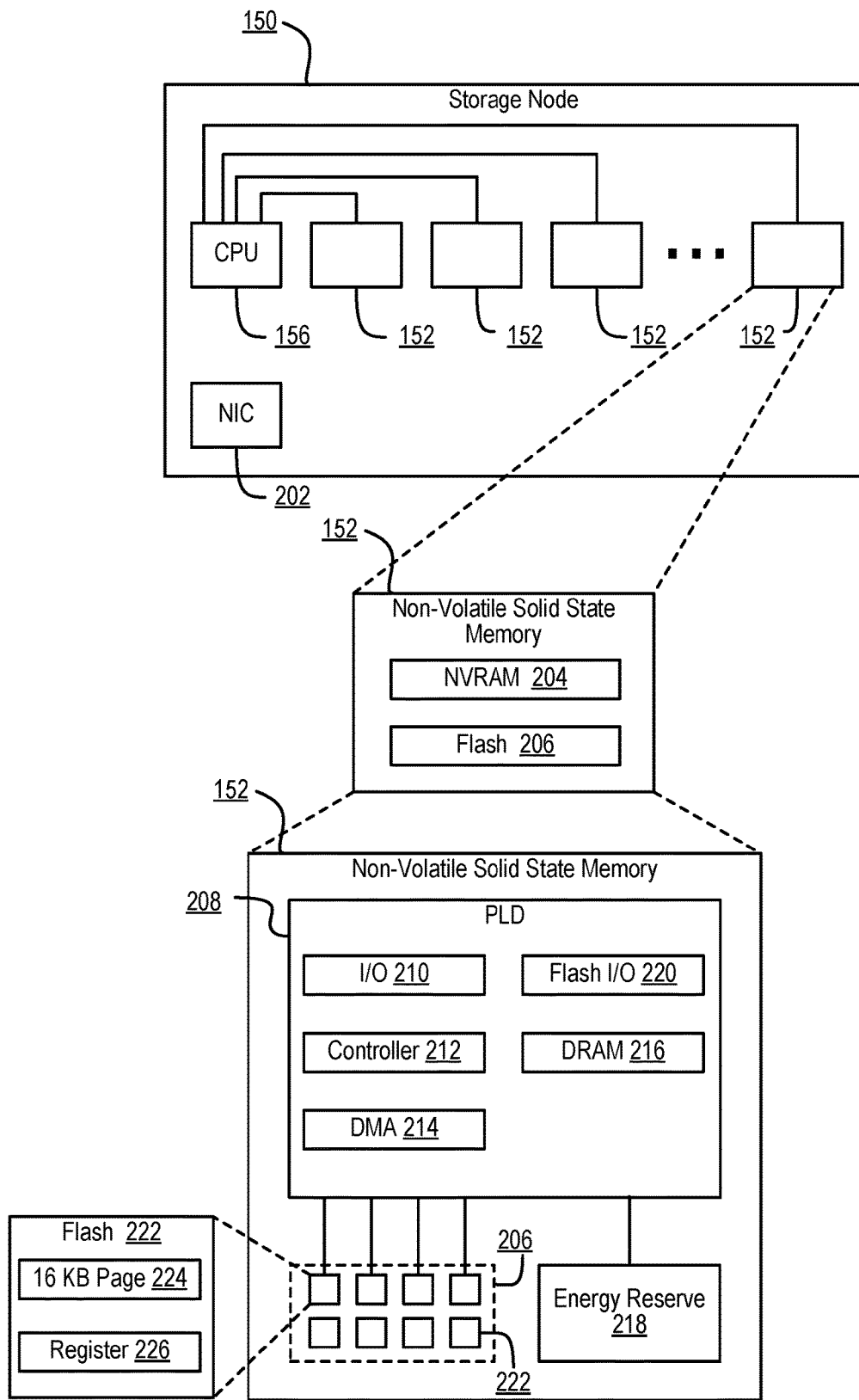
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The non-volatile solid state storage 152 units described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple non-volatile sold state storage 152 units and/or storage nodes 150 cooperate in various ways (e.g., for erasure coding, data sharding, metadata communication and redundancy, storage capacity expansion or contraction, data recovery, and so on).

Figure 2D:
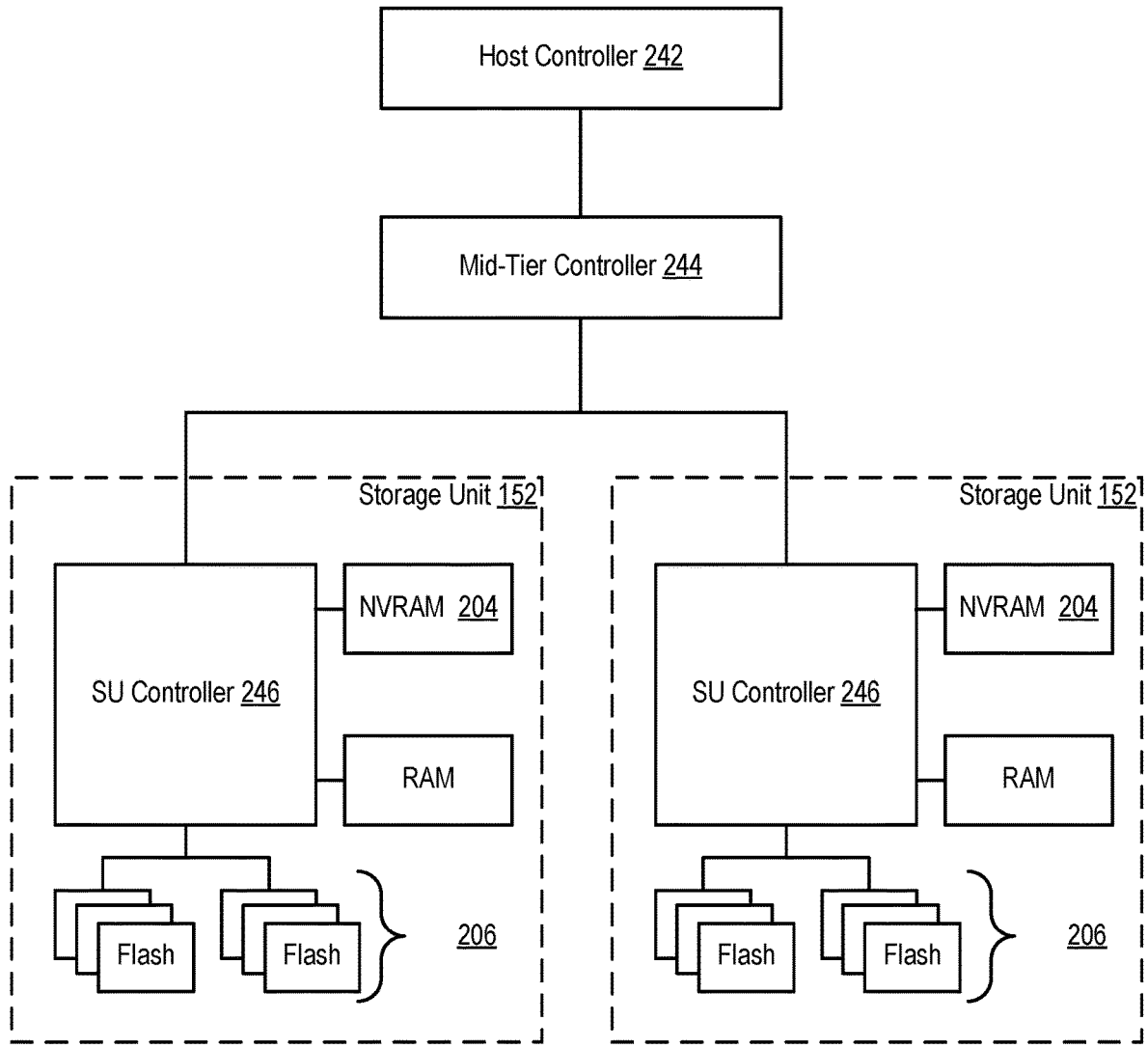
FIG. 2D shows a storage server environment, which uses embodiments of the storage nodes and storage units of some previous figures in accordance with some embodiments.

FIG. 2D shows a storage server environment, which uses embodiments of the storage nodes 150 and storage 152 units of FIGS. 2A-C. In this version, each non-volatile solid state storage 152 unit has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The non-volatile solid state storage 152 unit may be implemented as a single board containing storage, and may be the largest tolerable failure domain inside the chassis. In some embodiments, up to two non-volatile solid state storage 152 units may fail and the device will continue with no data loss.

The physical storage is divided into named regions based on application usage in some embodiments. The NVRAM 204 is a contiguous block of reserved memory in the non-volatile solid state storage 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a non-volatile solid state storage 152 unit fails, onboard supercapacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
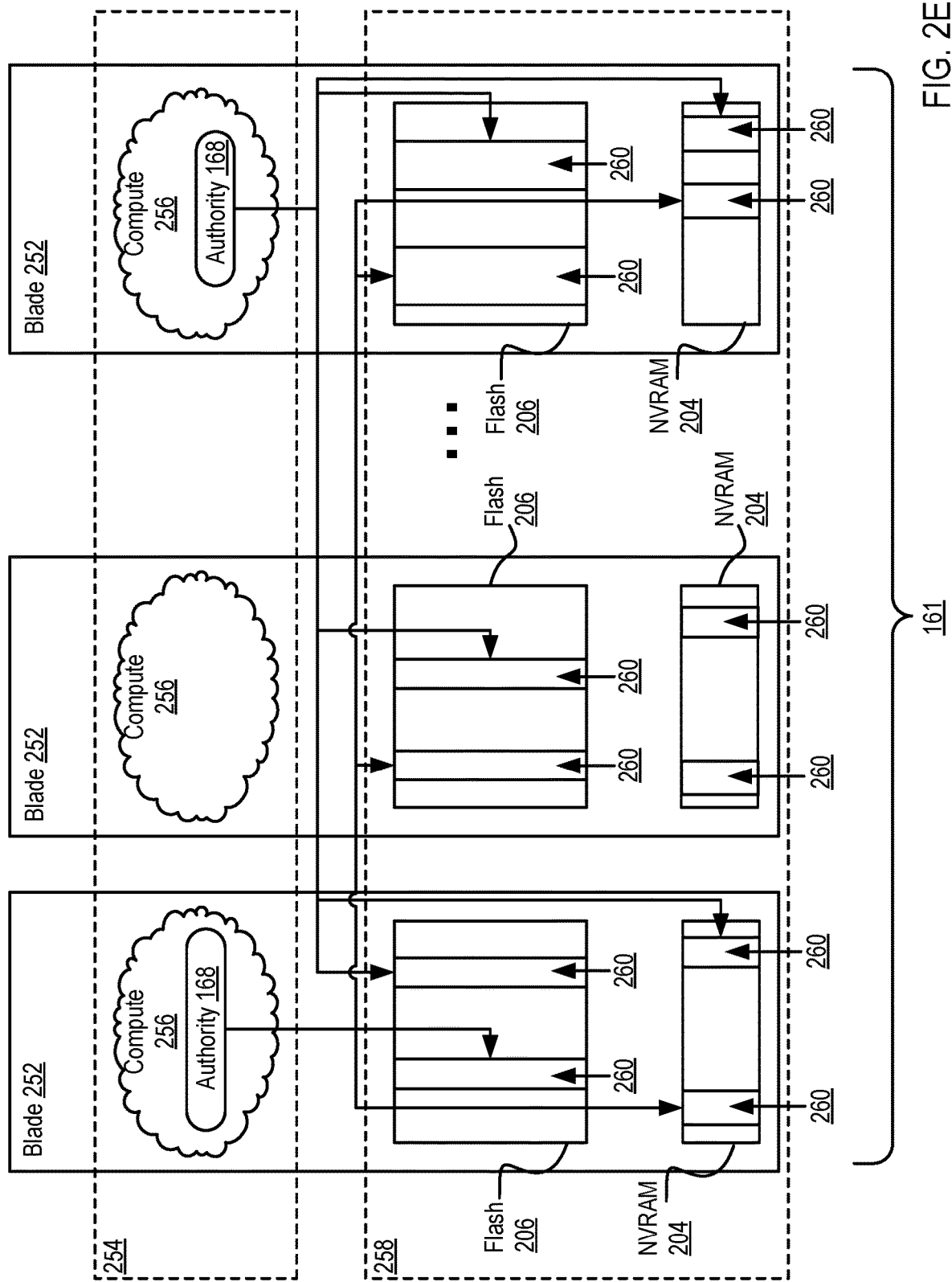
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g., partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
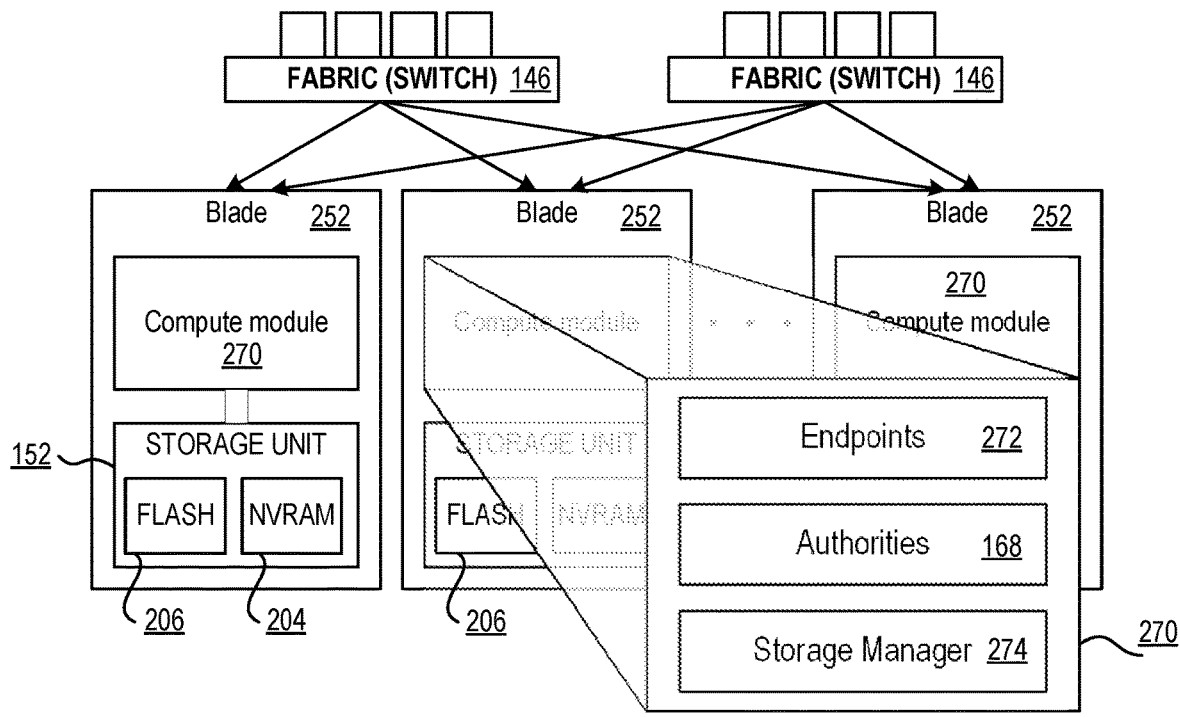
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
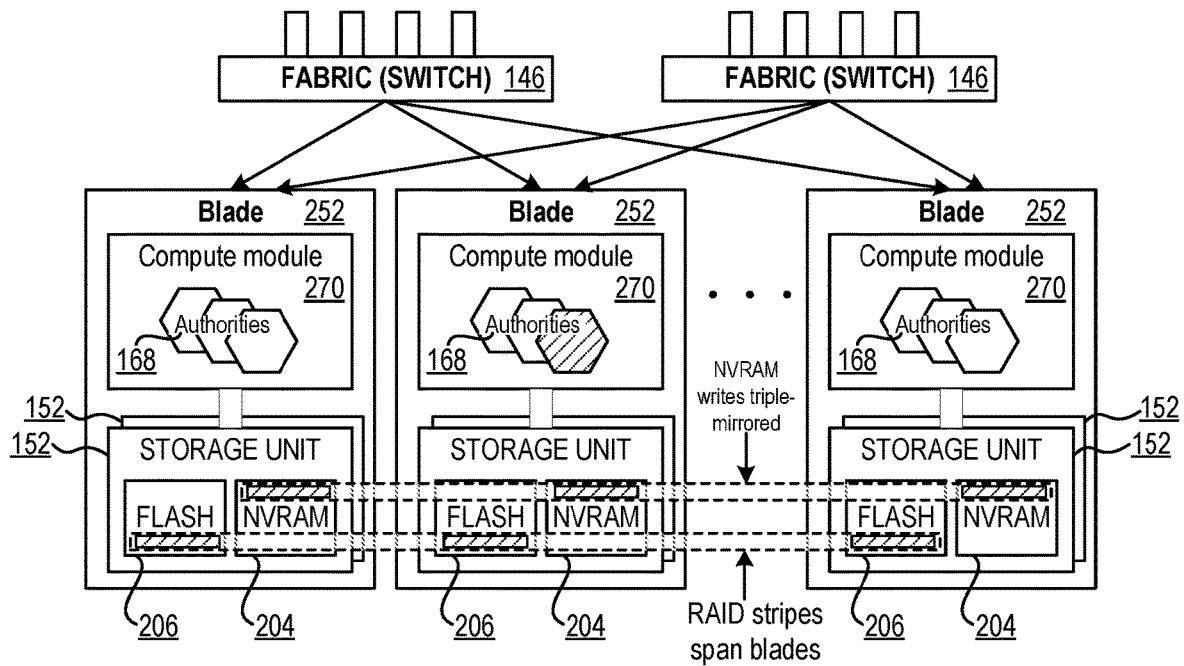
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
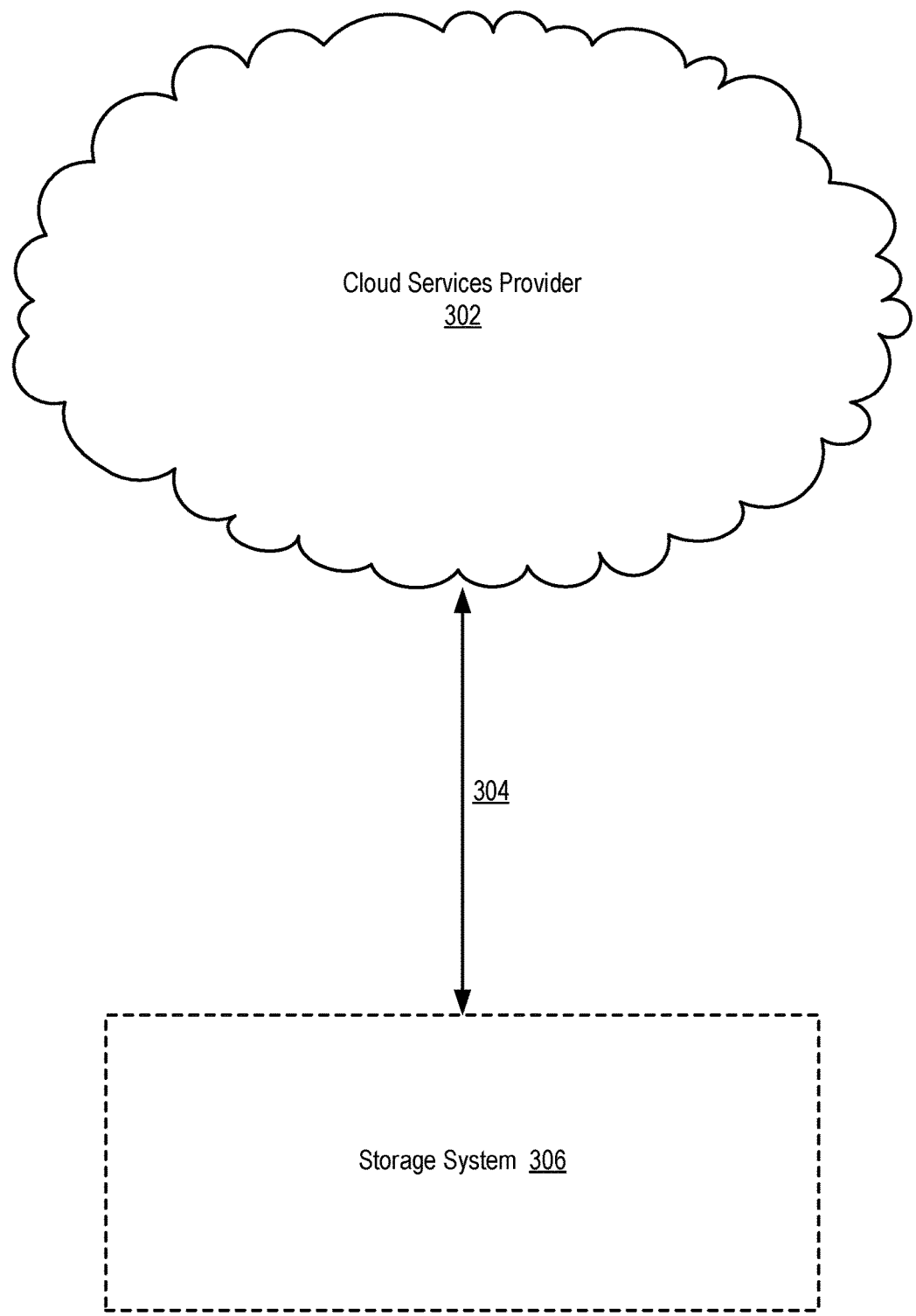
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage system 306 and remote, cloud-based storage that is utilized by the storage system 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Although the example depicted in FIG. 3A illustrates the storage system 306 being coupled for data communications with the cloud services provider 302, in other embodiments the storage system 306 may be part of a hybrid cloud deployment in which private cloud elements (e.g., private cloud services, on-premises infrastructure, and so on) and public cloud elements (e.g., public cloud services, infrastructure, and so on that may be provided by one or more cloud services providers) are combined to form a single solution, with orchestration among the various platforms. Such a hybrid cloud deployment may leverage hybrid cloud management software such as, for example, Azure™ Arc from Microsoft™, that centralize the management of the hybrid cloud deployment to any infrastructure and enable the deployment of services anywhere. In such an example, the hybrid cloud management software may be configured to create, update, and delete resources (both physical and virtual) that form the hybrid cloud deployment, to allocate compute and storage to specific workloads, to monitor workloads and resources for performance, policy compliance, updates and patches, security status, or to perform a variety of other tasks.

Readers will appreciate that by pairing the storage systems described herein with one or more cloud services providers, various offerings may be enabled. For example, disaster recovery as a service ('DRaaS') may be provided where cloud resources are utilized to protect applications and data from disruption caused by disaster, including in embodiments where the storage systems may serve as the primary data store. In such embodiments, a total system backup may be taken that allows for business continuity in the event of system failure. In such embodiments, cloud data backup techniques (by themselves or as part of a larger DRaaS solution) may also be integrated into an overall solution that includes the storage systems and cloud services providers described herein.

The storage systems described herein, as well as the cloud services providers, may be utilized to provide a wide array of security features. For example, the storage systems may encrypt data at rest (and data may be sent to and from the storage systems encrypted) and may make use of Key Management-as-a-Service ('KMaaS') to manage encryption keys, keys for locking and unlocking storage devices, and so on. Likewise, cloud data security gateways or similar mechanisms may be utilized to ensure that data stored within the storage systems does not improperly end up being stored in the cloud as part of a cloud data backup operation. Furthermore, microsegmentation or identity-based-segmentation may be utilized in a data center that includes the storage systems or within the cloud services provider, to create secure zones in data centers and cloud deployments that enables the isolation of workloads from one another.

Figure 3B:
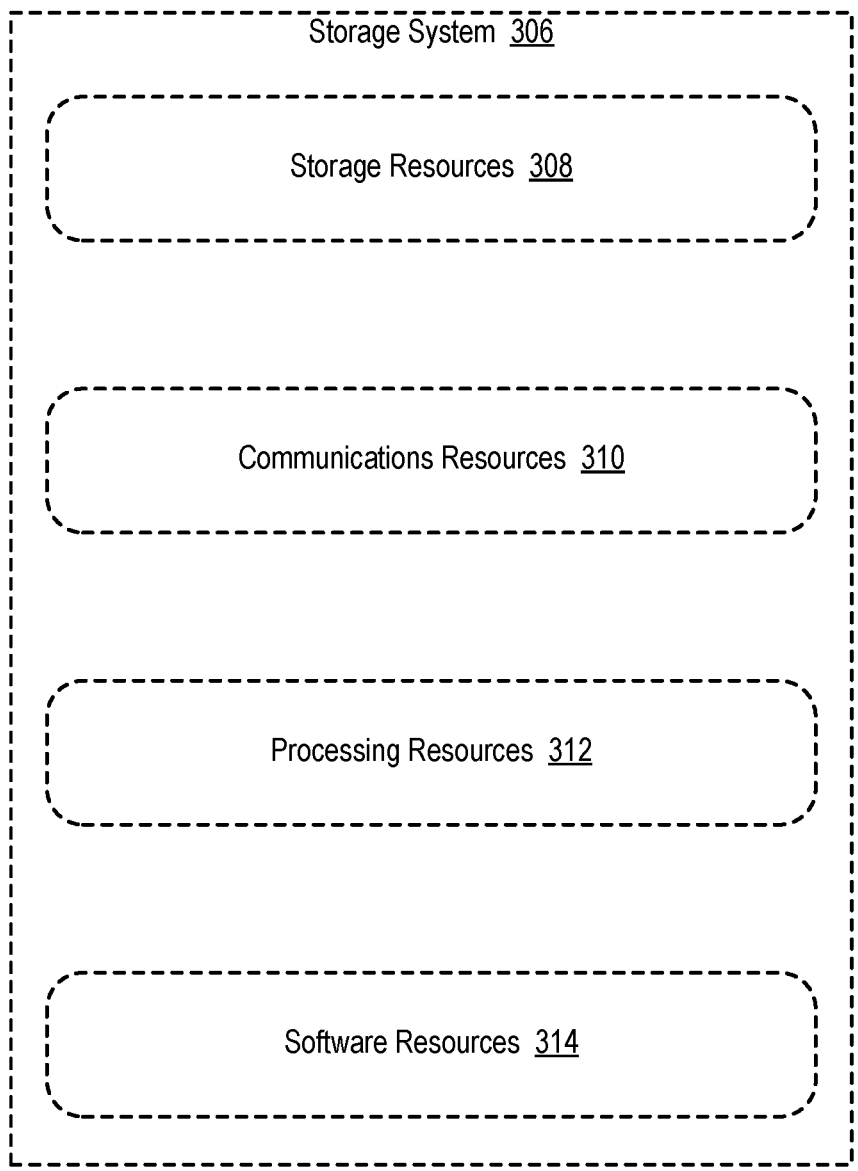
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3B may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The storage resources 308 depicted in FIG. 3B may also include racetrack memory (also referred to as domain-wall memory). Such racetrack memory may be embodied as a form of non-volatile, solid-state memory that relies on the intrinsic strength and orientation of the magnetic field created by an electron as it spins in addition to its electronic charge, in solid-state devices. Through the use of spin-coherent electric current to move magnetic domains along a nanoscopic permalloy wire, the domains may pass by magnetic read/write heads positioned near the wire as current is passed through the wire, which alter the domains to record patterns of bits. In order to create a racetrack memory device, many such wires and read/write elements may be packaged together.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The example storage system 306 depicted in FIG. 3B may leverage the storage resources described above in a variety of different ways. For example, some portion of the storage resources may be utilized to serve as a write cache, storage resources within the storage system may be utilized as a read cache, or tiering may be achieved within the storage systems by placing data within the storage system in accordance with one or more tiering policies.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques. Such data protection techniques may be carried out, for example, by system software executing on computer hardware within the storage system, by a cloud services provider, or in other ways. Such data protection techniques can include data archiving, data backup, data replication, data snapshotting, data and database cloning, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage system 306. For example, the software resources 314 may include software modules that perform various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
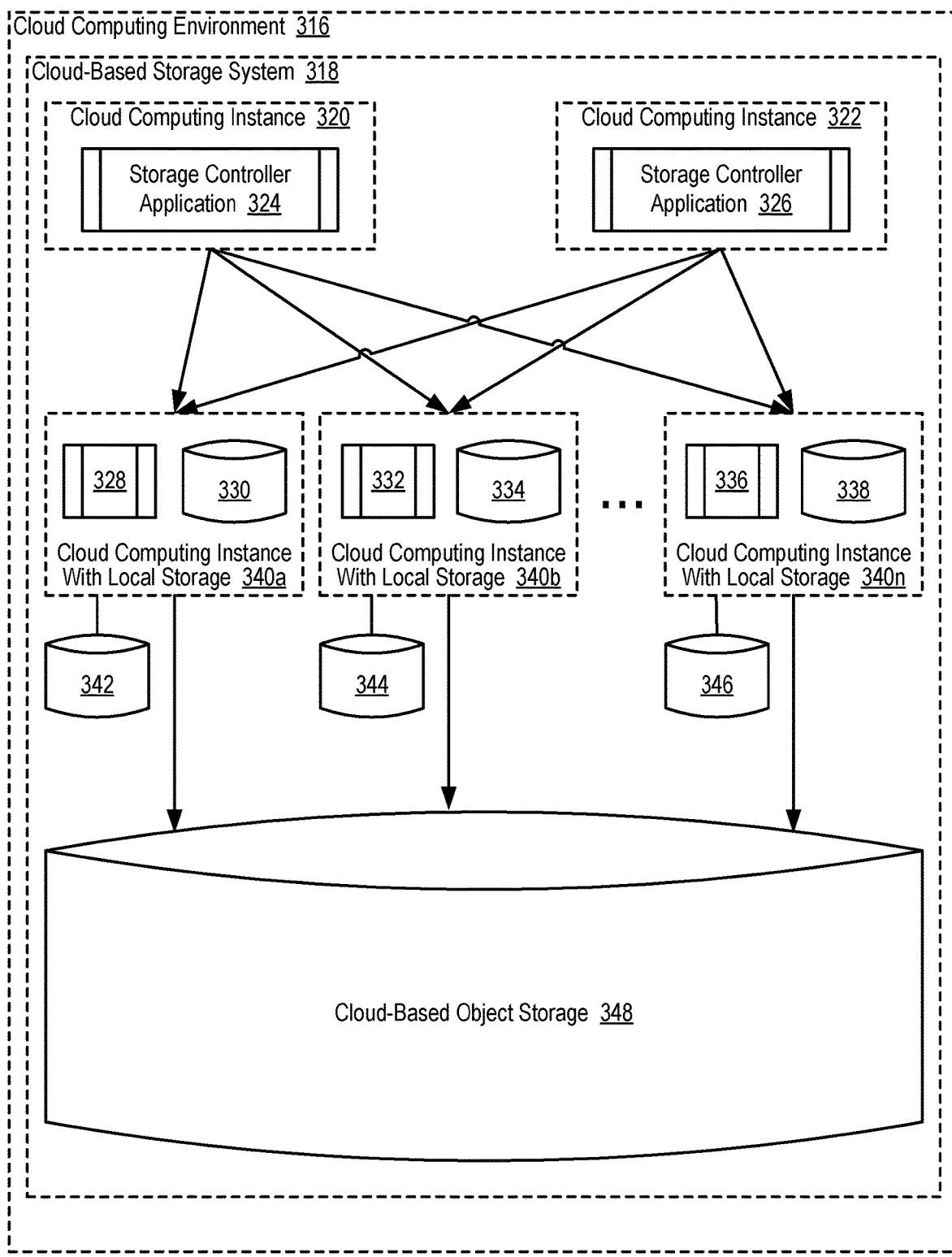
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS')™, Microsoft Azure™, Google Cloud Platform™, IBM Cloud™, Oracle Cloud™, and others. The cloud-based storage system 318 may be used to provide services similar to the services that may be provided by the storage systems described above.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. For example, each of the cloud computing instances 320, 322 may execute on an Azure VM, where each Azure VM may include high speed temporary storage that may be leveraged as a cache (e.g., as a read cache). In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data to the cloud-based storage system 318, erasing data from the cloud-based storage system 318, retrieving data from the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322 such as distinct EC2 instances.

Readers will appreciate that other embodiments that do not include a primary and secondary controller are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block storage 342, 344, 346 that is offered by the cloud computing environment 316 such as, for example, as Amazon Elastic Block Store ('EBS') volumes. In such an example, the block storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM. In yet another embodiment, high performance block storage resources such as one or more Azure Ultra Disks may be utilized as the NVRAM.

The storage controller applications 324, 326 may be used to perform various tasks such as deduplicating the data contained in the request, compressing the data contained in the request, determining where to write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

When a request to write data is received by a particular cloud computing instance 340a, 340b, 340n with local storage 330, 334, 338, the software daemon 328, 332, 336 may be configured to not only write the data to its own local storage 330, 334, 338 resources and any appropriate block storage 342, 344, 346 resources, but the software daemon 328, 332, 336 may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3'). In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348. In other embodiments, rather than using both the cloud computing instances 340a, 340b, 340n with local storage 330, 334, 338 (also referred to herein as 'virtual drives') and the cloud-based object storage 348 to store data, a persistent storage layer may be implemented in other ways. For example, one or more Azure Ultra disks may be used to persistently store data (e.g., after the data has been written to the NVRAM layer).

While the local storage 330, 334, 338 resources and the block storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. The software daemon 328, 332, 336 may therefore be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block storage 342, 344, 346 resources that are utilized by the cloud computing instances 340a, 340b, 340n is relatively straightforward as 5 blocks that are 1 MB in size are written to the local storage 330, 334, 338 resources and the block storage 342, 344, 346 resources that are utilized by the cloud computing instances 340a, 340b, 340n. In such an example, the software daemon 328, 332, 336 may also be configured to create five objects containing distinct 1 MB chunks of the data. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data). Readers will appreciate that the cloud-based object storage 348 may be incorporated into the cloud-based storage system 318 to increase the durability of the cloud-based storage system 318.

In some embodiments, all data that is stored by the cloud-based storage system 318 may be stored in both: 1) the cloud-based object storage 348, and 2) at least one of the local storage 330, 334, 338 resources or block storage 342, 344, 346 resources that are utilized by the cloud computing instances 340a, 340b, 340n. In such embodiments, the local storage 330, 334, 338 resources and block storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block storage 342, 344, 346 resources that are utilized by the cloud computing instances 340a, 340b, 340n.

One or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. For example, if the cloud computing instances 320, 322 that are used to support the execution of a storage controller application 324, 326 are undersized and not sufficiently servicing the I/O requests that are issued by users of the cloud-based storage system 318, a monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described in this disclosure may be useful for supporting various types of software applications. In fact, the storage systems may be 'application aware' in the sense that the storage systems may obtain, maintain, or otherwise have access to information describing connected applications (e.g., applications that utilize the storage systems) to optimize the operation of the storage system based on intelligence about the applications and their utilization patterns. For example, the storage system may optimize data layouts, optimize caching behaviors, optimize 'QoS' levels, or perform some other optimization that is designed to improve the storage performance that is experienced by the application.

As an example of one type of application that may be supported by the storage systems describe herein, the storage system 306 may be useful in supporting artificial intelligence ('AI') applications, database applications, XOps projects (e.g., DevOps projects, DataOps projects, MLOps projects, ModelOps projects, PlatformOps projects), electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson™, Microsoft Oxford™, Google Deep-Mind™, Baidu Minwa™, and others.

The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks, including the development of multi-layer neural networks, have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

In order for the storage systems described above to serve as a data hub or as part of an AI deployment, in some embodiments the storage systems may be configured to provide DMA between storage devices that are included in the storage systems and one or more GPUs that are used in an AI or big data analytics pipeline. The one or more GPUs may be coupled to the storage system, for example, via NVMe-over-Fabrics ('NVMe-oF') such that bottlenecks such as the host CPU can be bypassed and the storage system (or one of the components contained therein) can directly access GPU memory. In such an example, the storage systems may leverage API hooks to the GPUs to transfer data directly to the GPUs. For example, the GPUs may be embodied as Nvidia™ GPUs and the storage systems may support GPUDirect Storage ('GDS') software, or have similar proprietary software, that enables the storage system to transfer data to the GPUs via RDMA or similar mechanism.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains and derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics, including being leveraged as part of a composable data analytics pipeline where containerized analytics architectures, for example, make analytics capabilities more composable. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa™, Apple Siri™, Google Voice™, Samsung Bixby™, Microsoft Cortana™, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

The storage systems described above may also be configured to implement NVMe Zoned Namespaces. Through the use of NVMe Zoned Namespaces, the logical address space of a namespace is divided into zones. Each zone provides a logical block address range that must be written sequentially and explicitly reset before rewriting, thereby enabling the creation of namespaces that expose the natural boundaries of the device and offload management of internal mapping tables to the host. In order to implement NVMe Zoned Name Spaces ('ZNS'), ZNS SSDs or some other form of zoned block devices may be utilized that expose a namespace logical address space using zones. With the zones aligned to the internal physical properties of the device, several inefficiencies in the placement of data can be eliminated. In such embodiments, each zone may be mapped, for example, to a separate application such that functions like wear levelling and garbage collection could be performed on a per-zone or per-application basis rather than across the entire device. In order to support ZNS, the storage controllers described herein may be configured with to interact with zoned block devices through the usage of, for example, the Linux™ kernel zoned block device interface or other tools.

The storage systems described above may also be configured to implement zoned storage in other ways such as, for example, through the usage of shingled magnetic recording (SMR) storage devices. In examples where zoned storage is used, device-managed embodiments may be deployed where the storage devices hide this complexity by managing it in the firmware, presenting an interface like any other storage device. Alternatively, zoned storage may be implemented via a host-managed embodiment that depends on the operating system to know how to handle the drive, and only write sequentially to certain regions of the drive. Zoned storage may similarly be implemented using a host-aware embodiment in which a combination of a drive managed and host managed implementation is deployed.

The storage systems described herein may be used to form a data lake. A data lake may operate as the first place that an organization's data flows to, where such data may be in a raw format. Metadata tagging may be implemented to facilitate searches of data elements in the data lake, especially in embodiments where the data lake contains multiple stores of data, in formats not easily accessible or readable (e.g., unstructured data, semi-structured data, structured data). From the data lake, data may go downstream to a data warehouse where data may be stored in a more processed, packaged, and consumable format. The storage systems described above may also be used to implement such a data warehouse. In addition, a data mart or data hub may allow for data that is even more easily consumed, where the storage systems described above may also be used to provide the underlying storage resources necessary for a data mart or data hub. In embodiments, queries the data lake may require a schema-on-read approach, where data is applied to a plan or schema as it is pulled out of a stored location, rather than as it goes into the stored location.

The storage systems described herein may also be configured implement a recovery point objective ('RPO'), which may be establish by a user, established by an administrator, established as a system default, established as part of a storage class or service that the storage system is participating in the delivery of, or in some other way. A "recovery point objective" is a goal for the maximum time difference between the last update to a source dataset and the last recoverable replicated dataset update that would be correctly recoverable, given a reason to do so, from a continuously or frequently updated copy of the source dataset. An update is correctly recoverable if it properly takes into account all updates that were processed on the source dataset prior to the last recoverable replicated dataset update.

In synchronous replication, the RPO would be zero, meaning that under normal operation, all completed updates on the source dataset should be present and correctly recoverable on the copy dataset. In best effort nearly synchronous replication, the RPO can be as low as a few seconds. In snapshot-based replication, the RPO can be roughly calculated as the interval between snapshots plus the time to transfer the modifications between a previous already transferred snapshot and the most recent to-be-replicated snapshot.

If updates accumulate faster than they are replicated, then an RPO can be missed. If more data to be replicated accumulates between two snapshots, for snapshot-based replication, than can be replicated between taking the snapshot and replicating that snapshot's cumulative updates to the copy, then the RPO can be missed. If, again in snapshot-based replication, data to be replicated accumulates at a faster rate than could be transferred in the time between subsequent snapshots, then replication can start to fall further behind which can extend the miss between the expected recovery point objective and the actual recovery point that is represented by the last correctly replicated update.

The storage systems described above may also be part of a shared nothing storage cluster. In a shared nothing storage cluster, each node of the cluster has local storage and communicates with other nodes in the cluster through networks, where the storage used by the cluster is (in general) provided only by the storage connected to each individual node. A collection of nodes that are synchronously replicating a dataset may be one example of a shared nothing storage cluster, as each storage system has local storage and communicates to other storage systems through a network, where those storage systems do not (in general) use storage from somewhere else that they share access to through some kind of interconnect. In contrast, some of the storage systems described above are themselves built as a shared-storage cluster, since there are drive shelves that are shared by the paired controllers. Other storage systems described above, however, are built as a shared nothing storage cluster, as all storage is local to a particular node (e.g., a blade) and all communication is through networks that link the compute nodes together.

In other embodiments, other forms of a shared nothing storage cluster can include embodiments where any node in the cluster has a local copy of all storage they need, and where data is mirrored through a synchronous style of replication to other nodes in the cluster either to ensure that the data isn't lost or because other nodes are also using that storage. In such an embodiment, if a new cluster node needs some data, that data can be copied to the new node from other nodes that have copies of the data.

In some embodiments, mirror-copy-based shared storage clusters may store multiple copies of all the cluster's stored data, with each subset of data replicated to a particular set of nodes, and different subsets of data replicated to different sets of nodes. In some variations, embodiments may store all of the cluster's stored data in all nodes, whereas in other variations nodes may be divided up such that a first set of nodes will all store the same set of data and a second, different set of nodes will all store a different set of data.

Readers will appreciate that RAFT-based databases (e.g., etcd) may operate like shared-nothing storage clusters where all RAFT nodes store all data. The amount of data stored in a RAFT cluster, however, may be limited so that extra copies don't consume too much storage. A container server cluster might also be able to replicate all data to all cluster nodes, presuming the containers don't tend to be too large and their bulk data (the data manipulated by the applications that run in the containers) is stored elsewhere such as in an S3 cluster or an external file server. In such an example, the container storage may be provided by the cluster directly through its shared-nothing storage model, with those containers providing the images that form the execution environment for parts of an application or service.

Figure 3D:
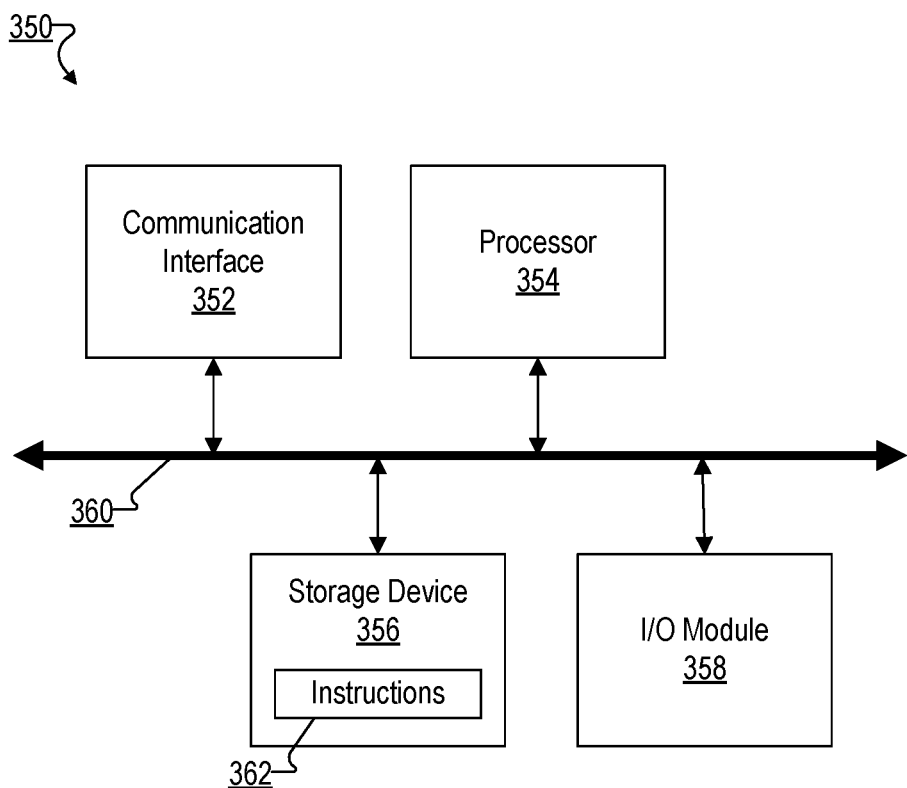
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 3E:
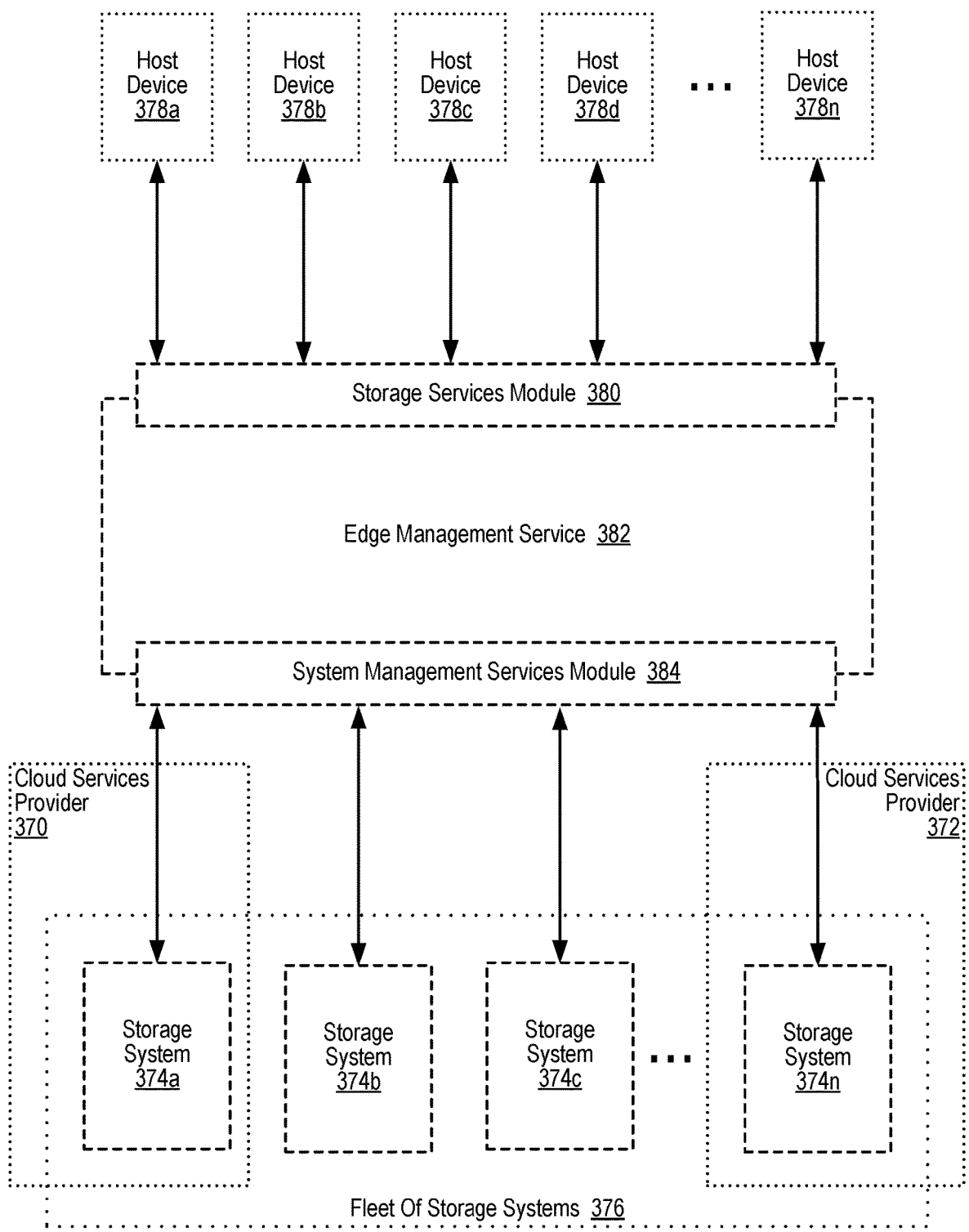
FIG. 3E illustrates an example of a fleet of storage systems for providing storage services in accordance with some embodiments of the present disclosure.

For further explanation, FIG. 3E illustrates an example of a fleet of storage systems 376 for providing storage services (also referred to herein as 'data services'). The fleet of storage systems 376 depicted in FIG. 3 includes a plurality of storage systems 374a, 374b, 374c, 374d, 374n that may each be similar to the storage systems described herein. The storage systems 374a, 374b, 374c, 374d, 374n in the fleet of storage systems 376 may be embodied as identical storage systems or as different types of storage systems. For example, two of the storage systems 374a, 374n depicted in FIG. 3E are depicted as being cloud-based storage systems, as the resources that collectively form each of the storage systems 374a, 374n are provided by distinct cloud services providers 370, 372. For example, the first cloud services provider 370 may be Amazon AWS™ whereas the second cloud services provider 372 is Microsoft Azure™, although in other embodiments one or more public clouds, private clouds, or combinations thereof may be used to provide the underlying resources that are used to form a particular storage system in the fleet of storage systems 376.

The example depicted in FIG. 3E includes an edge management service 382 for delivering storage services in accordance with some embodiments of the present disclosure. The storage services (also referred to herein as 'data services') that are delivered may include, for example, services to provide a certain amount of storage to a consumer, services to provide storage to a consumer in accordance with a predetermined service level agreement, services to provide storage to a consumer in accordance with predetermined regulatory requirements, and many others.

The edge management service 382 depicted in FIG. 3E may be embodied, for example, as one or more modules of computer program instructions executing on computer hardware such as one or more computer processors. Alternatively, the edge management service 382 may be embodied as one or more modules of computer program instructions executing on a virtualized execution environment such as one or more virtual machines, in one or more containers, or in some other way. In other embodiments, the edge management service 382 may be embodied as a combination of the embodiments described above, including embodiments where the one or more modules of computer program instructions that are included in the edge management service 382 are distributed across multiple physical or virtual execution environments.

The edge management service 382 may operate as a gateway for providing storage services to storage consumers, where the storage services leverage storage offered by one or more storage systems 374*a*, 374*b*, 374*c*, 374*d*, 374*n*. For example, the edge management service 382 may be configured to provide storage services to host devices 378*a*, 378*b*, 378*c*, 378*d*, 378*n* that are executing one or more applications that consume the storage services. In such an example, the edge management service 382 may operate as a gateway between the host devices 378*a*, 378*b*, 378*c*, 378*d*, 378*n* and the storage systems 374*a*, 374*b*, 374*c*, 374*d*, 374*n*, rather than requiring that the host devices 378*a*, 378*b*, 378*c*, 378*d*, 378*n* directly access the storage systems 374*a*, 374*b*, 374*c*, 374*d*, 374*n*.

The edge management service 382 of FIG. 3E exposes a storage services module 380 to the host devices 378*a*, 378*b*, 378*c*, 378*d*, 378*n* of FIG. 3E, although in other embodiments the edge management service 382 may expose the storage services module 380 to other consumers of the various storage services. The various storage services may be presented to consumers via one or more user interfaces, via one or more APIs, or through some other mechanism provided by the storage services module 380. As such, the storage services module 380 depicted in FIG. 3E may be embodied as one or more modules of computer program instructions executing on physical hardware, on a virtualized execution environment, or combinations thereof, where executing such modules causes enables a consumer of storage services to be offered, select, and access the various storage services.

The edge management service 382 of FIG. 3E also includes a system management services module 384. The system management services module 384 of FIG. 3E includes one or more modules of computer program instructions that, when executed, perform various operations in coordination with the storage systems 374*a*, 374*b*, 374*c*, 374*d*, 374*n* to provide storage services to the host devices 378*a*, 378*b*, 378*c*, 378*d*, 378*n*. The system management services module 384 may be configured, for example, to perform tasks such as provisioning storage resources from the storage systems 374*a*, 374*b*, 374*c*, 374*d*, 374*n* via one or more APIs exposed by the storage systems 374*a*, 374*b*, 374*c*, 374*d*, 374*n*, migrating datasets or workloads amongst the storage systems 374*a*, 374*b*, 374*c*, 374*d*, 374*n* via one or more APIs exposed by the storage systems 374*a*, 374*b*, 374*c*, 374*d*, 374*n*, setting one or more tunable parameters (i.e., one or more configurable settings) on the storage systems 374*a*, 374*b*, 374*c*, 374*d*, 374*n* via one or more APIs exposed by the storage systems 374*a*, 374*b*, 374*c*, 374*d*, 374*n*, and so on. For example, many of the services described below relate to embodiments where the storage systems 374*a*, 374*b*, 374*c*, 374*d*, 374*n* are configured to operate in some way. In such examples, the system management services module 384 may be responsible for using APIs (or some other mechanism) provided by the storage systems 374*a*, 374*b*, 374*c*, 374*d*, 374*n* to configure the storage systems 374*a*, 374*b*, 374*c*, 374*d*, 374*n* to operate in the ways described below.

In addition to configuring the storage systems 374*a*, 374*b*, 374*c*, 374*d*, 374*n*, the edge management service 382 itself may be configured to perform various tasks required to provide the various storage services. Consider an example in which the storage service includes a service that, when selected and applied, causes personally identifiable information ('PII') contained in a dataset to be obfuscated when the dataset is accessed. In such an example, the storage systems 374*a*, 374*b*, 374*c*, 374*d*, 374*n* may be configured to obfuscate PII when servicing read requests directed to the dataset. Alternatively, the storage systems 374*a*, 374*b*, 374*c*, 374*d*, 374*n* may service reads by returning data that includes the PII, but the edge management service 382 itself may obfuscate the PII as the data is passed through the edge management service 382 on its way from the storage systems 374*a*, 374*b*, 374*c*, 374*d*, 374*n* to the host devices 378*a*, 378*b*, 378*c*, 378*d*, 378*n*.

The storage systems 374*a*, 374*b*, 374*c*, 374*d*, 374*n* depicted in FIG. 3E may be embodied as one or more of the storage systems described above with reference to FIGS. 1A-3D, including variations thereof. In fact, the storage systems 374*a*, 374*b*, 374*c*, 374*d*, 374*n* may serve as a pool of storage resources where the individual components in that pool have different performance characteristics, different storage characteristics, and so on. For example, one of the storage systems 374*a* may be a cloud-based storage system, another storage system 374*b* may be a storage system that provides block storage, another storage system 374*c* may be a storage system that provides file storage, another storage system 374*d* may be a relatively high-performance storage system while another storage system 374*n* may be a relatively low-performance storage system, and so on. In alternative embodiments, only a single storage system may be present.

The storage systems 374*a*, 374*b*, 374*c*, 374*d*, 374*n* depicted in FIG. 3E may also be organized into different failure domains so that the failure of one storage system 374*a* should be totally unrelated to the failure of another storage system 374*b*. For example, each of the storage systems may receive power from independent power systems, each of the storage systems may be coupled for data communications over independent data communications networks, and so on. Furthermore, the storage systems in a first failure domain may be accessed via a first gateway whereas storage systems in a second failure domain may be accessed via a second gateway. For example, the first gateway may be a first instance of the edge management service 382 and the second gateway may be a second instance of the edge management service 382, including embodiments where each instance is distinct, or each instance is part of a distributed edge management service 382.

As an illustrative example of available storage services, storage services may be presented to a user that are associated with different levels of data protection. For example, storage services may be presented to the user that, when selected and enforced, guarantee the user that data associated with that user will be protected such that various recovery point objectives ('RPO') can be guaranteed. A first available storage service may ensure, for example, that some dataset associated with the user will be protected such that any data that is more than 5 seconds old can be recovered in the event of a failure of the primary data store whereas a second available storage service may ensure that the dataset that is associated with the user will be protected such that any data that is more than 5 minutes old can be recovered in the event of a failure of the primary data store.

An additional example of storage services that may be presented to a user, selected by a user, and ultimately applied to a dataset associated with the user can include one or more data compliance services. Such data compliance services may be embodied, for example, as services that may be provided to consumers (i.e., a user) the data compliance services to ensure that the user's datasets are managed in a way to adhere to various regulatory requirements. For example, one or more data compliance services may be offered to a user to ensure that the user's datasets are managed in a way so as to adhere to the General Data Protection Regulation ('GDPR'), one or data compliance services may be offered to a user to ensure that the user's datasets are managed in a way so as to adhere to the Sarbanes-Oxley Act of 2002 ('SOX'), or one or more data compliance services may be offered to a user to ensure that the user's datasets are managed in a way so as to adhere to some other regulatory act. In addition, the one or more data compliance services may be offered to a user to ensure that the user's datasets are managed in a way so as to adhere to some non-governmental guidance (e.g., to adhere to best practices for auditing purposes), the one or more data compliance services may be offered to a user to ensure that the user's datasets are managed in a way so as to adhere to a particular clients or organizations requirements, and so on.

Consider an example in which a particular data compliance service is designed to ensure that a user's datasets are managed in a way so as to adhere to the requirements set forth in the GDPR. While a listing of all requirements of the GDPR can be found in the regulation itself, for the purposes of illustration, an example requirement set forth in the GDPR requires that pseudonymization processes must be applied to stored data in order to transform personal data in such a way that the resulting data cannot be attributed to a specific data subject without the use of additional information. For example, data encryption techniques can be applied to render the original data unintelligible, and such data encryption techniques cannot be reversed without access to the correct decryption key. As such, the GDPR may require that the decryption key be kept separately from the pseudonymized data. One particular data compliance service may be offered to ensure adherence to the requirements set forth in this paragraph.

In order to provide this particular data compliance service, the data compliance service may be presented to a user (e.g., via a GUI) and selected by the user. In response to receiving the selection of the particular data compliance service, one or more storage services policies may be applied to a dataset associated with the user to carry out the particular data compliance service. For example, a storage services policy may be applied requiring that the dataset be encrypted prior to be stored in a storage system, prior to being stored in a cloud environment, or prior to being stored elsewhere. In order to enforce this policy, a requirement may be enforced not only requiring that the dataset be encrypted when stored, but a requirement may be put in place requiring that the dataset be encrypted prior to transmitting the dataset (e.g., sending the dataset to another party). In such an example, a storage services policy may also be put in place requiring that any encryption keys used to encrypt the dataset are not stored on the same system that stores the dataset itself. Readers will appreciate that many other forms of data compliance services may be offered and implemented in accordance with embodiments of the present disclosure.

Another example of storage services that may be presented to a user, selected by a user, and ultimately applied to a dataset associated with the user can include one or more high availability storage services. Such high availability storage services may be embodied, for example, as services that may be provided to consumers (i.e., a user) of the high availability storage services to ensure that the user's datasets are guaranteed to have a particular level of uptime (i.e., to be available a predetermined amount of time). For example, a first high availability storage service may be offered to a user to ensure that the user's dataset has three nine of availability, meaning that the dataset is available 99.9% of the time. A second high availability storage service may be offered, however, to a user to ensure that the user's dataset has five nines of availability, meaning that the dataset is available 99.999% of the time. Other high availability storage services may be offered that ensure other levels of availability. Likewise, the high availability storage services may also be delivered in such a way so as to ensure various levels of uptime for entities other than the dataset. For example, a particular high availability storage service may ensure that one or more virtual machines, one or more containers, one or more data access endpoints, or some other entity is available a particular amount of time.

Consider an example in which a particular high availability storage service is designed to ensure that the user's dataset has five nines of availability, meaning that the dataset is available 99.999% of the time. In such an example and in order to deliver on this uptime guarantee, one or more storage services policies that are associated with such a high availability storage service may be applied and enforced. For example, a storage services policy may be applied requiring that the dataset be mirrored across a predetermined number of storage systems, a storage services policy may be applied requiring that the dataset be mirrored across a predetermined number of availability zones in a cloud environment, a storage services policy may be applied requiring that the dataset be replicated in a particular way (e.g., synchronously replicated such that multiple up-to-date copies of the dataset exist), and so on.

Readers will appreciate that many other forms of high availability storage services may be offered and implemented in accordance with embodiments of the present disclosure. For example, such high availability storage services may be associated with storage services policies that not only guarantee that a particular number of copies of the dataset exist in order to protect against failures of the storage infrastructure (e.g., a failure of the storage system itself), but high availability storage services may also be associated with storage service policies that are designed to prevent the dataset from becoming unavailable for other reasons. For example, a high availability storage service may be associated with one or more storage services policies that require a particular level of redundancy in networking paths so that the availability to meet the uptime requirements associated with the dataset are not comprised by a lack of data communications paths to access the storage resources that contain the dataset. In other embodiments of the present disclosure, additional forms of high availability storage services may be offered and implemented.

Another example of storage services that may be presented to a user, selected by a user, and ultimately applied to a dataset associated with the user can include one or more disaster recovery services. Such disaster recovery services may be embodied, for example, as services that may be provided to consumers (i.e., a user) of the disaster recovery services to ensure that a user's dataset may be recovered in accordance with certain parameters in the event of a disaster. For example, a first disaster recovery service may be offered to a user to ensure that the user's dataset can be recovered in accordance with a first RPO and a first recovery time objective ('RTO') in the event that the storage system that stores the dataset fails, or some other form of disaster occurs that causes the dataset to become unavailable. A second disaster recovery service may be offered, however, to a user to ensure that the user's dataset can be recovered in accordance with a second RPO and a second RTO in the event that the storage system that stores the dataset fails, or some other form of disaster occurs that causes the dataset to become unavailable. Other disaster recovery services may be offered that ensure other levels of recoverability outside of the scope of RPO and RTO. Likewise, the disaster recovery services may also be delivered in such a way so as to ensure various levels of recoverability for entities other than the dataset. For example, a particular disaster recovery service may ensure that one or more virtual machines, one or more containers, one or more data access endpoints, or some other entity can be recovered in a certain amount of time or in accordance with some other metric. In this example, the disaster recovery services may be presented to a user, a selection of one or more selected disaster recovery services may be received, and the selected disaster recovery services may be applied to a dataset (or other entity) that is associated with the user.

Consider an example in which a particular disaster recovery service is designed to ensure that the user's dataset has an RPO and RTO of zero, meaning that the dataset must be immediately available with no loss of data in the event that a particular storage system that stores the dataset fails or some other form of disaster occurs. In such an example and in order to deliver on these RPO/RTO guarantees, one or more storage services policies that are associated with such a disaster recovery service may be applied and enforced. For example, a storage services policy may be applied requiring that the dataset be synchronously replicated across a predetermined number of storage systems, meaning that a request to modify the dataset can only be acknowledge as complete when all of the storage systems that include a copy of the dataset have modified the dataset in accordance with the request. Stated different, a modifying operation (e.g., a write) is either applied to all copies of the dataset that reside on the storage systems or to none of the copies of the dataset that reside on the storage systems, such that the failure of one storage system does not prevent a user from accessing the same, up-to-date copy of the dataset.

Readers will appreciate that many other forms of disaster recovery services may be offered and implemented in accordance with embodiments of the present disclosure. For example, such disaster recovery services may be associated with storage services policies that not only guarantee that a disaster can be recovered from in accordance with a particular RPO or RTO requirement, but disaster recovery services may also be associated with storage service policies that are designed to ensure that the dataset (or other entity) can be recovered to a predetermined location or system, disaster recovery services may also be associated with storage service policies that are designed to ensure that the dataset (or other entity) can be recovered at no more than a predetermined maximum cost, disaster recovery services may also be associated with storage service policies that are designed to ensure that specific actions are carried out in response to detecting a disaster (e.g., spinning up a clone of the failed system), and so on. In other embodiments of the present disclosure, additional forms of disaster recovery services may be offered and implemented.

Another example of storage services that may be presented to a user, selected by a user, and ultimately applied to a dataset associated with the user can include one or more data archiving services (including data offloading services). Such data archiving services may be embodied, for example, as services that may be provided to consumers (i.e., a user) of the data archiving services to ensure that the user's datasets are archived in a certain way, such as according to a certain set of preferences, parameters, and the like. For example, one or more data archiving services may be offered to a user to ensure that the user's datasets are archived when data has not been accessed in a predetermined period of time, when data has been invalid for a certain period of time, after the dataset reaches a certain size, when a storage system that stores the dataset has reached a predetermined utilization level, and so on.

Consider an example in which a particular data archiving service is designed to ensure that a portion of a user's dataset that have been invalidated (e.g., the portion has been replaced with an updated portion, the portion has been deleted) are archived within 24 hours of the data being invalidated. In order to provide this particular data archiving service, the data archiving service may be presented to a user (e.g., via a GUI) and selected by the user. In response to receiving the selection of the particular data archiving service, one or more storage services policies may be applied to a dataset associated with the user to carry out the particular data archiving service. For example, a storage services policy may be applied requiring that any operations that would cause data to be invalidated (e.g., an overwrite, a deletion) be cataloged and that every 12 hours a process examines the cataloged operations and migrates an invalidated data to an archive. Likewise, the storage services policy may place restrictions on processes such as garbage collection to prevent such processes from deleting data that has not yet been archived, if appropriate. Readers will appreciate that in this example, the data archiving service may operate in coordination with one or more data compliance services, as the requirement to archive data may be created by one or more regulations. For example, a user selecting a particular data compliance service that requires that certain data be retained for a predetermined period of time may automatically trigger a particular data archiving service that can deliver the required level of data archiving and retention. Likewise, some data archiving services may be incompatible with some data compliance services, such that a user may be prevented from selecting two conflicting or otherwise incompatible services.

Another example of storage services that may be presented to a user, selected by a user, and ultimately applied to a dataset associated with the user can include one or more quality-of-service ('QoS') storage services. Such QoS storage services may be embodied, for example, as services that may be provided to consumers (i.e., a user) of the data compliance services to ensure that the user's datasets can be accessed in accordance with predefined performance metrics. For example, a particular QoS storage service may guarantee that reads that are directed to the user's dataset can be serviced within a particular amount of time, that writes directed to the user's dataset can be serviced within a particular amount of time, that a user may be guaranteed a predetermined number of IOPS that are directed to the user's dataset, and so on.

Consider an example in which a particular QoS storage service is designed to ensure that a user's datasets can be accessed in a way such that read latencies and write latencies are guaranteed to be lower than a predetermined amount of time. In order to provide this particular QoS storage service, the QoS storage service may be presented to a user (e.g., via a GUI) and selected by the user. In response to receiving the selection of the particular QoS storage service, one or more storage services policies may be applied to a dataset associated with the user to carry out the particular QoS storage service. For example, a storage services policy may be applied requiring that the dataset be retained within storage that can be used to deliver the required read latencies and write latencies. For example, if the particular QoS storage service required relatively low read latencies and write latencies, the storage services policies associated with this particular QoS storage service may require that the user's dataset be stored in relatively high performance storage that is located relatively proximate to any hosts that issue I/O operations that are directed to the dataset.

Readers will appreciate that many other forms of QoS storage services may be offered and implemented in accordance with embodiments of the present disclosure. In fact, the QoS storage services may operate in coordination with one or more other storage services. For example, a particular QoS storage service may operate in coordination with a particular high availability storage service, as the QoS storage service may be associated with a particular availability requirement that can be implemented through the application of a particular high availability storage service. Likewise, a particular QoS storage service may operate in coordination with a particular data replication service, as the QoS storage service may be associated with a particular performance guarantee that can only be achieved by replicating (via a particular data replication service) the dataset to storage that is relatively close to the source of I/O operations that are directed to the dataset. Likewise, some QoS storage services may be incompatible with other storage services, such that a user may be prevented from selecting two conflicting or otherwise incompatible services.

Another example of storage services that may be presented to a user, selected by a user, and ultimately applied to a dataset associated with the user can include one or more data protection services. Such data protection services may be embodied, for example, as services that may be provided to consumers (i.e., a user) of the data protection services to ensure that the user's datasets are being protected and disseminated in certain way. For example, one or more data protection services may be offered to a user to ensure that the user's datasets are managed in a way so as to limit how personal data can be used or disseminated.

Consider an example in which a particular data protection service is designed to ensure that a user's datasets are not disseminated outside of a particular organization associated with the user. In order to provide this particular data protection service, the data protection service may be presented to a user (e.g., via a GUI) and selected by the user. In response to receiving the selection of the particular data protection service, one or more storage services policies may be applied to a dataset associated with the user to carry out the particular data protection service. For example, a storage services policy may be applied requiring that the dataset not be replicated, backed up, or otherwise stored in a public cloud such as Amazon AWS™. Likewise, a storage services policy may be applied that requires that certain credentials be provided in order to access the dataset such as, for example, credentials that can be used to verify that the requestor is an authorized member of the particular organization that is associated with the user.

Readers will appreciate that many other forms of data protection services may be offered and implemented in accordance with embodiments of the present disclosure. In fact, the data protection services may operate in coordination with one or more other storage services. For example, a particular data protection service may operate in coordination with one or more data compliance services, as the requirement to restrict the access to or sharing of data may be created by one or more regulations. For example, a user selecting a particular data compliance service that requires that certain data cannot be shared may automatically trigger a particular data protection service that can deliver the required level of data privacy. Likewise, some data protection services may be incompatible with some other storage services, such that a user may be prevented from selecting two conflicting or otherwise incompatible services.

Another example of storage services that may be presented to a user, selected by a user, and ultimately applied to a dataset associated with the user can include one or more virtualization management services (including container orchestration). Such virtualization management services may be embodied, for example, as services that may be provided to consumers (i.e., a user) of the virtualization management services to ensure that the user's virtualized resources are managed in accordance with predefined policies. For example, one or more virtualization management services may be offered to a user to ensure that the user's datasets can be presented in a way such that the dataset is accessible by one or more virtual machines or containers associated with the user, even when the underlying dataset resides within storage that may not be typically available to virtual machines or containers. For example, the virtualization management services may be configured to present the dataset as part of a virtual volume that is made available to a virtual machine, a container, or some other form of virtualized execution environment. In addition, the one or more virtualization management services may be offered to a user to ensure that the user's virtualized execution environments are backed up and can be restored in the event of a failure. For example, the virtualization management service may cause an image of a virtual machine to be restored and may capture state information associated with the virtual machine such that the virtual machine can be restored to its previous state if the virtual machine fails. In other embodiments, the virtualization management services may be used to manage the virtualized execution environments associated with the user and to provide storage resources to such virtualized execution environments.

Consider an example in which a particular virtualization management service is designed to provide persistent storage to a containerized application that otherwise would not be able to retain data beyond the life of the container itself, and that the data associated with a particular container would be retained for 24 hours after the container is destroyed. In order to provide this particular virtualization management service, one or more storage services policies may be applied to a dataset or virtualized environment associated with the user to carry out the particular virtualization management service. For example, a storage services policy may be applied that creates and configures a virtual volume that can be accessed by the container, where the virtual volume is backed by physical storage on a physical storage system. In such an example, once the container is destroyed, the storage services policy may also include rules that prevent a garbage collection process or some other process from deleting the contents of the physical storage on a physical storage system that was used to back the virtual volume for at least 24 hours.

Readers will appreciate that many other forms of virtualization management services may be offered and implemented in accordance with embodiments of the present disclosure. In fact, the virtualization management services may operate in coordination with one or more other storage services. For example, a particular virtualization management service may operate in coordination with one or more QoS storage services, as the virtualized environments (e.g., virtual machines, containers) that are given access to persistent storage via a virtualization management service may also have performance demands that can be satisfied through the enforcement of a particular QoS storage service. For example, a user selecting a particular QoS storage service that requires that a particular entity receive access to storage resources that can meet a particular performance requirement may trigger a particular virtualization management service when the entity is a virtualized entity. Likewise, some virtualization management services may be incompatible with some other storage services, such that a user may be prevented from selecting two conflicting or otherwise incompatible services.

Another example of storage services that may be presented to a user, selected by a user, and ultimately applied to a dataset associated with the user can include one or more fleet management services. Such fleet management services may be embodied, for example, as services that may be provided to consumers (i.e., a user) of the fleet management services to ensure that the user's storage resources (physical, cloud-based, and combinations thereof), and even related resources, are managed in a particular way. For example, one or more fleet management services may be offered to a user to ensure that the user's datasets are distributed across a fleet of storage systems in a way that best suits the performance needs associated with dataset. For example, a production version of a dataset may be placed on relatively high performance storage systems to ensure that the dataset can be accessed using relatively low latency operations (e.g., reads, writes), where a test/dev version of the dataset may be placed on relatively low performance storage systems as accessing the dataset using relatively high latency operations (e.g., reads, writes) may be permissible in a test/dev environment. In other examples, the one or more fleet management services may be offered to a user to ensure that the user's datasets are distributed in such a way so as to achieve load balancing goals where some storage systems are not overburdened while others are underutilized, to ensure that datasets are distributed in such a way so as to achieve high levels of data reduction (e.g., grouping similar datasets together in the hopes of achieving better data deduplication that would occur with a random distribution of the datasets), to ensure that datasets are distributed in such a way so as to adhere to data compliance regulations, and so on.

Consider an example in which a particular fleet management service is designed to ensure that a user's datasets are distributed in such a way so as to place the datasets on storage systems that are physically closest to the host that most frequently accesses the datasets. In order to provide this particular fleet management service, one or more storage services policy may be applied requiring that the location of the host that most frequently accesses a particular dataset be taken into consideration when placing the dataset. Furthermore, the one or more storage services policy that may be applied may further require that if a different host becomes the host that most frequently accesses the particular dataset, the particular dataset should be replicated to a storage system that is most physically proximate to the different host.

Readers will appreciate that many other forms of fleet management services may be offered and implemented in accordance with embodiments of the present disclosure. In fact, the fleet management services may operate in coordination with one or more other storage services. For example, a particular fleet management service may operate in coordination with one or more data compliance services, as the ability to move datasets in such a way may be limited by a regulatory requirement that is being enforced by one or more data compliance services. For example, a user selecting a particular data compliance service that restricts the ability to move a dataset around may cause a particular fleet management service to only take into consideration target storage systems that a dataset could be moved to without violating a policy enforced by a selected data compliance service when the fleet management system is evaluating where a dataset that resides on a source storage system should be moved to in pursuit of some fleet management objective. Likewise, some fleet management services may be incompatible with some other storage services, such that a user may be prevented from selecting two conflicting or otherwise incompatible services.

Another example of storage services that may be presented to a user, selected by a user, and ultimately applied to a dataset associated with the user can include one or more cost optimization services. Such cost optimization services may be embodied, for example, as services that may be provided to consumers (i.e., a user) of the cost optimization services to ensure that the user's datasets, storage systems, and other resources are managed in a way so as to minimize the cost to the user. For example, one or more cost optimization services may be offered to a user to ensure that the user's datasets are being replicated in a way that minimizes the costs (e.g., as measured in terms of dollars) associated with replicating data from a source storage system to any of a plurality of available target storage systems, to ensure that the user's datasets are being managed in a way that minimizes the costs associated with storing the dataset, to ensure that the user's storage systems or other resources are being managed in such a way so as to reduce the power consumption costs associated with operation the storage systems or other resources, or in other ways, including ensuring the user's datasets, storage systems, or other resources are being managed to as to minimize or reduce the cumulative costs of multiple expenses associated with the datasets, storage systems, or other resources. In addition, the one or more cost optimization services may even take into consideration contractual costs such as, for example, a financial penalty associated with violating a service level agreement associated with a particular user. In fact, the costs associated with performing an upgrade or performing some other action may also be taken into consideration, along with many other forms of costs that can be associated with providing storage services and data solutions to customers.

Consider an example in which a particular cost optimization services is designed to ensure that a user's datasets being managed in such a way that the cost to store the datasets are minimized, in spite of the fact that the user has a separate requirement that the dataset be stored within a local, on-premises storage system and also mirrored to at least one other storage resource. For example, the dataset can be mirrored to the cloud or mirrored to an off-site storage system. In order to provide this particular cost optimization service, a storage services policy may be applied requiring that, for each possible replication target, the costs associated with transmitting the dataset to the replication target and the costs associated with storing the dataset on the replication target must be taken into consideration. In such an example, enforcing such a storage services policy may result in the dataset being mirrored to the replication target with the lowest expected costs.

Readers will appreciate that many other forms of cost optimization services may be offered and implemented in accordance with embodiments of the present disclosure. In fact, the cost optimization services may operate in coordination with one or more other storage services. For example, a particular cost optimization service may operate in coordination with one or more QoS storage services, as the ability to store a dataset within a particular storage resource may be limited by performance requirements that are associated with QoS storage services. For example, a user selecting a particular QoS storage service that creates a requirement that the dataset must be accessible within certain latency maximums, may restrict the ability of the cost optimization service to consider all possible storage resources as a possible location where the dataset can be stored, as some storage resources (or combination of storage resources and other resources such as networking resources required to access the storage resources) may not be capable of delivering the level of performance required by the QoS storage service. As such, the particular cost optimization service may only take into consideration target storage systems that a dataset could reside within and still be accessed in accordance with the requirements of the QoS storage service that has been selected for the dataset. Likewise, some cost optimization services may be incompatible with some other storage services, such that a user may be prevented from selecting two conflicting or otherwise incompatible services.

Another example of storage services that may be presented to a user, selected by a user, and ultimately applied to a dataset associated with the user can include one or more workload placement services. Such workload placement services may be embodied, for example, as services that may be provided to consumers (i.e., a user) of the workload placement services to ensure that the user's datasets are managed in a way to adhere to various requirements related to where data is stored within a system that includes different storage resources. For example, one or more workload placement services may be offered to a user to ensure that the user's datasets are managed in a way so as to load balance accesses to data across the different storage resources, to ensure that the user's datasets are managed in a way so as to optimize a particular performance metric (e.g., read latency, write latency, data reduction) for selected datasets, to ensure that the user's datasets are managed in a way such that mission critical datasets are unlikely to be unavailable or subjected to relatively long access times, and so on.

Consider an example in which a particular workload placement service is designed to achieve a predetermined load balancing objective across three on-premises storage systems that are associated with a particular user. In order to provide this particular workload placement services, a storage services policy may be applied requiring that three storage systems be regularly monitored to ensure that each storage system is servicing relatively similar number of IOPS and also storing a relatively similar amount of data. In such an example, if a first storage system is storing a relatively large amount of data but servicing a relatively small number of IOPS relative to the third storage system, enforcing a storage services policy associated with the particular workload placement service may result in moving a relatively large (in terms of GB, for example) but infrequently accessed dataset on the first storage system to the third storage system, as well as moving a relatively small (in terms of GB) but frequently accessed dataset that is stored on the third storage system to the first storage system—all in pursuit of ensuring that each storage system is servicing relatively similar number of IOPS and also storing a relatively similar amount of data.

Readers will appreciate that many other forms of workload placement services may be offered and implemented in accordance with embodiments of the present disclosure. In fact, the workload placement services may operate in coordination with one or more other storage services. For example, a particular workload placement service may operate in coordination with one or more QoS storage services, as the ability to store a dataset within a particular storage resource may be limited by performance requirements that are associated with QoS storage services. For example, a user selecting a particular QoS storage service that creates a requirement that the dataset must be accessible within certain latency maximums, may restrict the ability of the workload placement service to load balance across storage resources, as some storage resources (or combination of storage resources and other resources such as networking resources required to access the storage resources) may not be capable of delivering the level of performance required by the QoS storage service. As such, the particular workload placement service may only take into consideration target storage systems that a dataset could reside within and still be accessed in accordance with the requirements of the QoS storage service that has been selected for the dataset. Likewise, some workload placement services may be incompatible with some other storage services, such that a user may be prevented from selecting two conflicting or otherwise incompatible services.

Another example of storage services that may be presented to a user, selected by a user, and ultimately applied to a dataset associated with the user can include one or more dynamic scaling services. Such dynamic scaling services may be embodied, for example, as services that may be provided to consumers (i.e., a user) of the dynamic scaling services to ensure scale up and down storage resources associated with a user's datasets as needed. For example, one or more dynamic scaling services may be offered to a user to ensure that the user's datasets and storage resources are managed in a way so as to meet various objectives that can be achieved by scaling measures.

Consider an example in which a particular dynamic scaling service is designed to ensure that a user's mission critical datasets are managed in a way such that the datasets do not reside on any storage resource that is more than 85% utilized in terms of storage capacity or IOPS capacity. In order to provide this particular dynamic scaling service, a storage services policy may be applied requiring that: 1) a storage resource be scaled up (if possible) once this utilization threshold is hit, or 2) workloads be rearranged once this threshold is hit in order to bring the storage resources that store the mission critical dataset below 75% in terms of storage capacity and IOPS capacity. For example, if a dataset resides in a cloud-based storage system as described above, the cloud-based storage system may be scaled by adding additional virtual drives (i.e., cloud-computing instances with local storage), the cloud-based storage system may be scaled by using higher performance cloud computing instances to execute the storage controller applications, and so on. Alternatively, if the dataset resides on a physical storage system that cannot be immediately scaled, some datasets may be migrated off of the physical storage system until utilization levels are acceptable.

Readers will appreciate that many other forms of dynamic scaling services may be offered and implemented in accordance with embodiments of the present disclosure. In fact, the dynamic scaling services may operate in coordination with one or more other storage services. For example, a particular dynamic scaling service may operate in coordination with one or more QoS storage services, as the ability to provide certain levels of performance as required by the QoS storage service may be dependent upon having properly scaled storage resources (or other resources). For example, a user selecting a particular QoS storage service that creates a requirement that the dataset must be accessible within certain latency maximums, may immediately trigger one or more dynamic scaling services required to scale resources in a way that the latency targets can be met. Likewise, some dynamic scaling services may be incompatible with some other storage services, such that a user may be prevented from selecting two conflicting or otherwise incompatible services.

Another example of storage services that may be presented to a user, selected by a user, and ultimately applied to a dataset associated with the user can include one or more performance optimization services. Such performance optimization services may be embodied, for example, as services that may be provided to consumers (i.e., a user) of the performance optimization services to ensure that the user's datasets, storage resources, and other resources are managed in a way to maximize performance as measured by a variety of possible metrics. For example, one or more performance optimization services may be offered to a user to ensure that the user's storage resources are being maximized in terms of the collective amount of IOPS that may be service, to ensure that life of different storage resources are being maximized through the application of wear leveling policies, by ensuring that the users storage resources are being managed so as to minimize total power consumption, by ensuring that the users storage resources are being managed to ensure uptime of the resources, or in other ways. Likewise, the one or more performance optimization services may be offered to a user to ensure that the user's dataset are accessible in accordance with various performance objectives. For example, the user's datasets may be managed so as to offer the best performance in terms of IOPS for particular datasets, the user's datasets may be managed so as to offer the best performance in terms of data reduction for particular datasets, the user's datasets may be managed so as to offer the best performance in terms of availability for particular datasets, or in some other way.

Consider an example in which a particular performance optimization service is designed to ensure that a user's storage resources are managed in a way so as to maximize the amount of data that may be collectively stored on the storage resources collectively. For example, a storage services policy may be applied requiring that certain types of data be stored on storage resources that implement compression method that are likely to achieve the best data compression results. For example, if one storage system utilizes compression algorithms that are more effective at compressing text data and a second storage system utilizes compression algorithms that are more effective at compressing video data, implementing the storage services policies may result in video data being stored on the second storage system and text data being stored on the first storage system. Likewise, a storage services policy may be applied that requires that data from similar host applications be stored in the same storage resources in order to improve the level of data deduplication that may be achieved. For example, if data from database application can be more effectively deduplicated when deduplicated against data from other database applications and data from an image processing application can be more effectively deduplicated when deduplicated against data from other image processing applications, implementing the storage services policies may result in all data from database applications being stored on a first storage system and all data from image processing applications being stored on a second storage system, in pursuit of better deduplication ratios than would achieve by storing data from each type of application on the same storage system. By achieving better data reduction ratios in the backend storage systems, more data can be stored in the storage resources from the perspective of the user.

For example, using the compression example described above, if a first storage system can compress some data from an uncompressed size of 1 TB to a compressed size of 300 GB whereas a second storage system can only compress that same 1 TB of data to a compressed size of 600 GB (because the storage systems use different compression algorithms), the amount of storage that is available from the user's perspective looks different as storing the data on the second storage system requires consuming an additional 300 GB of storage from a backend pool of storage systems whose physical capacity is fixed (whereas their logical capacity can be improved through intelligent placement of data).

Readers will appreciate that many other forms of performance optimization services may be offered and implemented in accordance with embodiments of the present disclosure. In fact, the performance optimization services may operate in coordination with one or more other storage services. For example, a particular performance optimization service may operate in coordination with one or more QoS storage services, as the ability to provide certain levels of performance as required by the QoS storage service may restrict the ability to place datasets on particular storage resources. For example, if a user selects a particular QoS storage service that creates a requirement that the dataset must be accessible within certain latency maximums but also selects a particular performance optimization service designed to maximize logical storage capacity, only those storage resources that can satisfy both requirements may be candidates for receiving the dataset, even if other storage resources can provide for better results with respect to one service (while not able to meet the requirements of another service). For example, a dataset may not be able to be placed on a particular storage system that can only offer relatively high I/O latencies (because placing the dataset in such a way would cause the QoS policy to be violated) even if that particular storage systems may be able to perform excellent data compression of the dataset by virtue of supporting a compression algorithm that is highly efficient for that dataset. As such, some performance optimization services may be incompatible with some other storage services, such that a user may be prevented from selecting two conflicting or otherwise incompatible services.

Another example of storage services that may be presented to a user, selected by a user, and ultimately applied to a dataset associated with the user can include one or more network connectivity services. Such network connectivity services may be embodied, for example, as services that may be provided to consumers (i.e., a user) of the network connectivity services to ensure that the user's datasets, storage resources, networking resources, and other resources are managed in a way to adhere to various connectivity requirements. For example, one or more network connectivity services may be offered to a user to ensure that the user's datasets are reachable via a predetermined number of networking paths that are not reliant on any shared hardware or software components. Likewise, the one or more network connectivity services may be offered to a user to ensure that the user's datasets are managed in a way so as to only be reachable via secure data communications channels, by ensuring that a user's datasets are managed in a way so as to inform host applications of the optimal data communications path for accessing the dataset, to ensure that storage resources that store the user's dataset can communicate over data communications paths that meet certain requirements, and many others.

Consider an example in which a particular network connectivity service is designed to ensure that a user's datasets are reachable via a predetermined number of networking paths that are not reliant on any shared hardware or software components. For example, a storage services policy may be applied requiring that the dataset reside on at least two distinct storage resources (e.g., two distinct storage systems) that can be reachable from an application host or other device that accesses the dataset via distinct data communications networks. To that end, applying the storage services policy may cause the dataset to be replicated from one storage resource to another, applying the storage services policy may cause a mirroring mechanism to be activated to ensure that the dataset resided on both storage resources, or some other mechanism may be used to enforce the policy.

Readers will appreciate that many other forms of network connectivity services may be offered and implemented in accordance with embodiments of the present disclosure. In fact, the network connectivity services may operate in coordination with one or more other storage services. For example, a particular network connectivity services may operate in coordination with one or more replication services, QoS services, data compliance services, and other services as the ability to place datasets in such a way so as to adhere to a particular network connectivity service may be limited based on the ability to replicate the dataset in accordance with the replication service, and further based on the ability to meet the performance requirements guaranteed by a QoS service, and still further based on the ability to place datasets in order to adhere to one or more data compliance services. For example, in the example set forth above where the network connectivity service required that the dataset reside on at least two distinct storage resources (e.g., two distinct storage systems) that can be reachable from an application host or other device that accesses the dataset via distinct data communications networks, a combination of storage resources could only be selected if the other services could also be provided. In some embodiments, if two storage resources that could not deliver on all of the selected services were not available, the user could be prompted to remove some selected service, a best fit algorithm could be used to select the two storage systems that came closest to being able to deliver the selected services, or some other action could be taken. As such, some network connectivity services may be incompatible with some other storage services, such that a user may be prevented from selecting two conflicting or otherwise incompatible services.

Another example of storage services that may be presented to a user, selected by a user, and ultimately applied to a dataset associated with the user can include one or more data analytic services. Such data analytic services may be embodied, for example, as services that may be provided to consumers (i.e., a user) of the data analytic services to provide data analytics capabilities to a user's datasets, storage resources, and other resources. For example, one or more data analytic services may be offered that analyze the contents of a user's dataset, that cleanse the contents of the user's dataset, that perform data collection operations to create or augment a user's datasets, and so on.

Readers will appreciate that many other forms of data analytic services may be offered and implemented in accordance with embodiments of the present disclosure. In fact, the data analytic services may operate in coordination with one or more other storage services. For example, a particular data analytic services may operate in coordination with one or more QoS storage services, such that accesses to the dataset for the purposes of performing data analytics may be given lower priority than more traditional accesses of the data (e.g., user-initiated reads and writes) in order to avoid violating the performance guarantees set forth in the QoS storage service. As such, some data analytic services may be incompatible with some other storage services, such that a user may be prevented from selecting two conflicting or otherwise incompatible services.

Another example of storage services that may be presented to a user, selected by a user, and ultimately applied to a dataset associated with the user can include one or more data portability services. Such data portability services may be embodied, for example, as services that may be provided to consumers (i.e., a user) of the data portability services to allow the user to perform various data movement, data conversion, or similar processes on the user's datasets. For example, one or more data portability services may be offered to a user to allow the user to migrate their datasets from one storage resource to another storage resources, to allow the user to convert their dataset from one format (e.g., block data) to another format (e.g., object data), to allow the user to consolidate data, to allow the user to transfer their datasets from one data controller (e.g., a first cloud-services vendor) to another data controller (e.g., a second cloud-services vendor), to allow the users to convert their dataset from being compliant with a first set of regulations to being compliant with a second set of regulations, and so on.

Consider an example in which a particular data portability service is designed to allow the user to transfer their datasets from a first data controller (e.g., a first cloud-services vendor) to a second data controller (e.g., a second cloud-services vendor). In order to provide this particular data portability service, a storage services policy may be applied that causes the dataset to periodically be converted to be compatible with the second data controller's infrastructure. Readers will appreciate that many other forms of data portability services may be offered and implemented in accordance with embodiments of the present disclosure. In fact, the data portability services may operate in coordination with one or more other storage services. For example, a particular data portability service may operate in coordination with one or more data compliance services, such that migration of a dataset from a first data controller to a second data controller may be restricted so as to not cause the user to violate a regulatory compliance set forth in the one or more data compliances services. As such, some data portability services may be incompatible with some other storage services, such that a user may be prevented from selecting two conflicting or otherwise incompatible services.

Another example of storage services that may be presented to a user, selected by a user, and ultimately applied to a dataset associated with the user can include one or more upgrade management services. Such upgrade management services may be embodied, for example, as services that may be provided to consumers (i.e., a user) of the data compliance services to ensure that the user's datasets, storage resources, and other resources can be upgraded or kept up-to-date as various updates become available. For example, one or more upgrade management services may be offered to a user to ensure that the user's storage resources are upgrade upon the occurrence of certain thresholds (e.g., age, utilization), to ensure that system software is upgrades as patches and new releases become available, to upgrade cloud components are new cloud service offerings become available, to ensure that storage related resources such as file systems are upgraded as upgrades or updates become available, and so on.

Consider an example in which a particular upgrade management service is designed to ensure that a user's storage resources managed in a way so as to guarantee that new software updates to a user's storage systems are applied as new software updates become available. In order to provide this particular upgrade management service, a storage services policy may be applied requiring a storage system periodically check for updates, download any updates, and install updates within 24 hours of the update becoming available. Readers will appreciate that many other forms of upgrade management services may be offered and implemented in accordance with embodiments of the present disclosure. In fact, the upgrade management services may operate in coordination with one or more other storage services. For example, a particular upgrade management service may operate in coordination with one or more QoS services, such that updates or upgrades are only applied at times when QoS requirements can be maintained by the resources being upgraded or by some other resource. As such, some upgrade management services may be incompatible with some other storage services, such that a user may be prevented from selecting two conflicting or otherwise incompatible services.

Another example of storage services that may be presented to a user, selected by a user, and ultimately applied to a dataset associated with the user can include one or more data security services. Such data security services may be embodied, for example, as services that may be provided to consumers (i.e., a user) of the data security services to ensure that the user's datasets, storage resources, and other resources are managed in a way to adhere to various security requirements. For example, one or more data security services may be offered to a user to ensure that the user's datasets are encrypted in accordance with certain standards both at rest (when stored on a storage resource) and in transit such that end-to-end encryption is achieved. In fact, the one or more data security services may include guarantees describing how data will be protected at rest, guarantees describing how data will be protected in transit, guarantees describing private/public key systems that will be used, guarantees describing how access to the datasets or resources will be restricted, and so on.

Consider an example in which a particular data security service is designed to guarantee that a dataset that is stored on a particular storage resource will be encrypted using keys that are maintained on resources other than the storage resource such as, for example, a key server. In order to provide this particular data security service, a storage services policy may be applied requiring that the storage resource requests a key from the key server, encrypts the dataset (or any unencrypted portion thereof), and delete the encryption key each time that the dataset is modified (e.g., via a write). Likewise, in order to service reads, the storage resource may need to request a key from the key server, decrypt the dataset, and delete the encryption key. Readers will appreciate that many other forms of data security services may be offered and implemented in accordance with embodiments of the present disclosure. In fact, the data security services may operate in coordination with one or more other storage services. For example, a particular data security service may operate in coordination with one or more QoS services, such that only certain QoS services may be made available when a particular data security service is selected, as the requirement to perform various security functions may limit the extent to which high performance guarantees can be made. As such, some data security service may be incompatible with some other storage services, such that a user may be prevented from selecting two conflicting or otherwise incompatible services.

Another example of storage services that may be presented to a user, selected by a user, and ultimately applied to a dataset associated with the user can include one or more converged system management services. Such converged system management services may be embodied, for example, as services that may be provided to consumers (i.e., a user) of the converged system management services to ensure that the user's datasets, storage resources, and other resources in a converged system are managed in a way to adhere to some policies. For example, one or more converged system management services may be offered to a user to ensure that a converged infrastructure that includes storage resources and one or more GPU servers that are designed for AI/ML applications can be managed in a certain way. Likewise, one or more converged system management services may be offered to a user to ensure that a converged infrastructure that includes storage resources and on-premises cloud infrastructures (e.g., an Amazon Outpost) may be managed in a certain way. For example, the one or more converged system management services may guarantee that I/O operations that are directed to storage resources and were initiated by the GPU servers in the converged infrastructure described above will be prioritized over I/O operations initiated by devices that are external to the converged infrastructure. Readers will appreciate that many other forms of converged system management services may be offered and implemented in accordance with embodiments of the present disclosure. In fact, the converged system management services may operate in coordination with one or more other storage services. As such, some converged system management services may be incompatible with some other storage services, such that a user may be prevented from selecting two conflicting or otherwise incompatible services.

Another example of storage services that may be presented to a user, selected by a user, and ultimately applied to a dataset associated with the user can include one or more application development services. Such application development services may be embodied, for example, as services that may be provided to consumers (i.e., a user) of the data compliance services to facilitate the development and testing of applications, as well as carry out any other aspects of the application development and testing cycle. For example, one or more application development services may be offered to a user to that enable the user to quickly create clones of production datasets for development purposes, to create a clone of a production dataset that has personally identified information obfuscated, to spin up additional virtual machines or containers for testing, to manage all of the connectivity required between test execution environments and the dataset that such environments utilize, and so on. In order to provide for such application development services, one or more storage services policies may be applied to a dataset associated with the user to carry out the particular application development service. For example, a storage services policy may be applied that, upon user request, creates a clone of a production dataset, where personally identifiable information in the dataset obfuscated in the clone, and subsequently stores the clone on a storage resource that is available for development and testing operations.

Readers will appreciate that many other forms of application development services may be offered and implemented in accordance with embodiments of the present disclosure. In fact, the application development services may operate in coordination with one or more other storage services. For example, a particular application development services may operate in coordination with one or more replication policies, such that clones of a production dataset may only be sent to non-production environments (e.g., to a development and test environment). As such, some application development services may be incompatible with some other storage services, such that a user may be prevented from selecting two conflicting or otherwise incompatible services.

Readers will appreciate that while examples were given above in which a user may select multiple services and that compatibility may need to be established between the selected services, there are many other combinations of services (as well as individual services) that may be presented to a user, selected by a user (where such a selection is received by one or more edge management service 406 or similar mechanism), and ultimately applied to a dataset, storage resource, or some other resource associated with the user. Readers will further appreciate that many of the example storage services described above (and other services) may include some level of overlap and may also be associated with similar, related, or even identical storage services policies.

Readers will further appreciate that various mechanisms may be used to attach one or more storage services policies to a particular dataset. For example, metadata may be attached to the dataset that identifies particular storage services policies that the dataset is subject to. Alternatively, a centralized repository may be maintained that associates identifiers of each dataset with the storage services policies that the dataset is subjected to. Likewise, various devices may maintain information describing datasets that they handle. For example, a storage system may maintain information describing storage services policies that each dataset that is stored within the storage system is subjected to, networking equipment may maintain information describing storage services policies that each dataset that passes through the networking equipment is subjected to, and so on. Alternatively, such information may be maintained elsewhere and may be accessible to the various devices. In other embodiments, other mechanisms may be used to attach one or more storage services policies to a particular dataset.

The storage systems 374a, 374b, 374c, 374d, 374n in the fleet of storage systems 376 may be managed collectively, for example, by one or more fleet management modules. The fleet management modules may be part of or separate from the system management services module 384 depicted in FIG. 3E. The fleet management modules may perform tasks such as monitoring the health of each storage system in the fleet, initiating updates or upgrades on one or more storage systems in the fleet, migrating workloads for loading balancing or other performance purposes, and many other tasks. As such, and for many other reasons, the storage systems 374a, 374b, 374c, 374d, 374n may be coupled to each other via one or more data communications links in order to exchange data between the storage systems 374a, 374b, 374c, 374d, 374n.

The storage systems described herein may support various forms of data replication. For example, two or more of the storage systems may synchronously replicate a dataset between each other. In synchronous replication, distinct copies of a particular dataset may be maintained by multiple storage systems, but all accesses (e.g., a read) of the dataset should yield consistent results regardless of which storage system the access was directed to. For example, a read directed to any of the storage systems that are synchronously replicating the dataset should return identical results. As such, while updates to the version of the dataset need not occur at exactly the same time, precautions must be taken to ensure consistent accesses to the dataset. For example, if an update (e.g., a write) that is directed to the dataset is received by a first storage system, the update may only be acknowledged as being completed if all storage systems that are synchronously replicating the dataset have applied the update to their copies of the dataset. In such an example, synchronous replication may be carried out through the use of I/O forwarding (e.g., a write received at a first storage system is forwarded to a second storage system), communications between the storage systems (e.g., each storage system indicating that it has completed the update), or in other ways.

In other embodiments, a dataset may be replicated through the use of checkpoints. In checkpoint-based replication (also referred to as 'nearly synchronous replication'), a set of updates to a dataset (e.g., one or more write operations directed to the dataset) may occur between different checkpoints, such that a dataset has been updated to a specific checkpoint only if all updates to the dataset prior to the specific checkpoint have been completed. Consider an example in which a first storage system stores a live copy of a dataset that is being accessed by users of the dataset. In this example, assume that the dataset is being replicated from the first storage system to a second storage system using checkpoint-based replication. For example, the first storage system may send a first checkpoint (at time t=0) to the second storage system, followed by a first set of updates to the dataset, followed by a second checkpoint (at time t=1), followed by a second set of updates to the dataset, followed by a third checkpoint (at time t=2). In such an example, if the second storage system has performed all updates in the first set of updates but has not yet performed all updates in the second set of updates, the copy of the dataset that is stored on the second storage system may be up-to-date until the second checkpoint. Alternatively, if the second storage system has performed all updates in both the first set of updates and the second set of updates, the copy of the dataset that is stored on the second storage system may be up-to-date until the third checkpoint. Readers will appreciate that various types of checkpoints may be used (e.g., metadata only checkpoints), checkpoints may be spread out based on a variety of factors (e.g., time, number of operations, an RPO setting), and so on.

In other embodiments, a dataset may be replicated through snapshot-based replication (also referred to as 'asynchronous replication'). In snapshot-based replication, snapshots of a dataset may be sent from a replication source such as a first storage system to a replication target such as a second storage system. In such an embodiment, each snapshot may include the entire dataset or a subset of the dataset such as, for example, only the portions of the dataset that have changed since the last snapshot was sent from the replication source to the replication target. Readers will appreciate that snapshots may be sent on-demand, based on a policy that takes a variety of factors into consideration (e.g., time, number of operations, an RPO setting), or in some other way.

The storage systems described above may, either alone or in combination, by configured to serve as a continuous data protection store. A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

Although some embodiments are described largely in the context of a storage system, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 4:
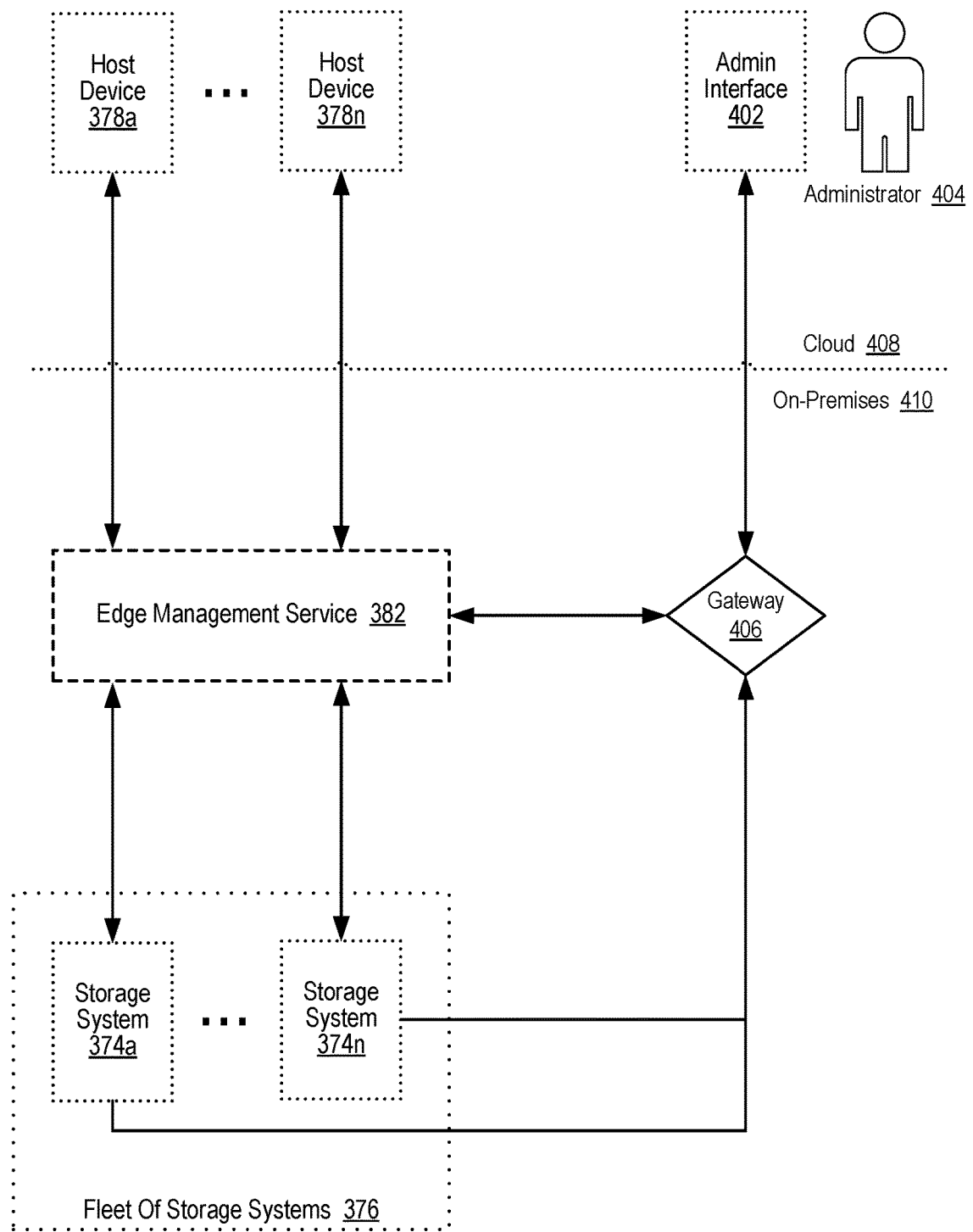
FIG. 4 sets forth a block diagram that includes an edge management service for delivering storage services in accordance with some embodiments of the present disclosure.

For further explanation, FIG. 4 sets forth sets forth a block diagram that includes an edge management service 382 for delivering storage services in accordance with some embodiments of the present disclosure. The example depicted in FIG. 4 is similar to the example depicted in FIG. 4, as the example depicted in FIG. 4 also includes one or more storage systems 374a, 374n as well as one or more host devices 378a, 378n.

The example depicted in FIG. 4 also includes an administrator 404 that may access the edge management service 382 via an admin interface 402. The admin interface 402 may be embodied, for example, as a user interface that allows the administrator 404 to select certain services that will be provided by the edge management service 382 and the underlying storage systems 374a, 374n. In such an example, the administrator 404 may request services from the edge management service 382 through the admin interface 402 via a gateway 406 (e.g., a virtual private network) between the admin interface 402 and the edge management service 382. In this particular example, the admin interface 402 is provided by resources in a cloud 408 computing environment (e.g., a public cloud, a private cloud), while the edge management service 382 and the storage systems 374a, 374b are located on-premises 410, such as in a particular customer's datacenter.

Figure 5:
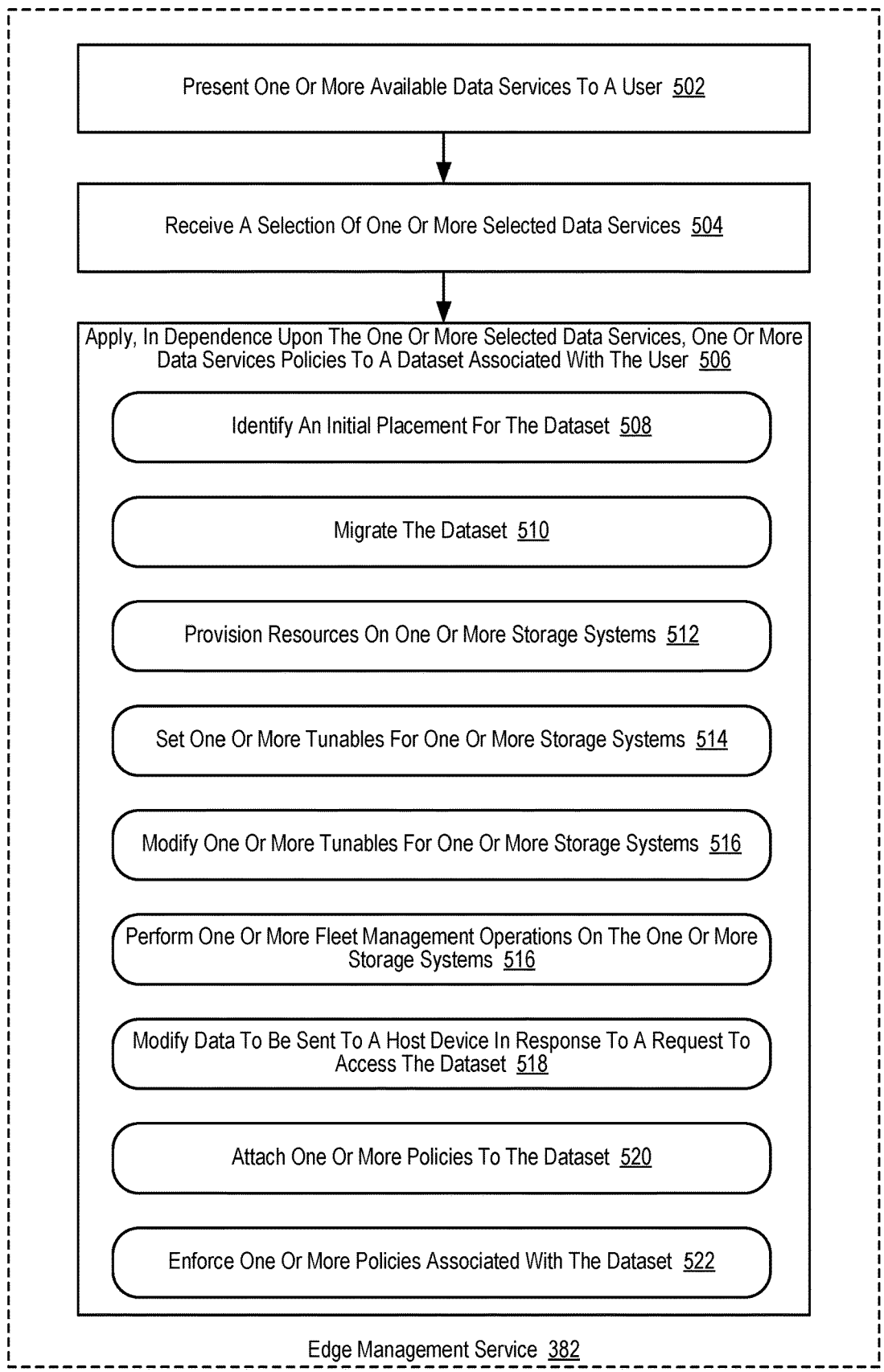
FIG. 5 sets forth a flow chart illustrating an example method of providing data management as-a-service in accordance with some embodiments of the present disclosure.

For further explanation, FIG. 5 sets forth a flow chart illustrating an example method of delivering storage services in accordance with some embodiments of the present disclosure. The method illustrated in FIG. 5 may be carried out, at least in part, by edge management service 382. The edge management service 382 may be embodied, for example, as computer program instructions executing on virtualized computer hardware such as a virtual machine, as computer program instructions executing with a container, or embodied in some other way. In such an example, the one or more data services modules may be executing in a public cloud environment such as Amazon AWS™, Microsoft Azure™, and so on. Alternatively, the edge management service 382 may be executing in a private cloud environment, in a hybrid cloud environment, on dedicated hardware and software as would be found in a datacenter, or in some other environment.

The edge management service 382 may be configured to present one or more available data services to a user, receive a selection of one or more selected data services, and at least assist in the process of applying, in dependence upon the one or more selected data services, one or more data services policies to a dataset associated with the user, as will be described in greater detail below. Furthermore, the edge management service 382 may be configured to perform other steps as will be described in greater detail below. In such a way, the edge management service 382 may essentially act as a gateway to physical devices such as one or more storage systems (including, for example, the storage systems described above as well as their variants), one or more networking devices, one or more processing devices, and other devices that can drive the operation of such devices so as to deliver a wide array of storage services.

The example method depicted in FIG. 5 includes presenting 502 one or more available data services to a user. The one or more available data services may be embodied as services that may be provided to consumers (i.e., a user) of the data services to manage data that is associated with the consumer of the data services. Data services may be applied to various forms of data including, for example, to one or more files in a file system, to one or more objects, to one or more blocks of data that collectively form a dataset, to one or more blocks of data that collectively form a volume, to multiple volumes, and so on. Data services may be applied to a user selected dataset or, alternatively, may be applied to some data that is selected based on one or more policies or heuristics. For example, some data (e.g., data that has personally identifiable information) in a dataset may have one set of data services applied to it whereas other data (e.g., data that does not have personally identifiable information) in the same dataset may have a different set of data services applied to it.

As an illustrative example of available data services that may be presented 502 to a user, data services may be presented 502 to the user that are associated with different levels of data protection. For example, data services may be presented to the user that, when selected and enforced, guarantee the user that data associated with that user will be protected such that various recovery point objectives ('RPO') can be guaranteed. A first available data service may ensure, for example, that some dataset associated with the user will be protected such that any data that is more than 5 seconds old can be recovered in the event of a failure of the primary data store whereas a second available data service may ensure that the dataset that is associated with the user will be protected such that any data that is more than 5 minutes old can be recovered in the event of a failure of the primary data store. Readers will appreciate that this is just one example of available date services that may be presented 502 to the user. Additional available date services that may be presented 502 to the user will be described in greater detail below.

The example method depicted in FIG. 5 also includes receiving 504 a selection of one or more selected data services. The one or more selected data services may represent data services, chosen from the set of all available data services, that the user would like to have applied to a particular dataset that is associated with the user. Continuing with the example described above in which a first available data service may ensure that some dataset associated with the user will be protected such that any data that is more than 5 seconds old can be recovered in the event of a failure of the primary data store whereas a second available data service may ensure that the dataset that is associated with the user will be protected such that any data that is more than 5 minutes old can be recovered in the event of a failure of the primary data store, the user may select the first available data service to minimize data loss in the event of a failure of the primary data store. Readers will appreciate, however, that the monetary cost of the first available data service may be higher than the monetary cost of the second available data service, such that users can weigh these cost differences and chose a data service that is most appropriate for their applications, data, and so on. The user's selection of one or more selected data services may be received 504, for example, via a GUI that is presented to the user, as part of a performance tier selected by the user, or in some other way.

The example method depicted in FIG. 5 also includes applying 506, in dependence upon the one or more selected data services, one or more data services policies to a dataset associated with the user. The one or more data services policies may be embodied, for example, as one or more rules that, when enforced or implemented, causes an associated data service to be provided. Continuing with the example described above in which a user selected a first available data service to ensure that some dataset associated with the user will be protected such that any data that is more than 5 seconds old can be recovered in the event of a failure of the primary data store, the one or more data services policies that may be applied 506 can include, for example, a policy that causes a snapshot of the user's dataset to be taken every 5 seconds and sent to one or more backup storage systems. In such a way, even if the primary data store failed or otherwise became unavailable, a snapshot would have been taken no more than 5 seconds prior to the failure, and such a snapshot could be recovered from one or more backup storage systems. In other examples, other data services policies may be applied 506 to replay I/O events that caused the dataset to be modified so as to provide the associated selected data services, or some other data services policies may be applied 506 that cause the associated selected data services to be provided.

Readers will appreciate that in some embodiments, where one or more data services modules may be configured to present 502 one or more available data services to a user and to receive 504 a selection of one or more selected data services, the one or more data services modules may not be responsible for applying 506 the one or more data services policies to a dataset associated with the user. Instead, the one or more data services modules may instruct (via one or more APIs, via one or more messages, or in some other way) some other entity to apply 506 the one or more data services policies to the dataset that is associated with the user. For example, the one or more data services modules may utilize APIs provided by storage system to cause the storage system to carry out backup operations as described above in order to provide the first available data service described above in which a dataset associated with the user will be protected such that any data that is more than 5 seconds old can be recovered in the event of a failure of the primary data store.

Readers will appreciate that many data services may be presented 502 to a user, selected by a user, and ultimately result in one or more data services policies being applied 506 to a dataset associated with the user in dependence upon the one or more data services selected by the user. A non-exhaustive list of data services that may be made available is included above, although readers will appreciate that additional data services may be made available in accordance with some embodiments of the present disclosure.

In the example method depicted in FIG. 5, applying 506 one or more data services policies to a dataset associated with the user can include identify 508 an initial placement for the dataset. The initial placement for the dataset may be embodied, for example, as one or more storage systems that are initially identified as the storage systems that the dataset should be stored on. Identify 508 an initial placement for the dataset may be carried out, for example, by identifying all storage systems (or combinations thereof) that have the necessary resources required to support the dataset. For example, only those storage systems that have sufficient capacity (e.g., in terms of MB, GB, TB, etc. . . . ) for storing the dataset may be selected as candidates for storing the dataset, only those storage systems that have sufficient performance capacity (e.g., in terms of IOPS to the dataset that can be supported) for servicing the dataset may be selected as candidates for storing the dataset, or only those storage systems that have some other form of sufficient capabilities (e.g., ability to encrypt data, file system support, block storage support, ability to meet certain availability requirements) for storing the dataset may be selected as candidates for storing the dataset. In fact, many criterion may be included into a determination as to whether a particular storage system is a candidate for storing the dataset. In such embodiments, each dataset may be paired with metadata describing various requirements associated with the dataset that can be used to evaluate whether a particular storage system (or a particular combination of storage systems) is a candidate for storing the dataset.

In such an example, once one or more storage systems have been identified as being candidates for storing the dataset, each of the candidates may be evaluated to identify a best fit based on some criteria. For example, the storage system that can store the dataset at the lowest cost may be identified 508 as being the storage system to store the dataset. In fact, the determination as to which storage system should be identified 508 as being the storage system to store the dataset may be based on multiple criteria. Such criteria can include, for example, cost, the amount of resources available in each candidate storage system, the performance (e.g., read latency, write latency) that would be experienced by an entity that accesses the dataset, and many others. In some embodiments, a score may be generated for each candidate storage system that identifies how well the candidate storage system can meet all of the needs or requirements associated with storing the dataset, such that a best-fit storage system can be identified 508 as being the storage system to store the dataset.

In the example method depicted in FIG. 5, applying 506 one or more data services policies to a dataset associated with the user can include migrating 510 the dataset. As opposed to the example above in which an initial placement for the dataset was identified 508, migrating 510 the dataset may be carried out in response to detecting that some change to the overall storage environment has resulted in the current placement of the dataset no longer being a sufficient or optimal placement of the dataset. For example, a change may have occurred to the overall storage environment as a result of new workloads being added to the storage environment (e.g., additional datasets have been stored in the storage systems), as a result of existing workloads growing or contracting, as a result of storage resources failing, as a result of storage resources being added to the storage environment, as a result of one or more storage resources being upgraded, as a result of networking resources that are utilized to access the storage environment changing (e.g., switches added, switches removed), and for many other reasons. In general, a change may have occurred to the overall storage environment as the result of changes to the underlying hardware or changes to the manner in which the storage environment is utilized.

In such an example, migrating 510 the dataset may be carried out by determining that the current placement of the dataset no longer sufficient or optimal. Such a determination may be made, for example, by periodically identifying one or more candidate storage systems for storing the dataset and evaluating each candidate to identify a best-fit amongst the candidates. In such an example, determinations may therefore be made periodically in a scheduled manner. In alternative embodiments, the occurrence of some event may trigger this process. For example, if the capacity utilization of a particular storage system that stores the dataset reaches a threshold, one or more candidate storage systems for storing the dataset may be identified and evaluated to identify a best-fit amongst the candidates. Likewise, if one or more storage resources are added or removed from the overall storage environment, one or more candidate storage systems for storing the dataset may be identified and evaluated to identify a best-fit amongst the candidates.

In the examples described here, the costs or impact associated with migrating a dataset may be taken into consideration when determining whether to migrate 510 the dataset. For example, if migrating 510 a particular dataset would result in a relatively minor benefit but the costs associated with migrating 510 the dataset were substantial, migrating might not be allowed to take place. Likewise, if migrating 510 a particular dataset would result in a better fit for the dataset, but would cause substantial harm to the ability to service other datasets, migration might not be allowed to occur.

In the example method depicted in FIG. 5, applying 506 one or more data services policies to a dataset associated with the user can include provisioning 512 resources on one or more storage systems. Provisioning 512 resources on one or more storage systems may be carried out, for example, by initiating the creation of one or more volumes to store the dataset set through an API exposed by one or more of the storage resources, by initiating the creation of one or more file systems to store the dataset set through an API exposed by one or more of the storage resources, and so on. In such an example, provisioning 512 resources on one or more storage systems can also include reserving capacity, I/O bandwidth, or some other aspect of the storage system's resources in order to be able to enforce a service level agreement or similar performance requirement.

Although the example above relates to embodiments where resources are provisioned 512 (or reserved) from one or more storage systems, in other embodiments other forms of resources that are required for users to access their data may also be provisioned or reserved. For example, networking resources may be provisioned or reserved, monitoring resources may be provisioned or reserved, computing resources may be provisioned or reserved, management resources may be provisioned or reserved, and so on.

In the example method depicted in FIG. 5, applying 506 one or more data services policies to a dataset associated with the user can include setting 514 one or more tunables for one or more storage systems. Each tunable may be embodied, for example, as a configuration parameter, operating parameter, or other parameter that impacts the operation of the one or more storage system. For example, if a tunable parameter is used to determine how frequently a snapshot of a particular dataset is taken, that tunable parameter may be set 514 to enforce a desired RPO for the dataset. Likewise, if a tunable parameter is used to determine whether end-to-end encryption should be enforced for accesses to a particular dataset, that tunable parameter may be set 514 to either enable or disable end-to-end encryption for the dataset (where end-to-end encryption means that data is encrypted while stored in the storage system and data is encrypted transferred over a network as part of an access of the dataset, typically with different encryptions keys at-rest and in transit). In such an example, setting 514 one or more tunables for one or more storage systems may be carried out through the use of one or more APIs that are exposed from the storage systems and to the edge management service 382.

In the example method depicted in FIG. 5, applying 506 one or more data services policies to a dataset associated with the user can include modify 516 one or more tunables for one or more storage systems. While the example described above relates to an embodiment in which one or more tunables are set 514, in some embodiments changes may occur that necessitate modifying 516 a tunable. Such changes can include, for example, changes to the overall storage environment (e.g., hardware changes, workload changes), changes to the requirements associated with a particular dataset, changes to the set of services that a user has selected, and so on. In such an example, modifying 516 a tunable may be carried out by the edge management service 382 determining that some tunable should be adjusted and changing such a tunable through one or more APIs that are available to the edge management service 382.

In the example method depicted in FIG. 5, applying 506 one or more data services policies to a dataset associated with the user can include performing 516 one or more fleet management operations on the one or more storage systems. A fleet management operation may include, for example, rebalancing datasets and workloads amongst the storage systems, updating or upgrading software on one or more of the storage systems, and so on. For example, permutations of how workloads can be distributed may be evaluated to find different permutations (e.g., dataset 1 is stored on storage system 1 and dataset 2 is stored on storage system 2 versus dataset 1 is stored on storage system 2 and dataset 2 is stored on storage system 1) that would satisfy the different requirements associated with each dataset in a way that is optimized overall. For example, if a first arrangement of the datasets would result in less capacity consumption than a second arrangement of the datasets (e.g., through improved data deduplication), in an embodiment in which distribution was optimized to conserve capacity, performing 516 a fleet management operation may include placing the datasets in accordance with the first arrangement. In other embodiments, the datasets may be placed in a way to be optimized for other (including multiple) considerations.

In the example method depicted in FIG. 5, applying 506 one or more data services policies to a dataset associated with the user can include modifying 518 data to be sent to a host device in response to a request to access the dataset. Modifying 518 data to be sent to a host device in response to a request to access the dataset may be carried out, for example, by the edge management service 382 masking or removing PII to adhere to a requirement that PII not be shared with accessors of the dataset, by encrypting/decrypting data to enforce a requirement that the dataset be accessed and stored using end-to-end encryption, and so on. In such an example, modifying 518 data to be sent to a host device in response to a request to access the dataset may be performed by the edge management service 382 to offload some requirements from the underlying storage systems and instead leverage the edge management service 382 to perform some of the tasks that are required to deliver a particular service.

In the example method depicted in FIG. 5, applying 506 one or more data services policies to a dataset associated with the user can include attaching 520 one or more policies to the dataset. In such an example, attaching 520 one or more policies to the dataset may be carried out by the edge management service 382 adding or modifying metadata that is associated with the dataset, where such metadata is used by the storage systems to determine what policies are to be applied to the dataset. For example, a first value in a particular metadata field may indicate whether the dataset should be synchronously replicated or asynchronously replicated.

In the example method depicted in FIG. 5, applying 506 one or more data services policies to a dataset associated with the user can include enforcing 522 one or more policies associated with the dataset. While embodiments described above relate to implementations where the edge management service 382 only informs the storage systems (or other resources) about policies that should be attached 520 to the dataset, in this example the edge management service 382 may itself be responsible (at least in part) for enforcing 522 one or more policies associated with the dataset. For example, if a policy stipulates that only encrypted data should be passed from the storage systems to the host devices when accessing the dataset, the edge management service 382 may actually encrypt data so as to enforce 522 such a policy.

Readers will appreciate that although embodiments described above relate to embodiments where one or more available storage services are presented to a user, a selection of one or more selected storage services is received, and one or more storage services policies to a dataset associated with the user are applied in dependence upon the one or more selected storage services, in other embodiments storage classes (rather than services) may be presented and ultimately applied in a similar manner. For example, a 'high performance' storage class may be presented that is ultimately delivered through the application of a predetermined set of services that are associated with the 'high performance' storage class. Likewise, a 'highly resilient' storage class may be presented that is ultimately delivered through the application of a predetermined set of services that are associated with the 'highly resilient' storage class. In additional embodiments, the exact nature of what is being 'presented' and made available for selection by the user may take other forms, all of which may be implemented and delivered as described herein.

Figure 6:
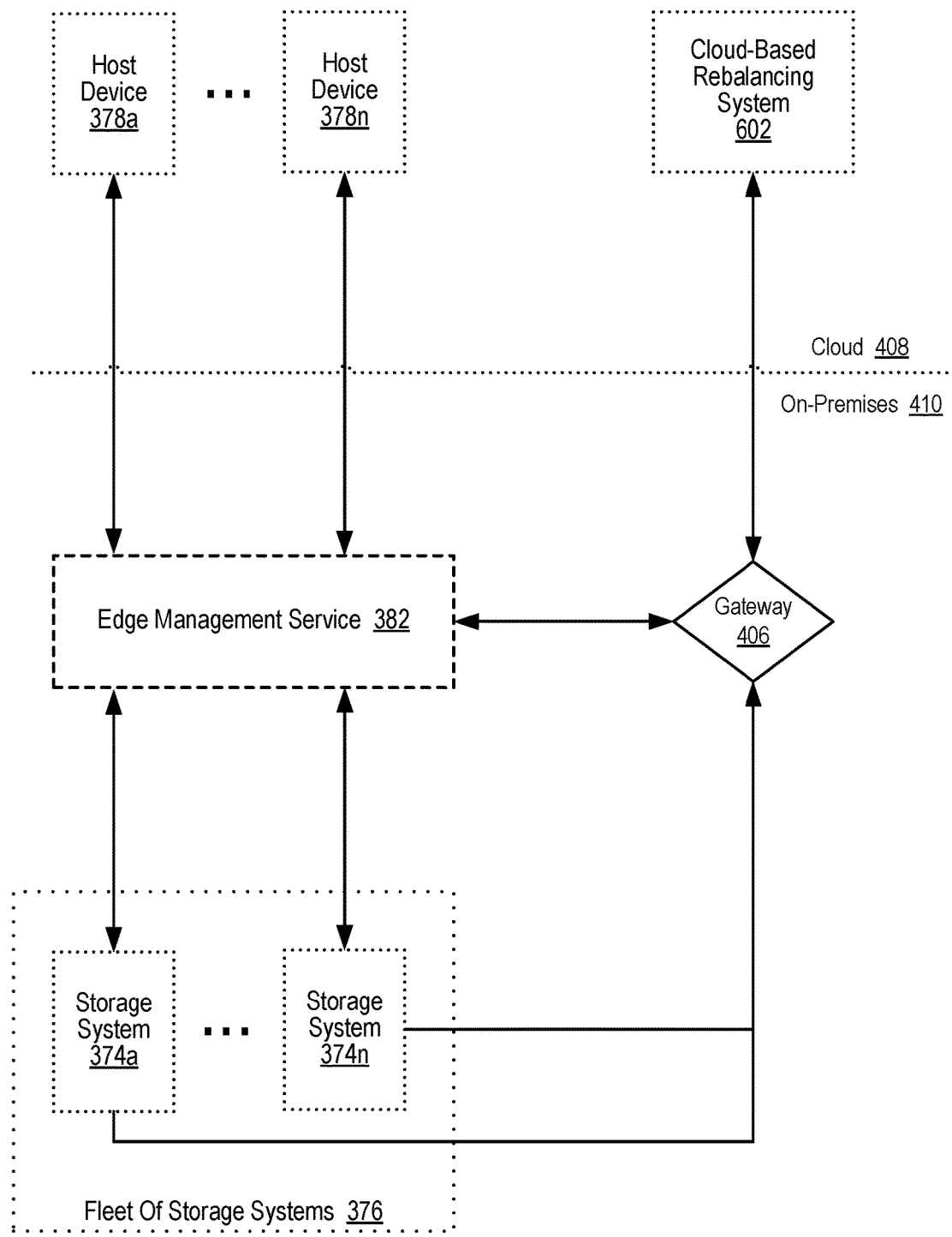
FIG. 6 sets forth a block diagram that includes a cloud-based rebalancing system for rebalancing in a fleet of storage systems using data science in accordance with some embodiments of the present disclosure.

For further explanation, FIG. 6 sets forth sets forth a block diagram that includes an edge management service 382 for delivering storage services in accordance with some embodiments of the present disclosure. The example depicted in FIG. 6 is similar to the example depicted in FIG. 5, as the example depicted in FIG. 6 also includes gateway 406, one or more storage systems 374*a*, 374*n*, and one or more host devices 378*a*, 378*n*.

The example depicted in FIG. 6 also includes a cloud-based rebalancing system 602. The cloud-based rebalancing system 602 is automated computing machinery comprising computer hardware, computer software, or a combination of computer hardware and software. The cloud-based rebalancing system 602 may be embodied, for example, as a system and computing environment, as computer program instructions executing on virtualized computer hardware such as a virtual machine, as computer program instructions executing with a container, or embodied in some other way. The cloud-based rebalancing system 602 provides services to the fleet 376 of storage systems 374*a*, 374*n*, using the edge management service 382 and via the gateway 406 between the cloud-based rebalancing system 602 and the edge management service 382. The services provided by the cloud-based rebalancing system 602 include rebalancing in a fleet of storage systems using data science. Specifically, the services provided by the cloud-based rebalancing system 602 include generating rebalancing proposals based on various movement vectors for workload migration scenarios. Using the various movement vectors, one or more a high fidelity rebalancing proposals may be generated and implemented.

In this particular example, the cloud-based rebalancing system 602 is provided by resources in a cloud 408 computing environment (e.g., a public cloud, a private cloud), while the edge management service 382 and the fleet 376 of storage systems 374a, 374b are located on-premises 410, such as in a particular customer's datacenter. In another example, the edge management service 382 and the gateway 406 may be provided by a cloud computing environment remote to the storage system. The term "cloud-based" as used herein refers to a system or collection of systems that provide services remotely over a data communications link (such as the data communications link described above in FIG. 3A).

The gateway 406 is a hardware, software, or aggregation of hardware and software through which the cloud-based rebalancing system 602 exchanges information with the edge management service 382. The gateway 406 may provide the cloud-based rebalancing system 602 secure access to a fleet 376 of storage system 374a, 374n. The gateway 406 may require authorization and authentication of the cloud-based rebalancing system 602 prior to granting access to the edge management service 382 and the storage system 374a, 374n. Examples of gateways 406 may include VPNs, network nodes, servers, network bridges, and network appliances.

As used herein, the term "local to" refers to entities that are physically proximate to each other, such as entities within the same data center. The edge management service 382 and the gateway may be local to the storage system in that the edge management service 382 may be hosted on a system within the same physical building as the hardware components of the storage system. Similarly, the terms "remote to" and "remotely" refer to entities that are not physically proximate to each other, such as entities that communicate over a wide area network (e.g., the Internet). The edge management service 382 and the gateway 406 may be provided by a cloud environment remote to the storage system in that edge management service 382 and the gateway 406 may be hosted on a system or systems outside of the physical building housing the hardware components of the storage system and be under the control of an entity separate and distinct from the entity controlling the hardware components of the storage system.

Figure 7:
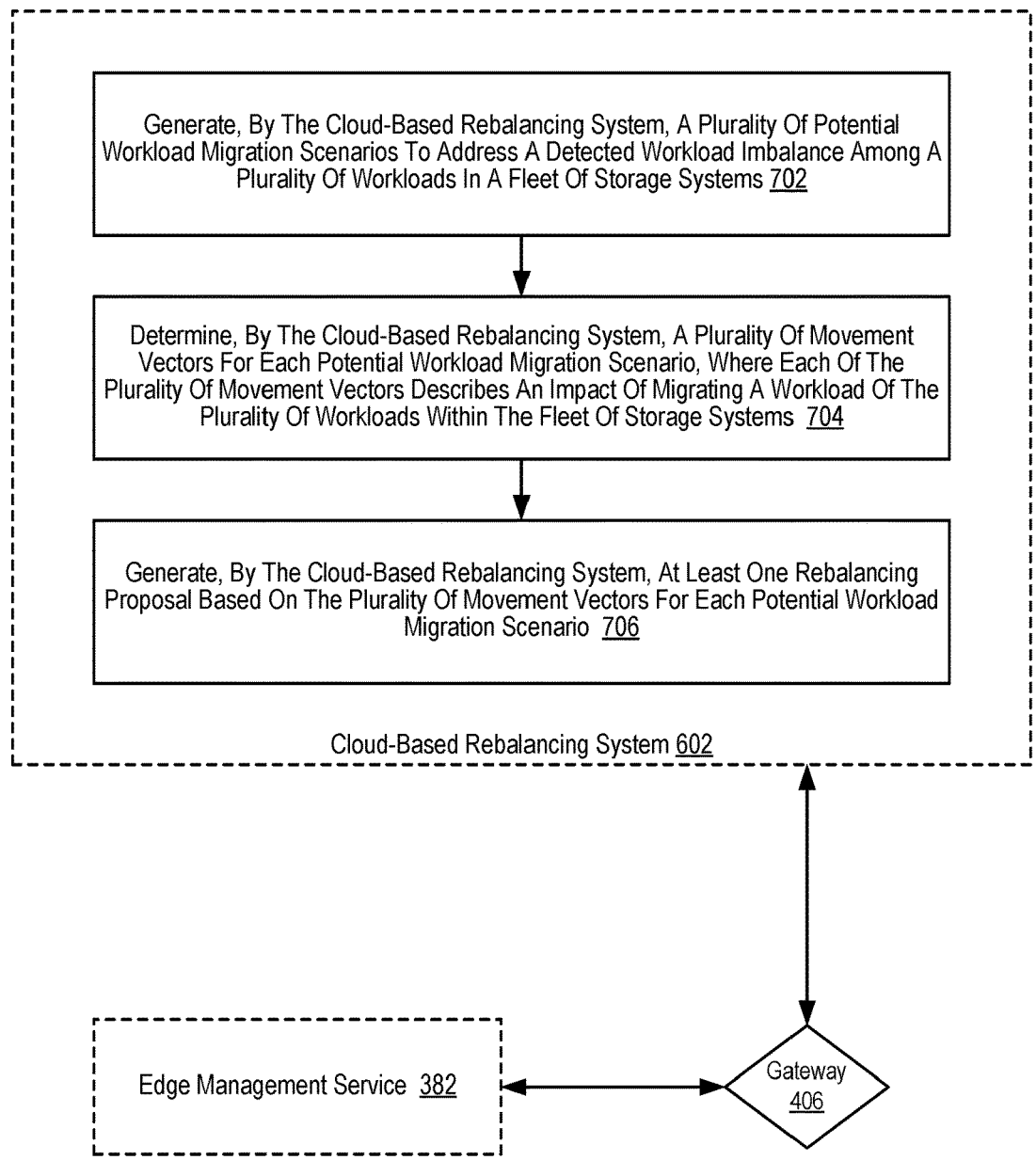
FIG. 7 sets forth a flow chart illustrating an example method of rebalancing in a fleet of storage systems using data science in accordance with some embodiments of the present disclosure.

For further explanation, FIG. 7 sets forth a flow chart illustrating an example method of rebalancing in a fleet of storage systems using data science in accordance with some embodiments of the present disclosure. The method of FIG. 7 includes generating 702, by the cloud-based rebalancing system 602, a plurality of workload migration scenarios to address a detected workload imbalance among a plurality of workloads in a fleet of storage systems. A workload imbalance is a condition in which one or more workloads are negatively impacted by the current deployment of resources across a storage system fleet. A workload imbalance may occur due to the overutilization or underutilization of assigned or available resources. A workload imbalance may be resolved, for example, by migrating workloads to different storage systems or by adding storage systems to a storage system fleet.

The cloud-based rebalancing system 602 may detect an imbalance among the workloads by monitoring the fleet of storage systems for indications that a workload imbalance is occurring or predicted to occur. Monitoring the fleet of storage systems may include accessing an edge management service 382 coupled to the fleet of storage systems. The edge management service 382 may be accessed by a gateway 406, and the cloud-based rebalancing system 602 may gain authorized access to the gateway 406 and access the edge management service 382 and storage system fleet via the communications network coupled to the gateway 406.

The cloud-based rebalancing system 602 may detect an imbalance among the workloads by receiving a notification of a workload imbalance by another system coupled to the storage system fleet, such as a host system coupled to the edge management service 382. Specifically, the host may use the edge management service 382 to monitor the fleet of storage systems and workloads to determine a current or predicted workload imbalance.

A workload migration scenario is data describing a potential reconfiguration of the workloads across the fleet of storage systems. For example, a workload migration scenario may describe the fleet of storage systems in which one workload has been moved from the storage system currently hosting the workload to a different storage system within the fleet. A single workload migration scenario may describe the fleet of storage systems after any number of workload migrations and/or the addition or removal of one or more storage system from the fleet of storage systems.

Generating 702, by the cloud-based rebalancing system 602, a plurality of workload migration scenarios to address a detected workload imbalance among a plurality of workloads in a fleet of storage systems may be carried out by selecting one or more of the workloads associated with the workload imbalance and generating a description of the storage system fleet after the migration of the selected workloads. Specifically, for each of the plurality of workload migration scenarios generated by the cloud-based rebalancing system 602, the cloud-based rebalancing system 602 may select one or more of the workloads associated with the workload imbalance and generate a description of the storage system fleet in which the selected workload(s) have been migrated to different storage systems currently in the fleet or yet to be added to the fleet. The plurality of workload migration scenarios may be generated using a scenario algorithm. The scenario algorithm may dictate the type and amount of workload migration scenarios to generate. For example, the scenario algorithm may dictate the generation of a workload migration scenario that has migrated one workload associated with the workload imbalance to the most underutilized storage system. The scenario algorithm may also incorporate one or more movement vectors as described below. Specifically, one or more movement vectors may be used to dictate the type and amount of workload migration scenarios to generate. For example, the scenario algorithm may dictate the generation of a workload migration scenario that has migrated one workload associated with the workload imbalance to a new storage system added to the fleet based on the deployment of previous storage systems to the fleet.

The method of FIG. 7 further includes determining 704, by the cloud-based rebalancing system 602, a plurality of movement vectors for each workload migration scenario, wherein each of the plurality of movement vectors describes a consideration factor for migrating a workload of the plurality of workloads within the fleet of storage systems. A movement vector describes one or more consideration factors for migrating a workload within the fleet of storage systems. Consideration factors may include impacts (e.g., changes to the operation of a workload) and predicted constraints (e.g., based on fleet deployment history) as described below. Movement vectors may be determined using a variety of information, including different sources of metrics and fleet deployment history. For example, movement vectors may incorporate host telemetry data, network telemetry data, and storage telemetry data from the fleet of storage systems.

For example, one or more movement vectors may be a characterization of impacts on a migrating workload. Specifically, one or more movement vectors may describe the effect on the workload of moving that workload to a different storage system or making changes to the storage system currently hosting the workload. For example, one movement vector may describe the change to the data requests (such as TOP rate) targeting a migrating workload moved from a storage system with largely similar workloads to the migrating workload to a storage system with largely dissimilar workloads to the migrating workload. Other movement vectors characterizing impacts on a migrating workload may include changes to network connections to the migrating workload. Determining each movement vector characterizing impacts on a migrating workload may include retrieving information and metrics about the migrating workload, source storage system, and target storage system. Using the information and metrics about the migrating workload, source storage system, and target storage system, the cloud-based rebalancing system 602 may simulate the migration and record the simulated impacts on the migrating workload.

As another example, one or more movement vectors may describe impacts on other workloads of the plurality of workloads, such as workloads adjacent to the migrating workload, caused by migrating the workload. Specifically, one or more movement vectors may describe the effect on workloads of the source and target storage systems after the migrating workload is moved from the source to the target storage system. For example, one movement vector may describe the impact on the replication rate of the dataset of a workload on a source storage system after the migrating workload is moved from the source to the target storage system. Determining each movement vector characterizing impacts on workloads adjacent to the migrating workload may include retrieving information and metrics about the adjacent workloads, source storage system, and target storage system. Using the information and metrics about the adjacent workloads, source storage system, and target storage system, the cloud-based rebalancing system 602 may simulate the migration and record the simulated impacts on the adjacent workloads.

As another example, one or more movement vectors may be a characterization of impacts on workloads that interact with the migrating workload. Specifically, one or more movement vectors may describe the effect on workloads that interact with the migrating workload after the migrating workload is moved from the source to the target storage system. For example, one movement vector may describe the impact on service request time between the migrating workload and the associated workloads after the migrating workload is moved from the source to the target storage system. Determining each movement vector characterizing impacts on workloads that interact with the migrating workload may include retrieving information and metrics about the associated workloads, source storage system, and target storage system. Using the information and metrics about the associated workloads, source storage system, and target storage system, the cloud-based rebalancing system 602 may simulate the migration and record the simulated impacts on the associated workloads.

As another example, one or more movement vectors may be a characterization of fleet deployment. Specifically, one or more movement vectors may describe previous storage system deployment in the fleet of storage systems, including storage system type, storage system specification, and deployment format. For example, one movement vector may describe the type of storage system most frequently deployed in the fleet. Another movement vector may describe the amount of storage provided by the storage system most frequently deployed in the fleet. Yet another movement vector may describe the timing (e.g., how frequently) of storage system deployments to the fleet. Determining each movement vector characterizing fleet deployment may include accessing a fleet deployment history and extracting information about each storage system deployed in the fleet.

Similarly, as another example, one or more movement vectors may characterize impacts caused by migrating the workload to a new storage system added to the fleet of storage systems. Specifically, one or more movement vectors may describe the effect of purchasing and incorporating an additional storage system to the fleet of storage systems and migrating the workload to the additional storage system. Such a movement vector may account for cost of the new system and advantages to other workloads to adding an additional storage system. Such a movement vector may also be generated based on previous storage system purchases and deployments for the fleet (i.e., predicting that a new storage system will be purchased and deployed in a similar manner). For example, one movement vector may describe the effect of adding a new storage system added to the fleet of storage system and migrating the workload to the new storage system, where the new storage system is assumed to be the same type, configuration, and cost of the last storage system added to the fleet. Determining each movement vector characterizing impacts caused by migrating the workload to a new storage system added to the fleet of storage systems may include evaluating the fleet deployment history and generating a prediction of the type and configuration of an additional storage system deployed the fleet. The cloud-based rebalancing system 602 may then characterize the impact on the workload as well as the fleet as a whole of adding the additional storage system.

As another example, one or more movement vectors may be a characterization of impacts caused by migrating the workload based on the deduplication rate of a dataset of the workload. Specifically, one or more movement vectors may describe the effect on the deduplication rate of a dataset of the migrating workload after the migrating workload is moved from the source to the target storage system. For example, one movement vector may describe a migrating workload with a dataset that has a high rate of deduplication on the source storage system, but a low rate of deduplication on the target system. The dataset may therefore occupy a greater amount of overall fleet storage space after the migration. Determining each movement vector characterizing impacts caused by migrating the workload based on the deduplication rate of a dataset of the workload may include retrieving the deduplication rate of the dataset of the migrating workload and comparing the deduplication rate to a predicted or simulated deduplication rate of the dataset on the target storage system.

As another example, one or more movement vectors may describe impacts caused by migrating the workload from a first storage system in a first physical location to a second storage system in a second physical location. Specifically, one or more movement vectors may describe the effect of a geographic change to the location of the migrating workload. For example, a migrating workload with most host connections in Canada may see a performance degradation if the migrating workload is moved from a storage system in Canada to a storage system in France. Determining each movement vector characterizing impacts caused by migrating the workload from a first storage system in a first physical location to a second storage system in a second physical location may include determining the geographic source of data requests, host connections, and any other interactions with the migrating workload and comparing to change of physical location of the migrating workload to the geographic source of the interactions.

As another example, one or more movement vectors may describe the fleets susceptibility to abnormal states. An abnormal state is a fleet or storage system state that is unintentional, hazardous to the normal operation of the workloads, and the result of poor security or maintenance on the fleet or storage system. One or more movement vectors may describe a level of susceptibility to abnormal states currently in the fleet or anticipated in the fleet based on projected behavior. For example, one movement vector may describe the effect of migrating a workload without improving protection against ransomware attacks. As another example, one movement vector may describe the effect of migrating a workload away from a storage with a high susceptibility to abnormal states to a storage system with a low susceptibility to abnormal states. Determining each movement vector characterizing susceptibility to abnormal states may include evaluating the fleet for susceptibility to abnormal states, and determining a severity of the susceptibility and severity of the abnormal states. The evaluation may be performed on each storage system in the fleet.

As another example, one or more movement vectors may be a characterization of offer management. Offer management refers to the purchase patterns, timing, budget, and usage cycle of storage systems added or removed from the fleet. One or more movement vectors may describe the manner in which new storage system are added and current storage systems are removed from the fleet, as well as the manner of proposing the addition of a storage system based on previous purchase patterns, timing, budget, and usage cycles. For example, one movement vector may describe how frequently storage systems are replaced in the fleet, and the future predicted timing of when a new storage system may be added to replace an existing storage system.

Determining 704, by the cloud-based rebalancing system 602, a plurality of movement vectors for each workload migration scenario, wherein each of the plurality of movement vectors describes a consideration factor for migrating a workload of the plurality of workloads within the fleet of storage systems may be carried out by generating the movement vectors and assigning one or more values to quantify the impact of the particular movement vector on the workload migration scenario. The movement vector values may enable different workload migration scenarios to be directly compared and for one workload migration scenario to be selected for a rebalancing proposal. The values may be assigned for different categories in each of the workload migration scenarios. For example, the different value categories may include monetary cost, performance impact, and downtime impact.

The method of FIG. 7 further includes generating 706, by the cloud-based rebalancing system 602, at least one rebalancing proposal based on the plurality of movement vectors for each workload migration scenario. A rebalancing proposal is a workload migration scenario that resolves the workload imbalance with a tolerable cost (financial and performance) to the storage fleet, based on an evaluation of the movement vectors for that workload migration. Each rebalancing proposal may improve the operation of a single storage system or the entire fleet. Further, one or more of the rebalancing proposals may include adding a storage system to the fleet of storage systems based on prior storage system deployment in the fleet of storage systems. Specifically, one or more rebalancing proposals may be based on a workload migration scenario in which one or more storage systems is added to the fleet in in the same or similar manner in which a previous storage system was added to the storage system fleet. The additional storage system may be the same or similar type and deployed with the same or similar configuration as a previously deployed storage system.

Generating 706, by the cloud-based rebalancing system 602, at least one rebalancing proposal based on the plurality of movement vectors for each workload migration scenario may be carried out by evaluating each of the movement vectors for each of the workload migration scenarios and selecting one or more workload scenarios with the most tolerable cost to the storage fleet. Generating the rebalancing proposal(s) may be carried out using any combination of movement vectors, including any combination of the movement vectors described above. The selection of workload migration scenarios as rebalancing proposals may be based on one or more collective values applied to the workload migration scenarios based on the movement vectors of each workload migration scenario.

Figure 8:
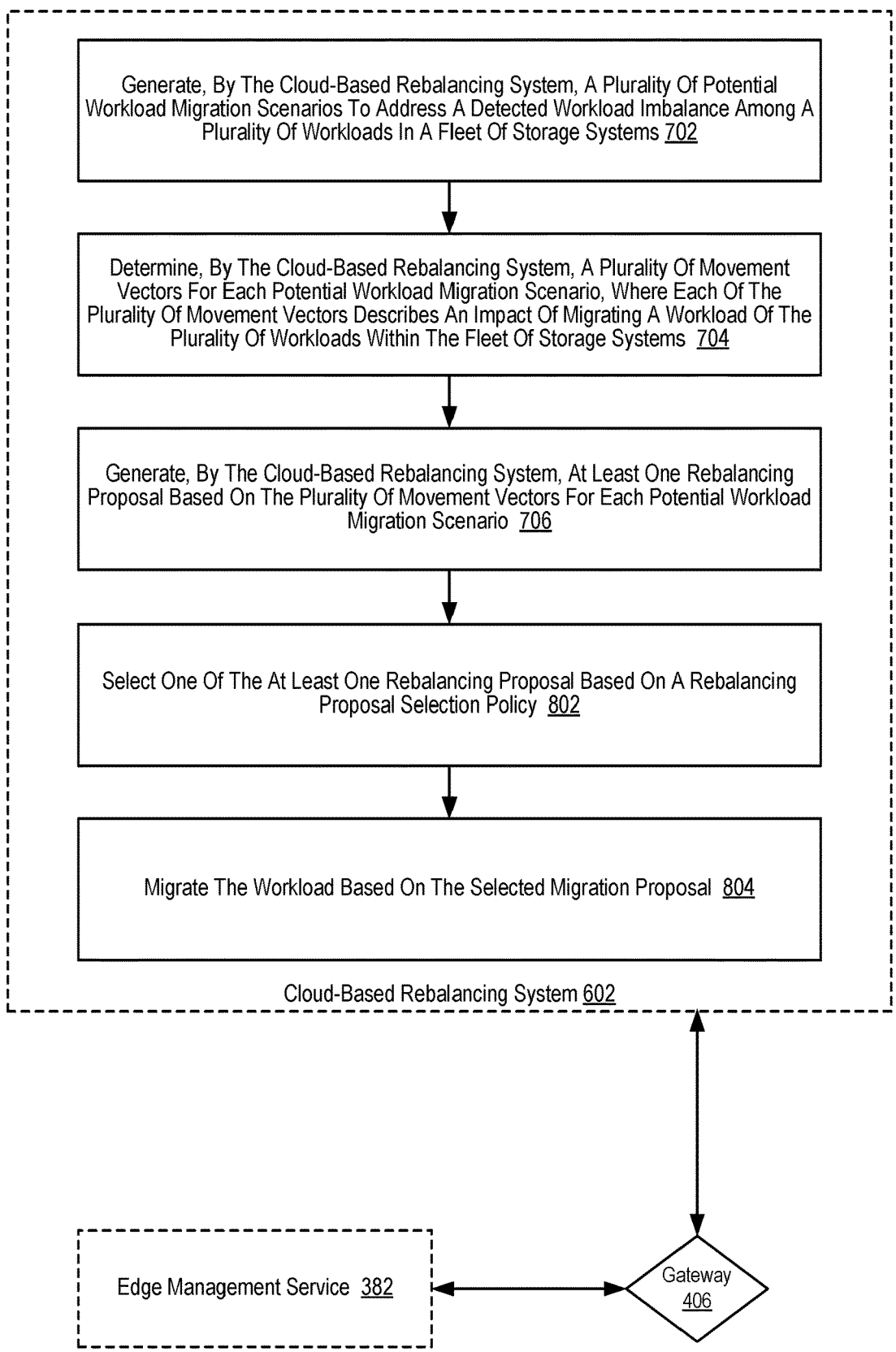
FIG. 8 sets forth a flow chart illustrating an additional example method of rebalancing in a fleet of storage systems using data science in accordance with some embodiments of the present disclosure.

For further explanation, FIG. 8 sets forth a flow chart illustrating an additional example method of rebalancing in a fleet of storage systems using data science in accordance with some embodiments of the present disclosure. The example method depicted in FIG. 8 is similar to the example methods depicted in FIG. 7, as the example method depicted in FIG. 8 also includes generating 702, by the cloud-based rebalancing system 602, a plurality of workload migration scenarios to address a detected workload imbalance among a plurality of workloads in a fleet of storage systems; determining 704, by the cloud-based rebalancing system 602, a plurality of movement vectors for each workload migration scenario, wherein each of the plurality of movement vectors describes a consideration factor for migrating a workload of the plurality of workloads within the fleet of storage systems; and generating 706, by the cloud-based rebalancing system 602, at least one rebalancing proposal based on the plurality of movement vectors for each workload migration scenario.

In the example method depicted in FIG. 8, the method further includes selecting 802 one of the at least one rebalancing proposals based on a rebalancing proposal selection policy; and migrating 804 the workload based on the selected rebalancing proposal. A rebalancing proposal selection policy is an algorithm that identifies a rebalancing proposal based on a comparison of the rebalancing proposals, if more than one rebalancing proposal exists. The rebalancing proposal selection policy may be configured to select the rebalancing proposal with the lowest impact on the fleet of storage system, based on cost, downtime, or other values determined in the generation of movement vectors. The rebalancing proposal selection policy may also incorporate the preferences expressed by the entity controlling the fleet. For example, the entity controlling the fleet may have a budget for adding additional storage systems to the fleet. A rebalancing proposal may be selected or excluded based on whether the financial cost of the rebalancing proposal falls within or exceeds the budget.

Selecting 802 one of the at least one rebalancing proposal based on a rebalancing proposal selection policy may be carried out by applying the rebalancing proposal selection policy and selecting the rebalancing proposal identified by the rebalancing proposal selection policy. For example, the cloud-based rebalancing system 602 may generate two rebalancing proposals. A first rebalancing proposal may describe moving a workload associated with the workload imbalance to another existing storage system in the fleet. A second rebalancing proposal may describe deploying an additional storage system to the fleet and moving the workload associated with the workload imbalance to the newly deployed storage system. The rebalancing proposal selection policy may dictate that the least expensive (in terms of financial cost) rebalancing proposal be selected. Accordingly, the first rebalancing proposal describing moving the workload associated with the workload imbalance to another existing storage system is selected.

Migrating 804 the workload based on the selected rebalancing proposal may be carried out by the cloud-based rebalancing system 602 implementing the rebalancing proposal on the fleet of storage systems. Migrating 804 the workload based on the selected rebalancing proposal may include performing the migration of one or more workloads and reconfiguring storage systems to add or remove the hosting of one or more workloads. Migrating 804 the workload based on the selected rebalancing proposal may also include automatic purchasing of a new storage system. Specifically, the rebalancing proposal may describe the addition of a new storage system to the fleet, including a specification for the new storage system. The cloud-based rebalancing system 602 may interact with a vender system to purchase the new storage system for delivery to the data center specified in the rebalancing proposal. Once activated at the data center, the cloud-based rebalancing system 602 may then complete the migration of the workload to the new storage system.

Figure 9:
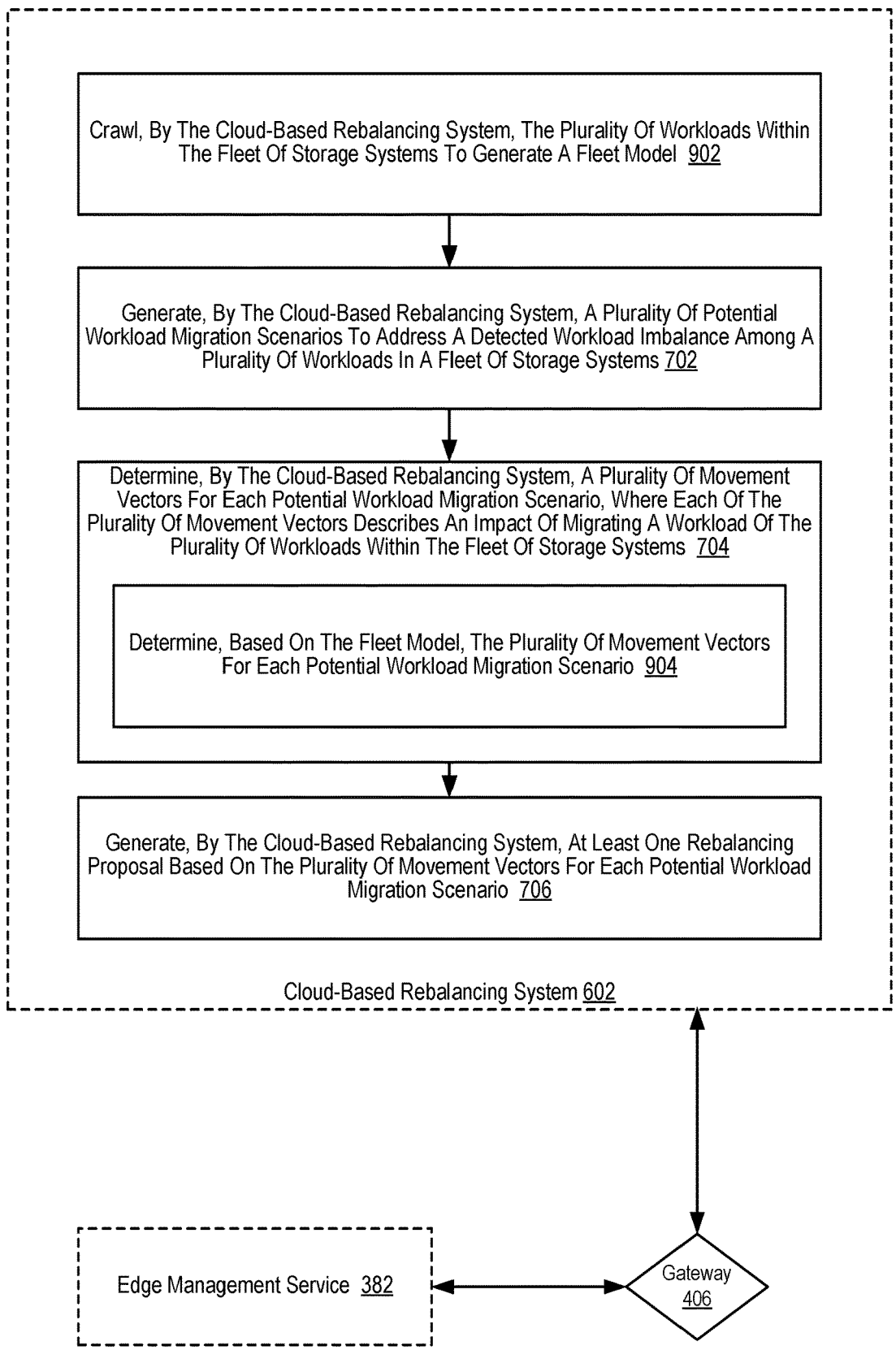
FIG. 9 sets forth a flow chart illustrating an additional example method of rebalancing in a fleet of storage systems using data science in accordance with some embodiments of the present disclosure.

For further explanation, FIG. 9 sets forth a flow chart illustrating an additional example method of rebalancing in a fleet of storage systems using data science in accordance with some embodiments of the present disclosure. The example method depicted in FIG. 9 is similar to the example methods depicted in FIG. 7, as the example method depicted in FIG. 9 also includes generating 702, by the cloud-based rebalancing system 602, a plurality of workload migration scenarios to address a detected workload imbalance among a plurality of workloads in a fleet of storage systems; determining 704, by the cloud-based rebalancing system 602, a plurality of movement vectors for each workload migration scenario, wherein each of the plurality of movement vectors describes a consideration factor for migrating a workload of the plurality of workloads within the fleet of storage systems; and generating 706, by the cloud-based rebalancing system 602, at least one rebalancing proposal based on the plurality of movement vectors for each workload migration scenario.

In the example method depicted in FIG. 9, the method further includes crawling 902, by the cloud-based rebalancing system 602, the plurality of workloads within the fleet of storage systems to generate a fleet model. A fleet model is a simulation of the fleet of storage systems, including the operation and interaction of workloads hosted within the storage systems. Crawling 902, by the cloud-based rebalancing system 602, the plurality of workloads within the fleet of storage systems to generate the fleet model may be carried out by the cloud-based rebalancing system 602 (or a subsystem thereof), accessing each storage system and gathering metric and mapping information about each workload for that storage system. The cloud-based rebalancing system 602 may then characterize performance, IOPs, and bandwidth on each storage system and add that information to the fleet model.

Crawling 902, by the cloud-based rebalancing system 602, the plurality of workloads within the fleet of storage systems to generate a fleet model may include accessing the fleet of storage systems using the edge management service 382 and gateway 406. Accessing the fleet of storage systems using the edge management service 382 and gateway 406 may be carried out by the cloud-based rebalancing system 602 gaining authorized access to the gateway 406 and accessing the fleet of storage systems via the communications network coupling the gateway 406 to the fleet of storage systems. Such a communications network may include the edge management service 382. Alternatively, the edge management service 382 may provide a stream of metrics and other information about the fleet of storage systems that is received by the cloud-based rebalancing system 602 and used to generate the fleet model.

In the example method depicted in FIG. 9, determining 704, by the cloud-based rebalancing system 602, a plurality of movement vectors for each workload migration scenario, wherein each of the plurality of movement vectors describes a consideration factor for migrating a workload of the plurality of workloads within the fleet of storage systems includes determining 904, based on the fleet model, the plurality of movement vectors for each workload migration scenario. Each movement vectors may be determined using information from the fleet model. Specifically, the fleet model may be used to simulate the behavior of the fleet of storage systems in the workload migration scenarios. In the simulation, the particular movement vector may be observed or measured and recorded as the particular movement vector for the particular workload migration scenarios.

Advantages and features of the present disclosure can be further described by the following statements:

1. A method of generating, by the cloud-based rebalancing system, a plurality of workload migration scenarios to address a detected workload imbalance among a plurality of workloads in a fleet of storage systems; determining, by the cloud-based rebalancing system, a plurality of movement vectors for each workload migration scenario, wherein each of the plurality of movement vectors describes a consideration factor for migrating a workload of the plurality of workloads within the fleet of storage systems; and generating, by the cloud-based rebalancing system, at least one rebalancing proposal based on the plurality of movement vectors for each workload migration scenario.

2. The method of statement 1 further comprising selecting one of the at least one rebalancing proposals based on a rebalancing proposal selection policy; and migrating the workload based on the selected rebalancing proposal.

3. The method of statement 2 or statement 1 further comprising crawling, by the cloud-based rebalancing system, the plurality of workloads within the fleet of storage systems to generate a fleet model, wherein determining the plurality of movement vectors for each workload migration scenario comprises determining, based on the fleet model, the plurality of movement vectors for each workload migration scenario.

4. The method of statement 3, statement 2, or statement 1 wherein/further comprising wherein the plurality of movement vectors comprises impacts caused by migrating the workload based on the deduplication rate of a dataset of the workload.

5. The method of statement 4, statement 3, statement 2, or statement 1 wherein the plurality of movement vectors comprises impacts caused by migrating the workload from a first storage system in a first physical location to a second storage system in a second physical location.

6. The method of statement 5, statement 4, statement 3, statement 2, or statement 1 wherein the plurality of movement vectors comprises impacts caused by migrating the workload based on data requests targeting the workload.

7. The method of statement 6, statement 5, statement 4, statement 3, statement 2, or statement 1 wherein the plurality of movement vectors comprises impacts caused by migrating the workload to a new storage system added to the fleet of storage systems.

8. The method of statement 7, statement 6, statement 5, statement 4, statement 3, statement 2, or statement 1 wherein the plurality of movement vectors comprises impacts on other workloads of the plurality of workloads caused by migrating the workload.

9. The method of statement 8, statement 7, statement 6, statement 5, statement 4, statement 3, statement 2, or statement 1 wherein at least one rebalancing proposal comprises adding a storage system to the fleet of storage systems based on prior storage system deployment in the fleet of storage systems.

10. The method of statement 9, statement 8, statement 7, statement 6, statement 5, statement 4, statement 3, statement 2, or statement 1 wherein the workload imbalance is detected by the cloud-based rebalancing system accessing the fleet of storage systems via an edge management service coupled to the fleet of storage systems.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:
accessing, by a cloud-based rebalancing system, a fleet of storage systems to generate a fleet model that simulates the fleet of storage systems and a plurality of workloads executing on the fleet, the fleet model including mapping information of the plurality of workloads;
generating, by a cloud-based rebalancing system, a plurality of workload migration scenarios to address a detected workload imbalance among a plurality of workloads in a fleet of storage systems, wherein the plurality of workload migration scenarios describe impacts to workloads and a plurality of storage systems of the fleet of storage systems;
simulating, by the cloud-based rebalancing system, based on the fleet model, a behavior of the fleet of storage systems in one or more workload migration scenarios to determine a plurality of workload migration factors that describe considerations for migrating a workload of the plurality of workloads within the fleet of storage systems; and
presenting, by the cloud-based rebalancing system, a simulation of the fleet after application of at least one rebalancing proposal based on the plurality of workload migration factors for each workload migration scenario.

2. The method of claim 1, further comprising:
selecting one of a plurality of rebalancing proposals based on a rebalancing proposal selection policy; and
migrating the workload based on the selected rebalancing proposal.

3. The method of claim 1, further comprising:
crawling, by the cloud-based rebalancing system, the plurality of workloads within the fleet of storage systems to generate the fleet model.

4. The method of claim 1, wherein the plurality of workload migration factors comprises impacts caused by migrating the workload based on a deduplication rate of a dataset of the workload.

5. The method of claim 1, wherein the plurality of workload migration factors comprises impacts caused by migrating the workload from a first storage system in a first physical location to a second storage system in a second physical location.

6. The method of claim 1, wherein the plurality of workload migration factors comprises impacts caused by migrating the workload based on data requests targeting the workload.

7. The method of claim 1, wherein the plurality of workload migration factors comprises impacts caused by migrating the workload to a new storage system added to the fleet of storage systems.

8. The method of claim 1, wherein the plurality of workload migration factors comprises impacts on other workloads of the plurality of workloads caused by migrating the workload.

9. The method of claim 1, wherein at least one rebalancing proposal comprises adding a storage system to the fleet of storage systems based on prior storage system deployment in the fleet of storage systems.

10. The method of claim 1, wherein the workload imbalance is detected by the cloud-based rebalancing system accessing the fleet of storage systems via an edge management service coupled to the fleet of storage systems.

11. The method of claim 1, wherein the plurality of workload migration factors comprises impacts caused by migrating the workload on replication of a dataset between two or more storage systems in the fleet.

12. An apparatus comprising a computer processor and a computer memory operatively coupled to the computer processor, the computer memory having disposed within it computer program instructions that, when executed by the computer processor, cause the apparatus to:
- access, by a cloud-based rebalancing system, a fleet of storage systems to generate a fleet model that simulates the fleet of storage systems and a plurality of workloads executing on the fleet, the fleet model including mapping information of the plurality of workloads;
- generate, by a cloud-based rebalancing system, a plurality of workload migration scenarios to address a detected workload imbalance among a plurality of workloads in a fleet of storage systems, wherein the plurality of workload migration scenarios describe impacts to workloads and a plurality of storage systems of the fleet of storage systems;
- simulate, by the cloud-based rebalancing system, based on the fleet model, a behavior of the fleet of storage systems in one or more workload migration scenarios to determine a plurality of workload migration factors that describe considerations for migrating a workload of the plurality of workloads within the fleet of storage systems; and
- present, by the cloud-based rebalancing system, a simulation of the fleet after application of at least one rebalancing proposal based on the plurality of workload migration factors for each workload migration scenario.

13. The apparatus of claim 12 further comprising computer program instructions that, when executed by the computer processor, cause the apparatus to:
- select one of a plurality of rebalancing proposals based on a rebalancing proposal selection policy; and
- migrate the workload based on the selected rebalancing proposal.

14. The apparatus of claim 12, wherein the plurality of workload migration factors comprises impacts caused by migrating the workload based on a deduplication rate of a dataset of the workload.

15. The apparatus of claim 12, wherein the plurality of workload migration factors comprises impacts caused by migrating the workload from a first storage system in a first physical location to a second storage system in a second physical location.

16. The apparatus of claim 12, wherein the plurality of workload migration factors comprises impacts caused by migrating the workload based on data requests targeting the workload.

17. The apparatus of claim 12, wherein the plurality of workload migration factors comprises impacts caused by migrating the workload to a new storage system added to the fleet of storage systems.

18. The apparatus of claim 12, wherein the plurality of workload migration factors comprises impacts on other workloads of the plurality of workloads caused by migrating the workload.

19. The apparatus of claim 12, wherein at least one rebalancing proposal comprises adding a storage system to the fleet of storage systems based on prior storage system deployment in the fleet of storage systems.

20. A computer program product disposed upon a non-transitory computer readable medium, the computer program product comprising computer program instructions that, when executed, cause a computer to:
- accessing, by a cloud-based rebalancing system, a fleet of storage systems to generate a fleet model that simulates the fleet of storage systems and a plurality of workloads, includes the fleet model including mapping information of the plurality of workloads;
- generating, by a cloud-based rebalancing system, a plurality of workload migration scenarios to address a detected workload imbalance among a plurality of workloads in a fleet of storage systems, wherein the plurality of workload migration scenarios describe impacts to workloads and a plurality of storage systems of the fleet of storage systems;
- determining, by the cloud-based rebalancing system, based on the fleet model, a behavior of the fleet of storage systems in one or more workload migration scenarios to determine a plurality of workload migration factors that describe considerations for migrating a workload of the plurality of workloads within the fleet of storage systems; and
- presenting, by the cloud-based rebalancing system, a simulation of the fleet after application of at least one rebalancing proposal based on the plurality of workload migration factors for each workload migration scenario.

* * * * *